Oct. 1, 1957  W. R. MEYER ET AL  2,807,974
AUTOMATIC BEARING LATHE
Filed May 17, 1955  32 Sheets-Sheet 3

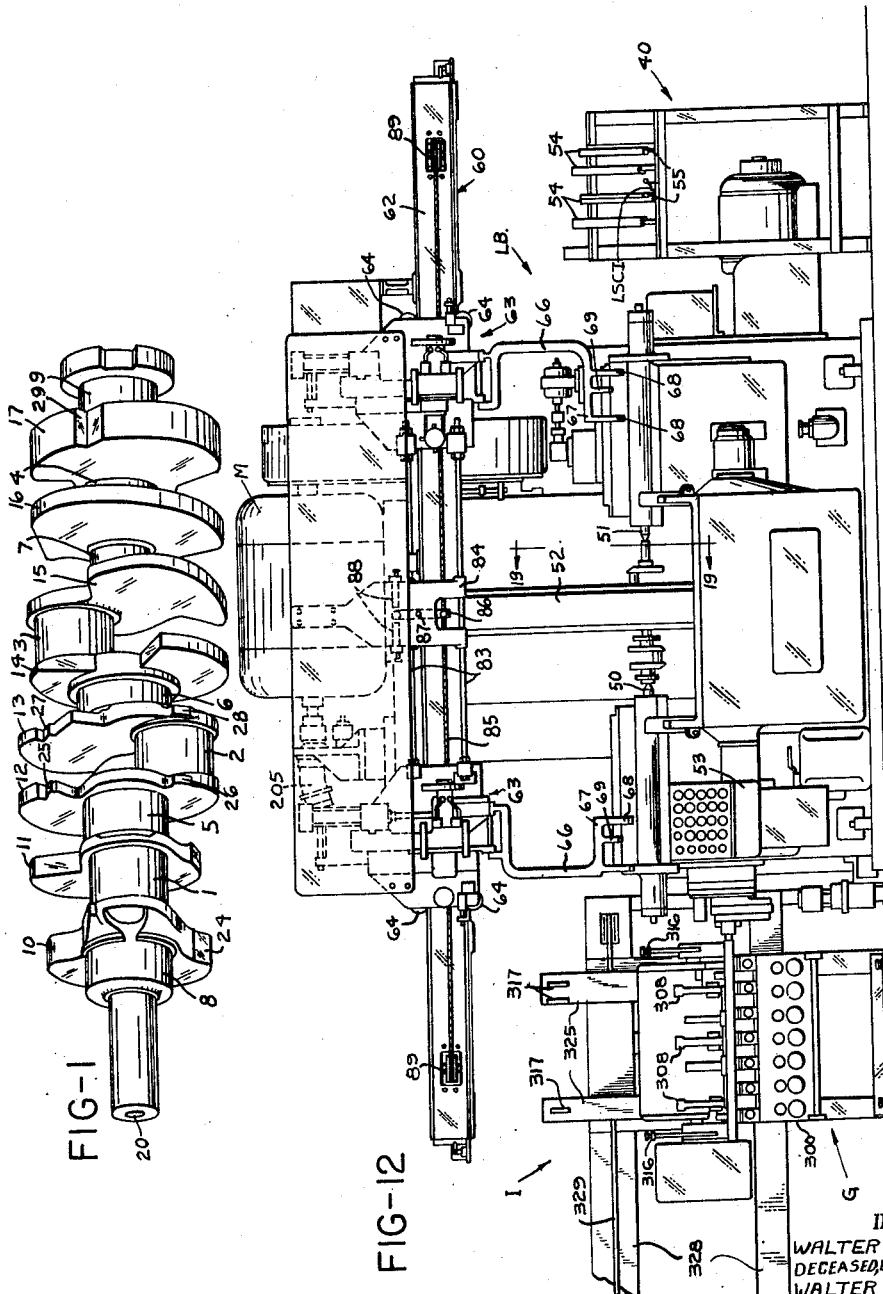

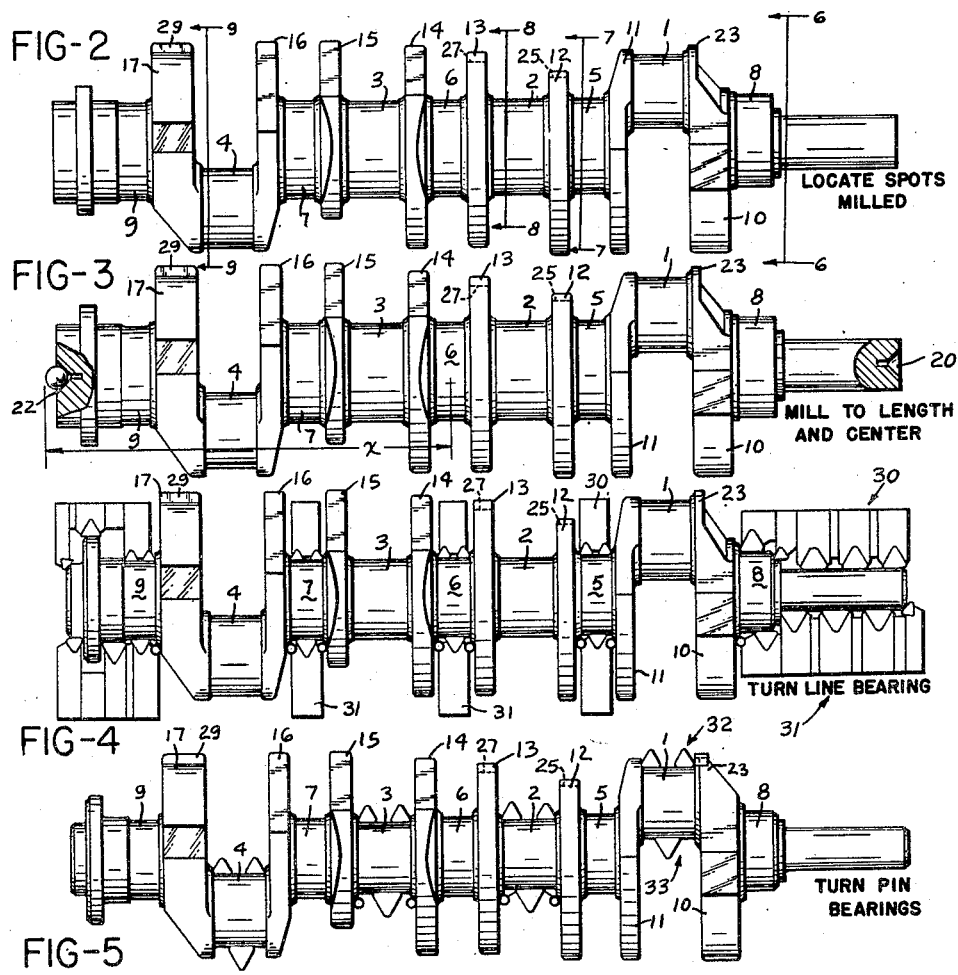

INVENTORS
WALTER R. MEYER,
DECEASED, BY
WALTER H. MEYER
ADMINISTRATOR
& HAROLD J. SIEKMANN
BY
ATTORNEYS

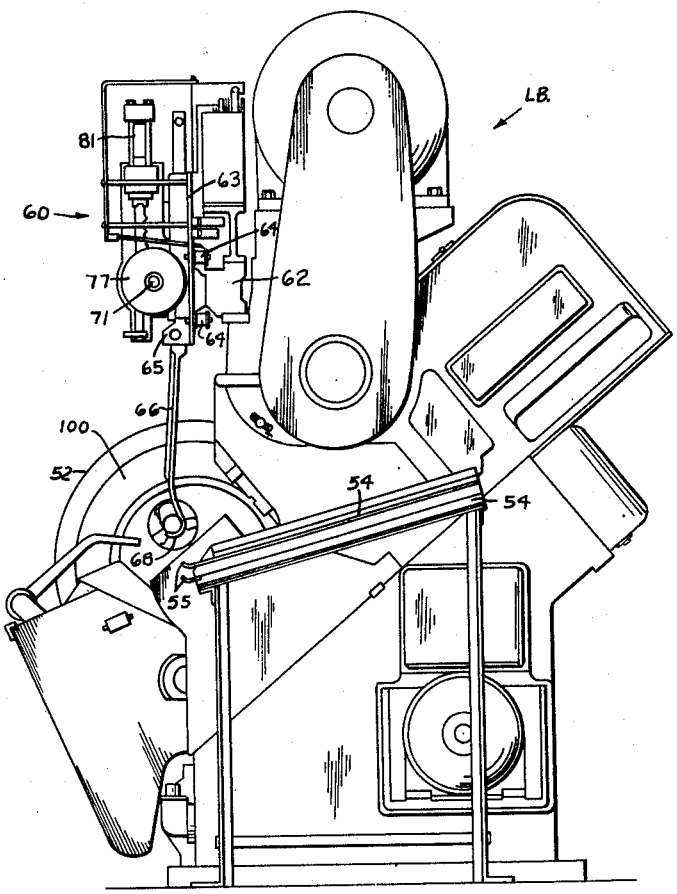

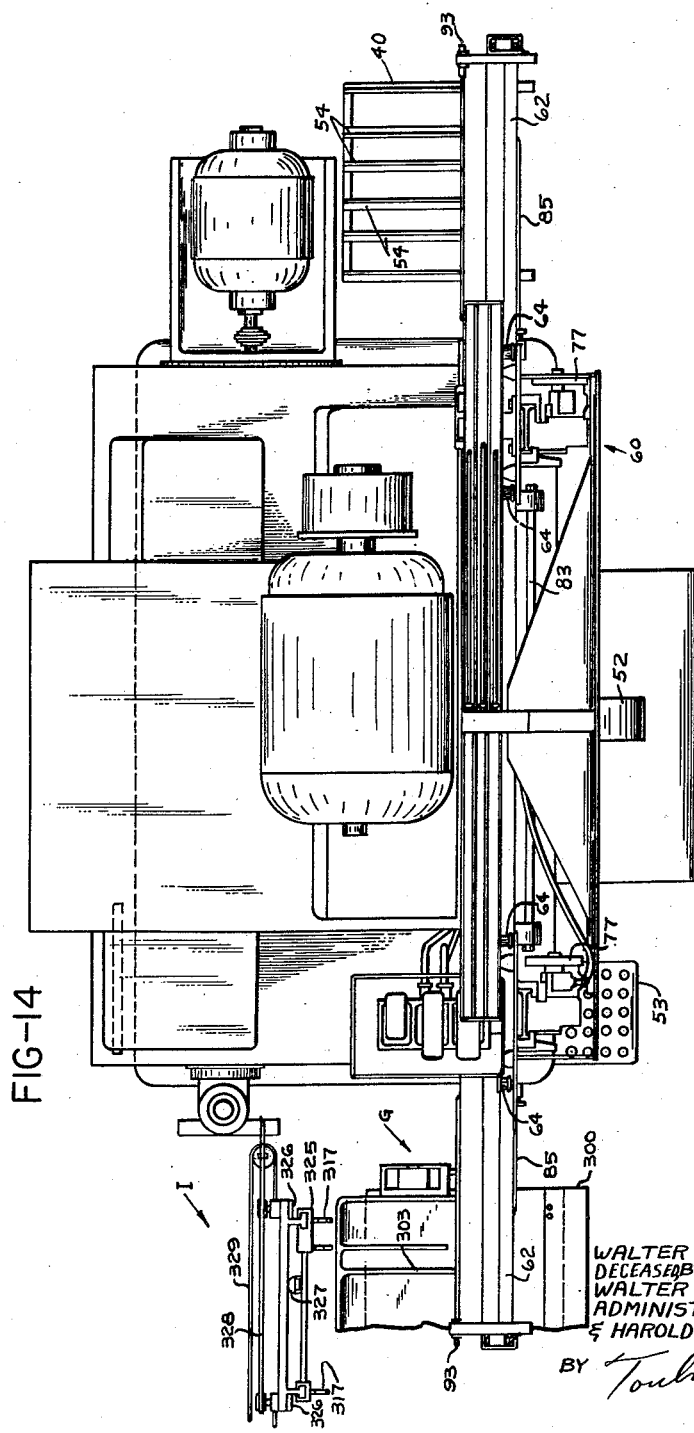

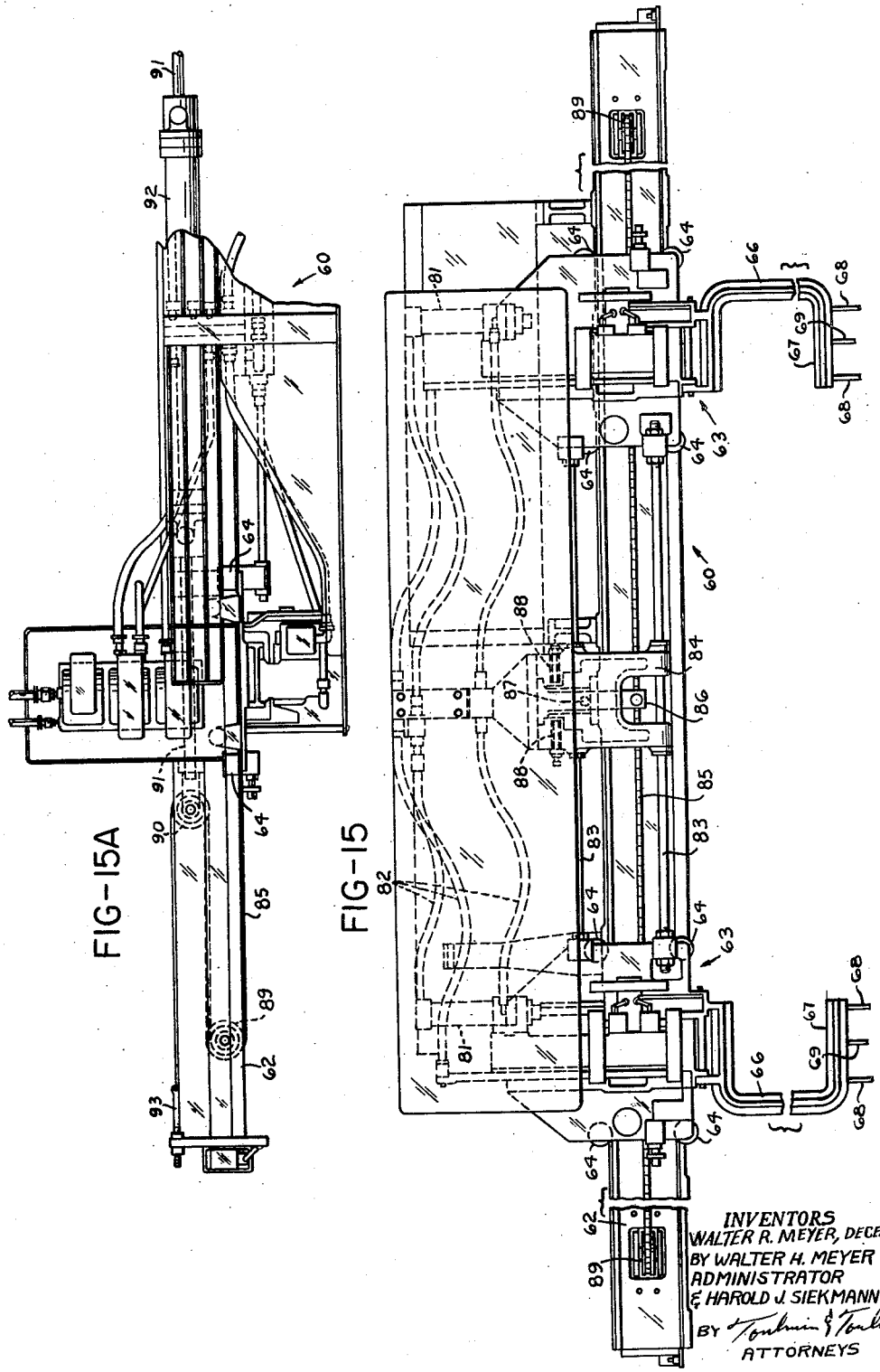

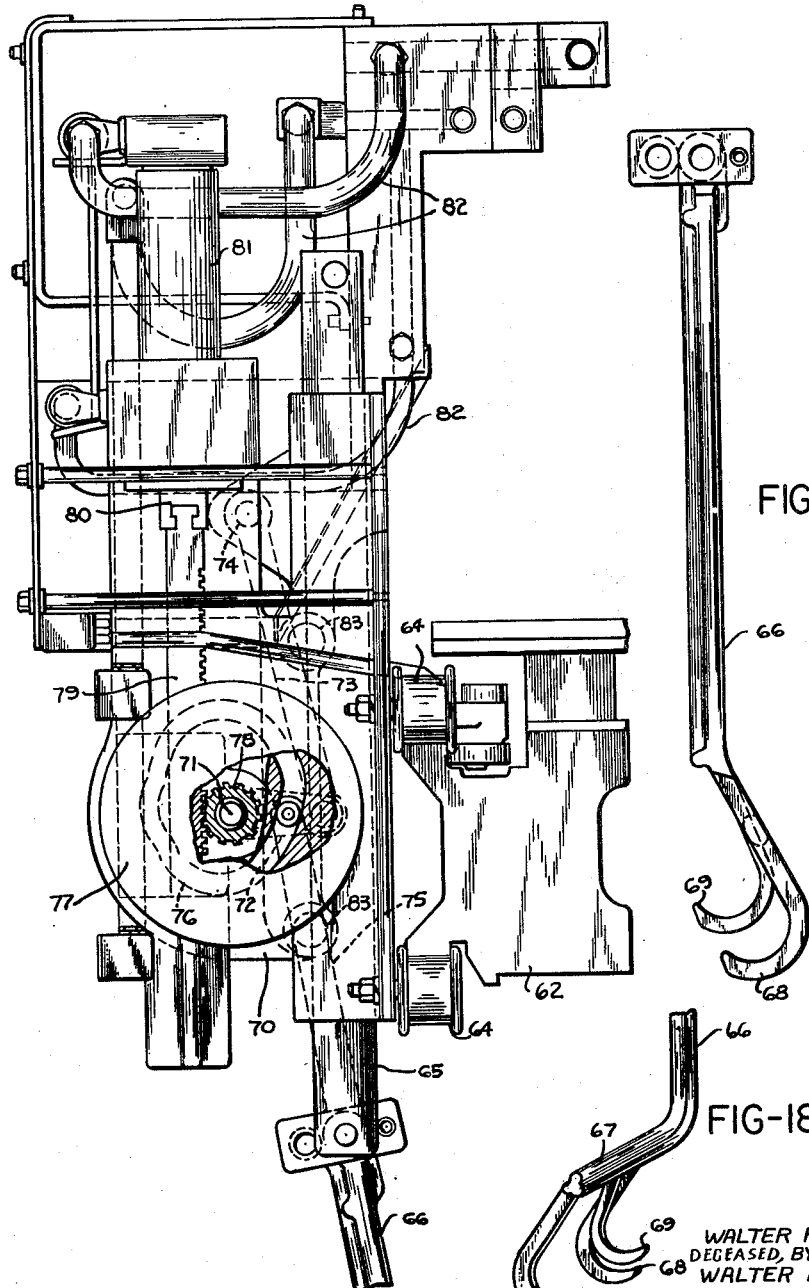

Oct. 1, 1957 W. R. MEYER ET AL 2,807,974
AUTOMATIC BEARING LATHE
Filed May 17, 1955 32 Sheets-Sheet 8

INVENTORS
WALTER R. MEYER,
DECEASED, BY
WALTER H. MEYER
ADMINISTRATOR
& HAROLD J. SIEKMANN
BY Toulmin & Toulmin
ATTORNEYS

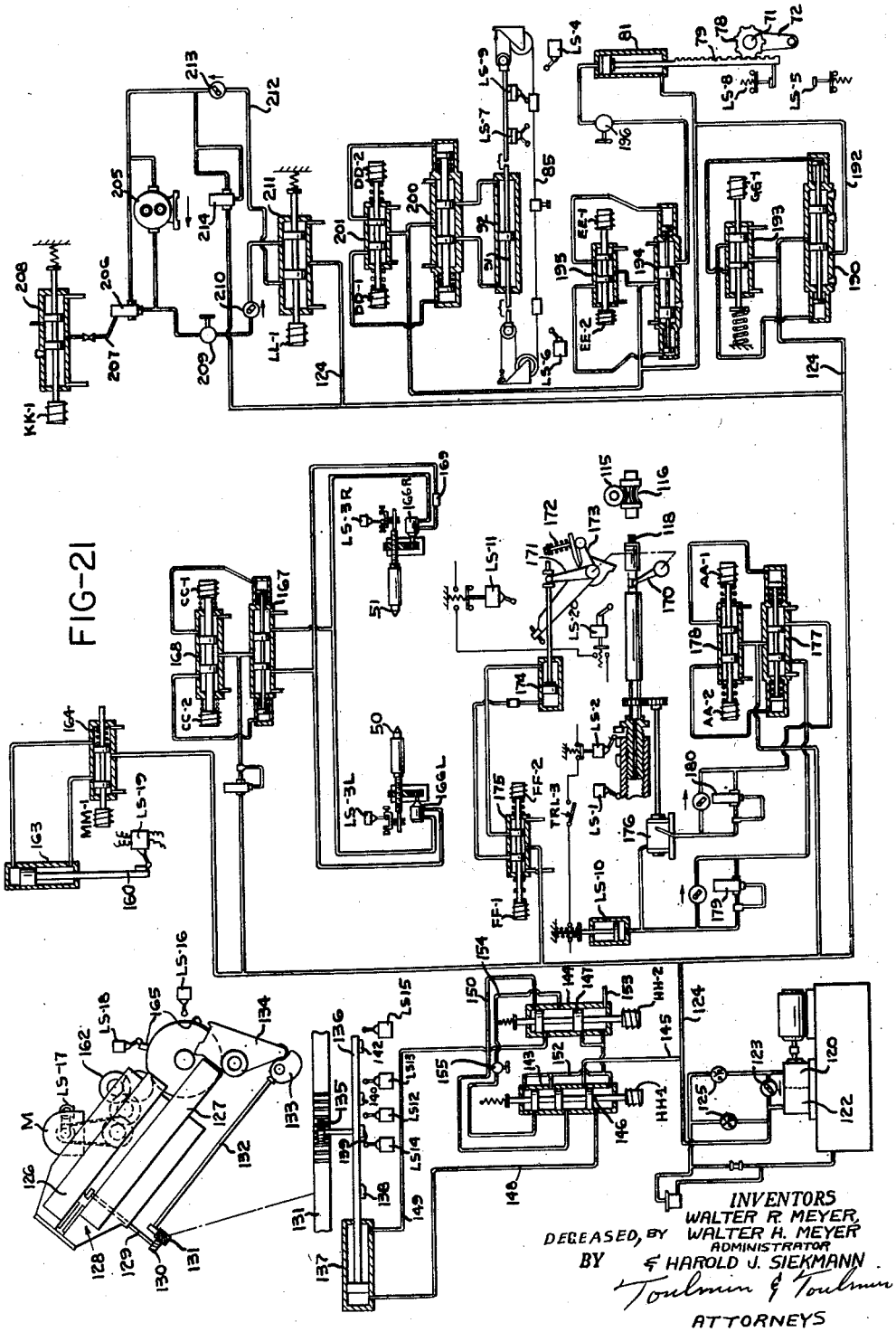

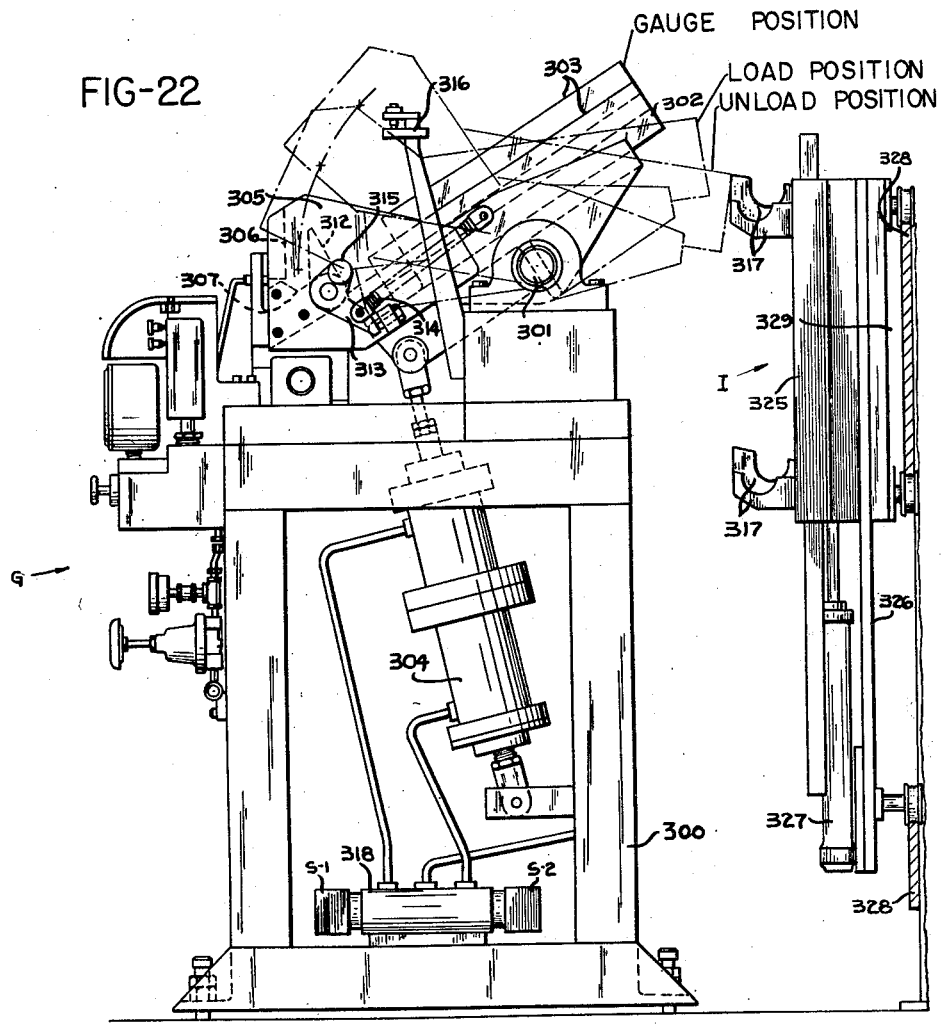

Oct. 1, 1957 W. R. MEYER ET AL 2,807,974
AUTOMATIC BEARING LATHE
Filed May 17, 1955 32 Sheets-Sheet 11

INVENTORS
WALTER R. MEYER (deceased)
by WALTER H. MEYER
Administrator
& HAROLD J. SIEKMANN
BY
ATTORNEYS

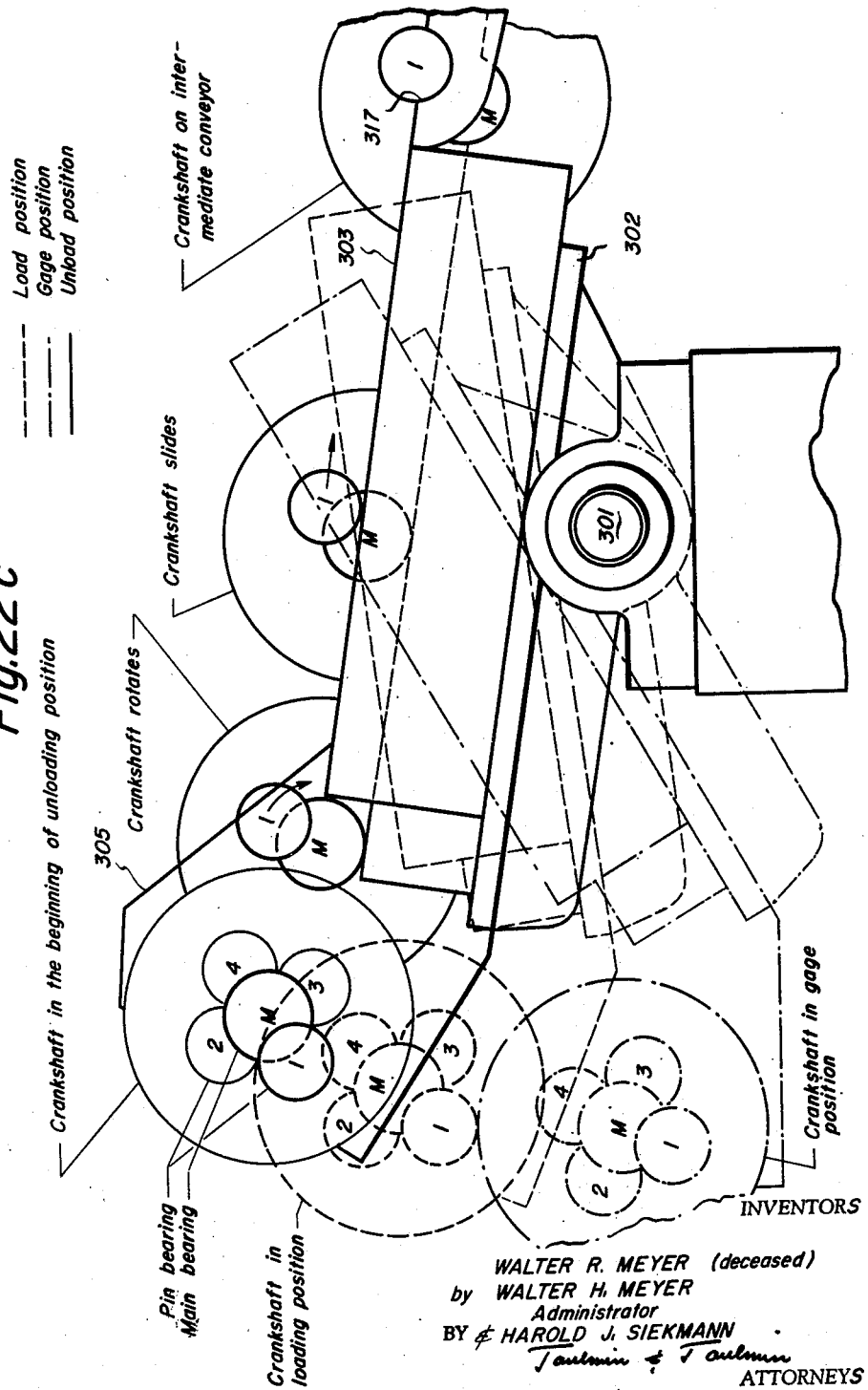

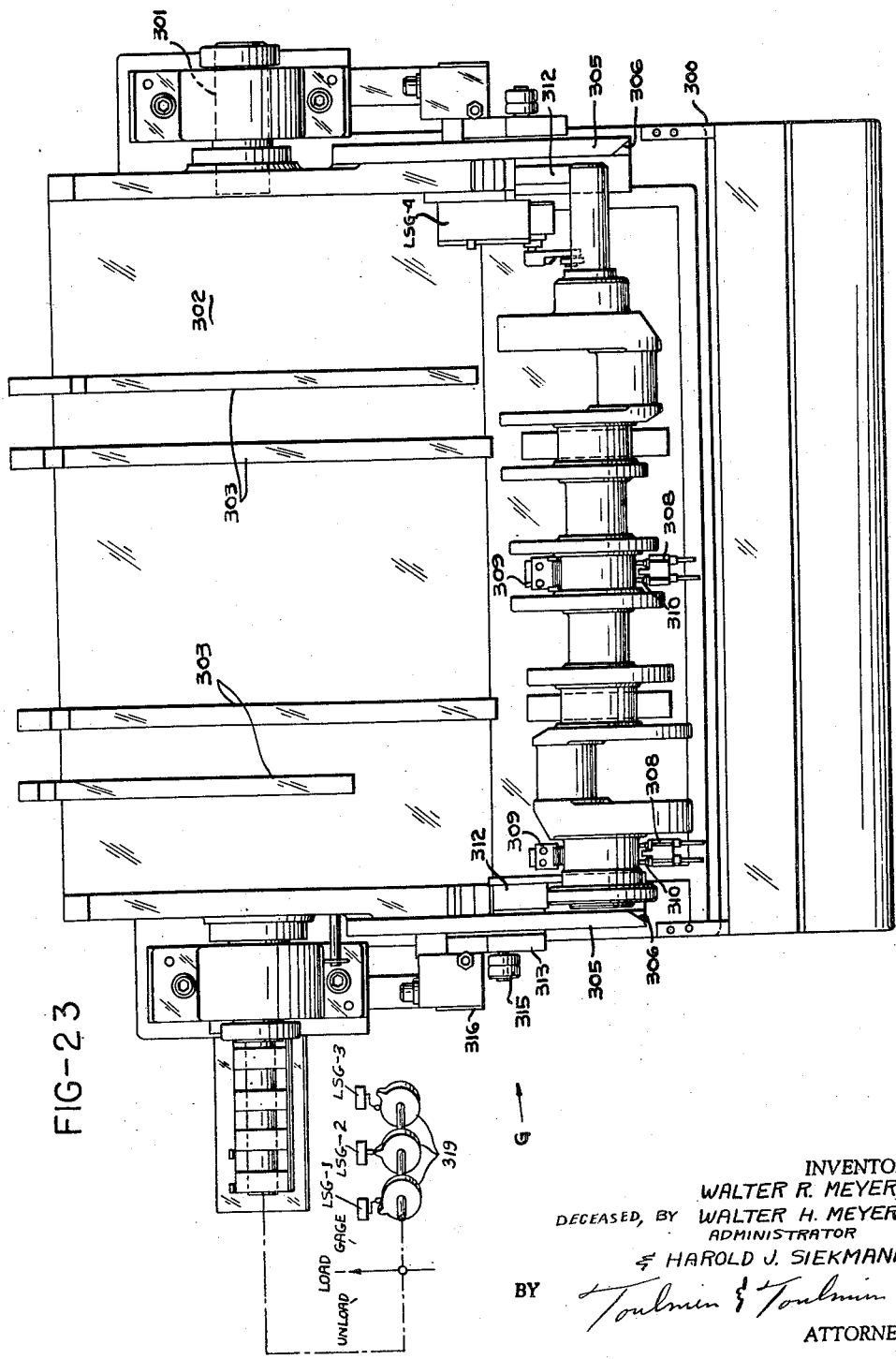

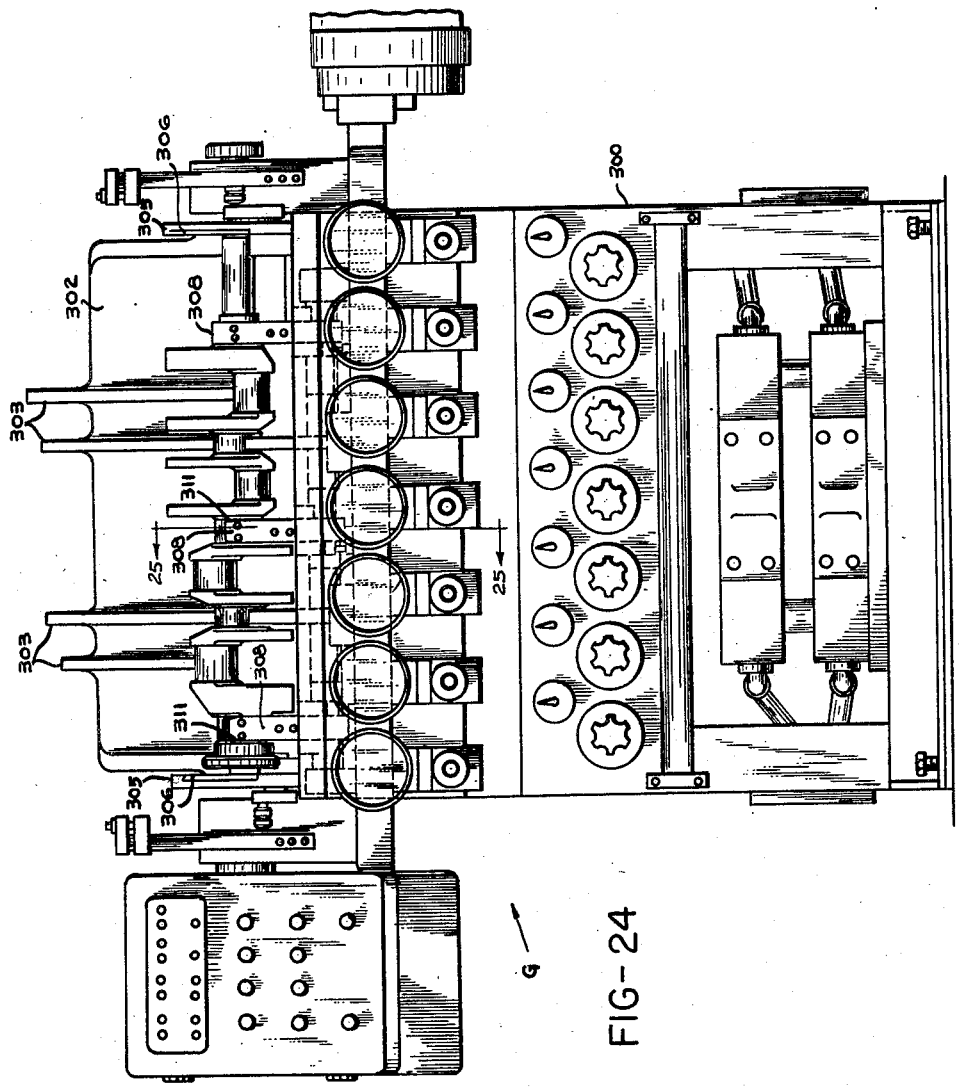

Oct. 1, 1957  W. R. MEYER ET AL  2,807,974
AUTOMATIC BEARING LATHE
Filed May 17, 1955  32 Sheets-Sheet 15
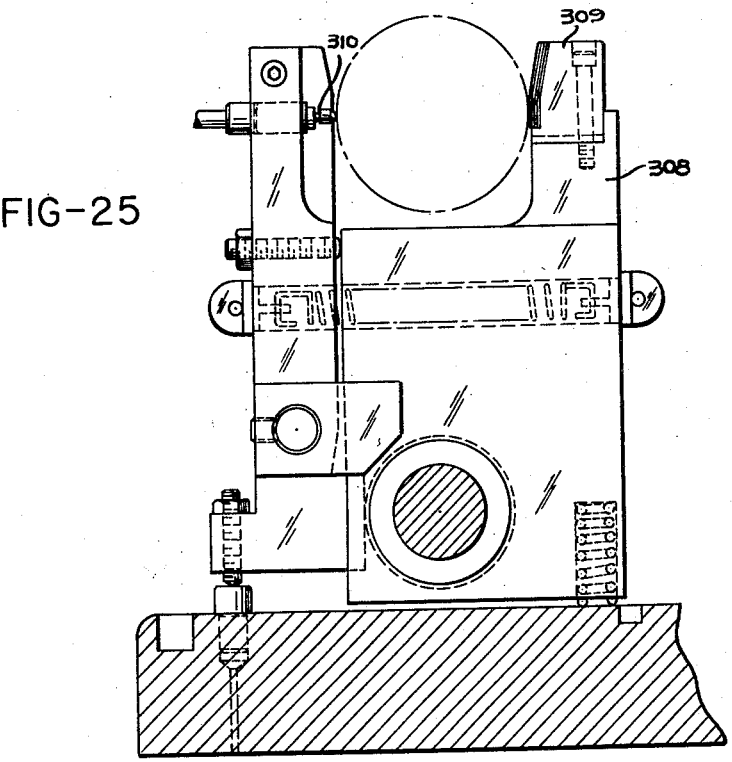
FIG-25
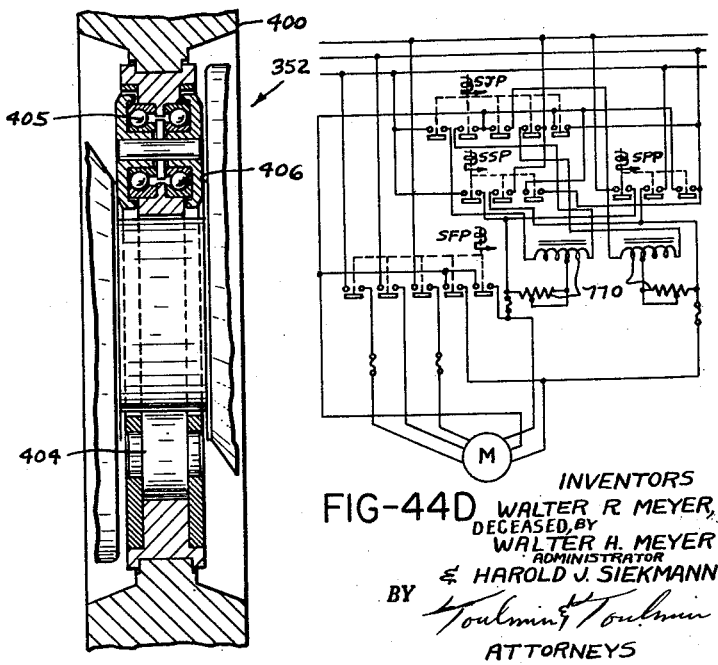
FIG-40
FIG-44D
INVENTORS
WALTER R. MEYER,
DECEASED, BY
WALTER H. MEYER
ADMINISTRATOR
& HAROLD J. SIEKMANN
BY
Toulmin & Toulmin
ATTORNEYS Oct. 1, 1957  W. R. MEYER ET AL  2,807,974
AUTOMATIC BEARING LATHE
Filed May 17, 1955  32 Sheets-Sheet 17
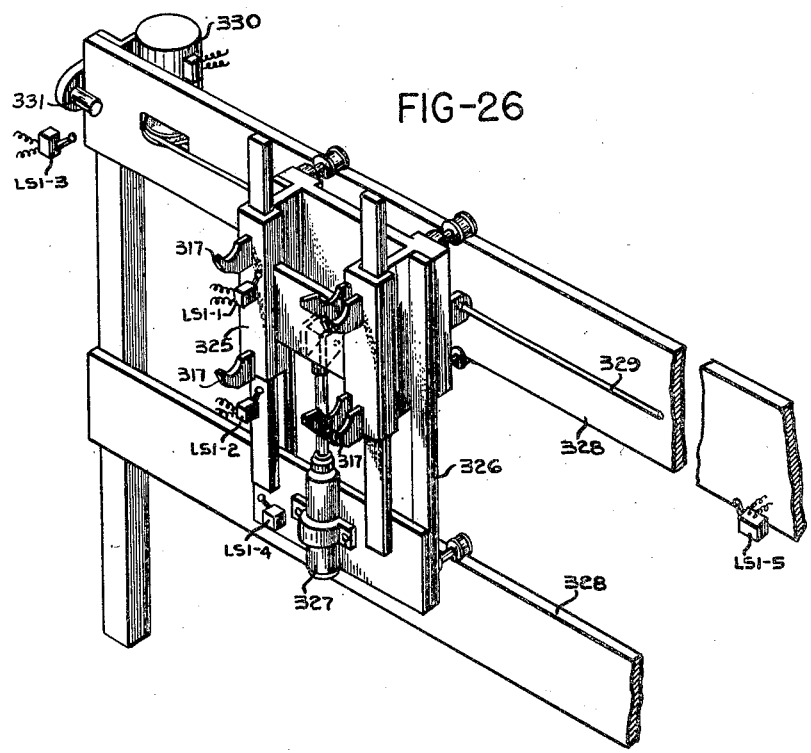
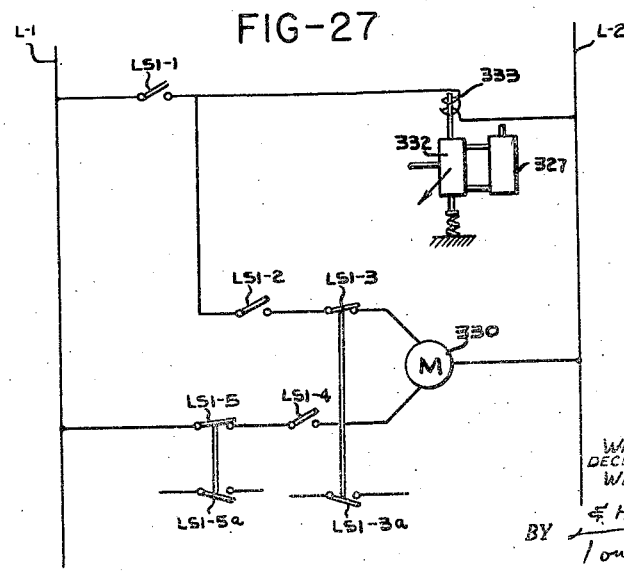
INVENTORS
WALTER R. MEYER,
DECEASED, BY
WALTER H. MEYER
ADMINISTRATOR
& HAROLD J. SIEKMANN
BY Toulmin & Toulmin
ATTORNEYS

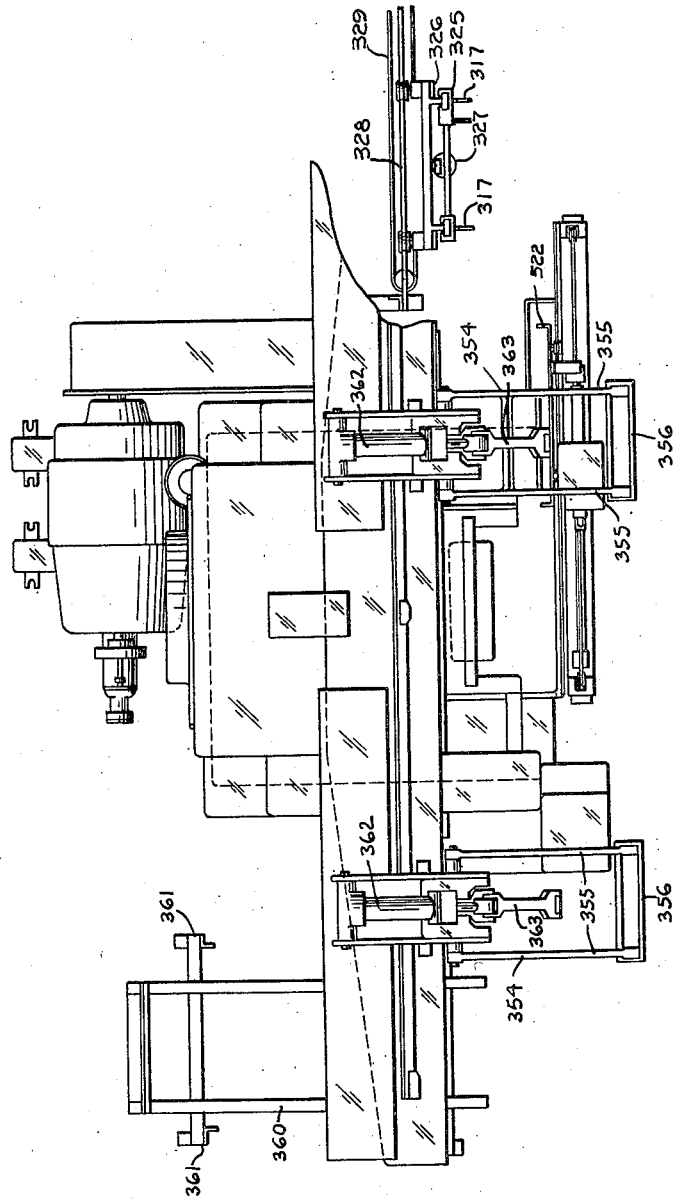

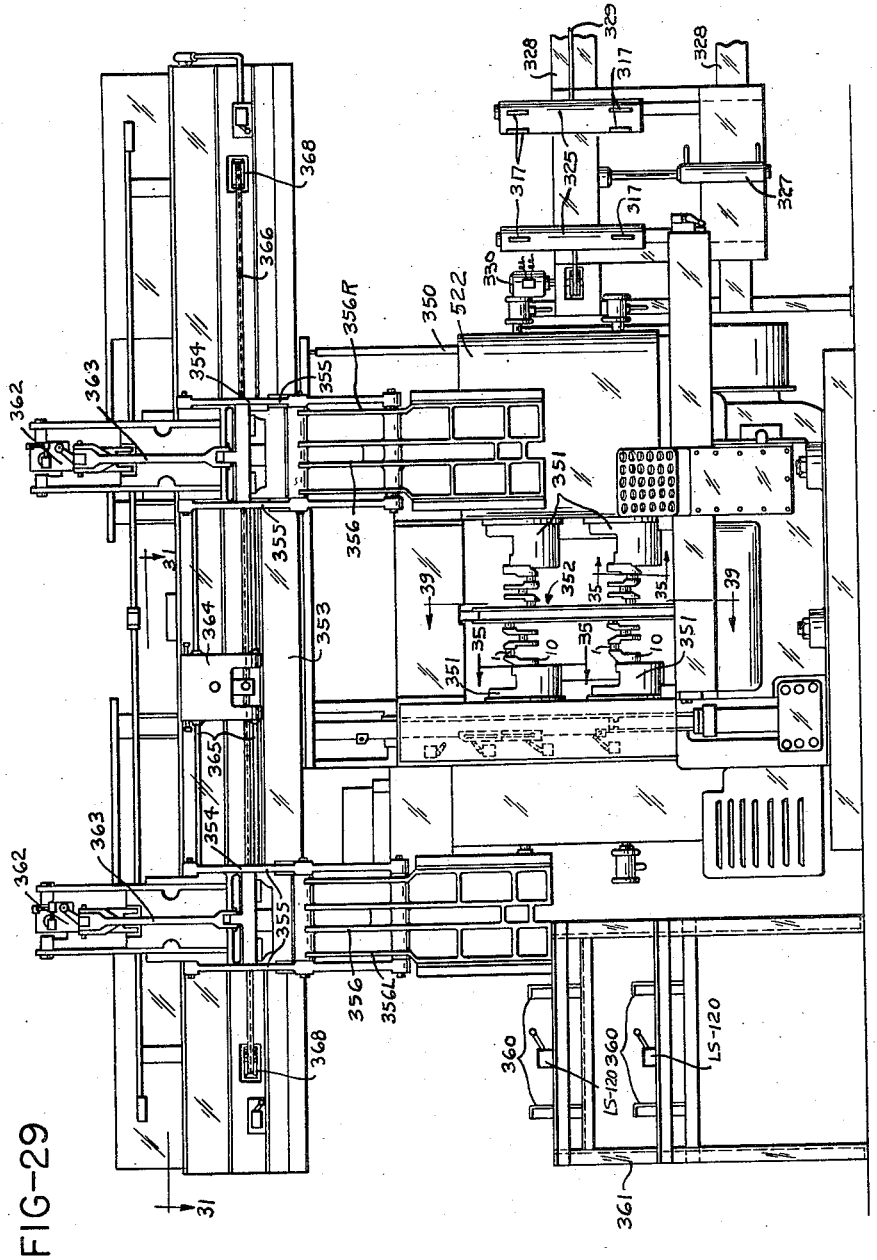

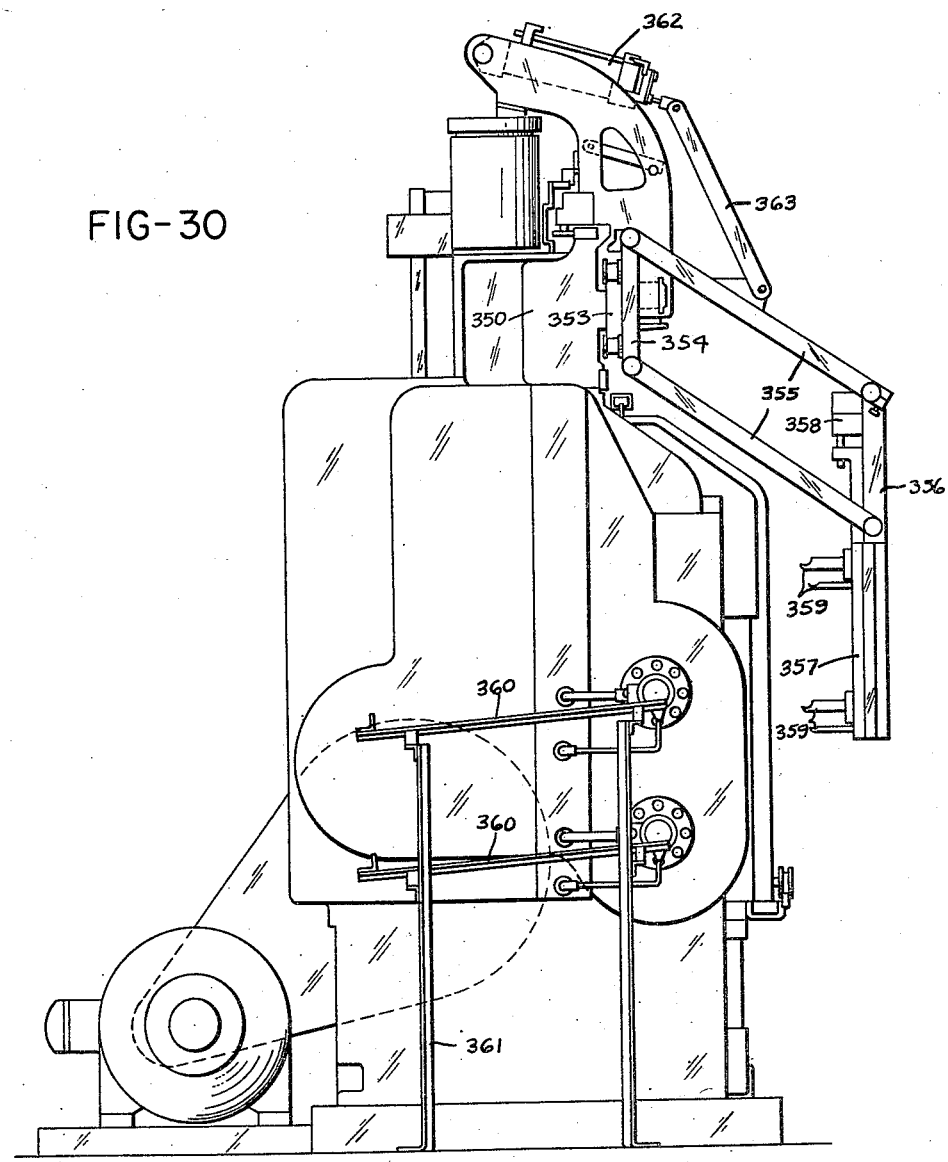

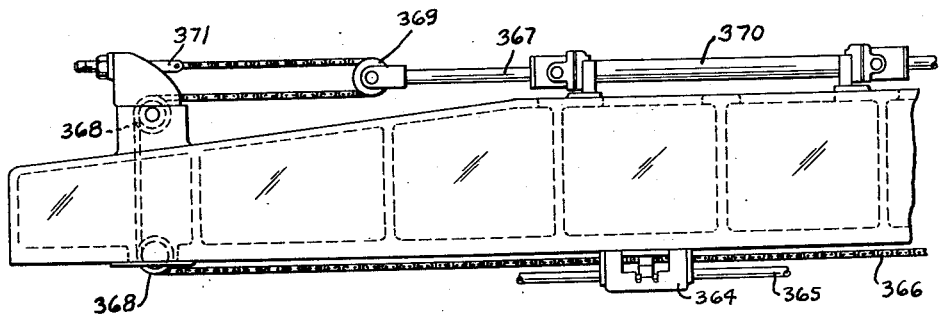
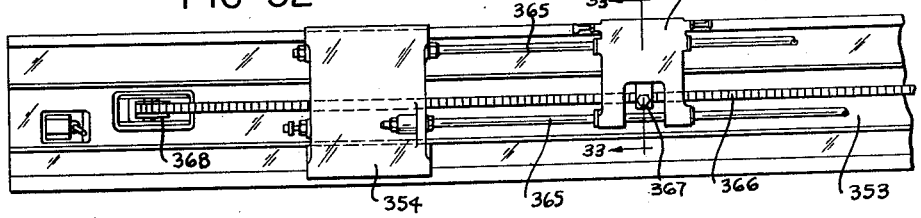
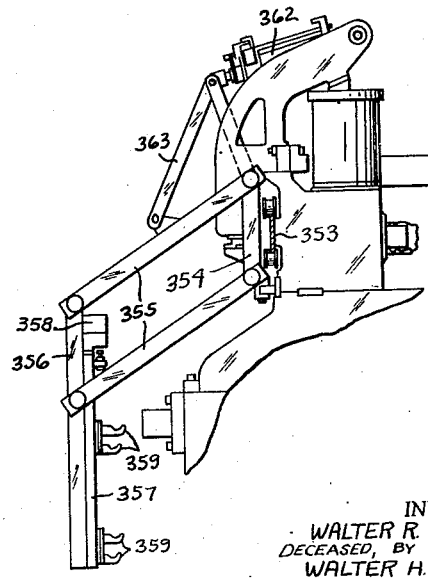
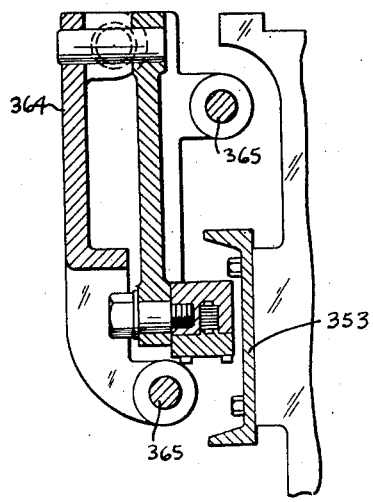

Oct. 1, 1957  W. R. MEYER ET AL  2,807,974
AUTOMATIC BEARING LATHE
Filed May 17, 1955  32 Sheets-Sheet 22
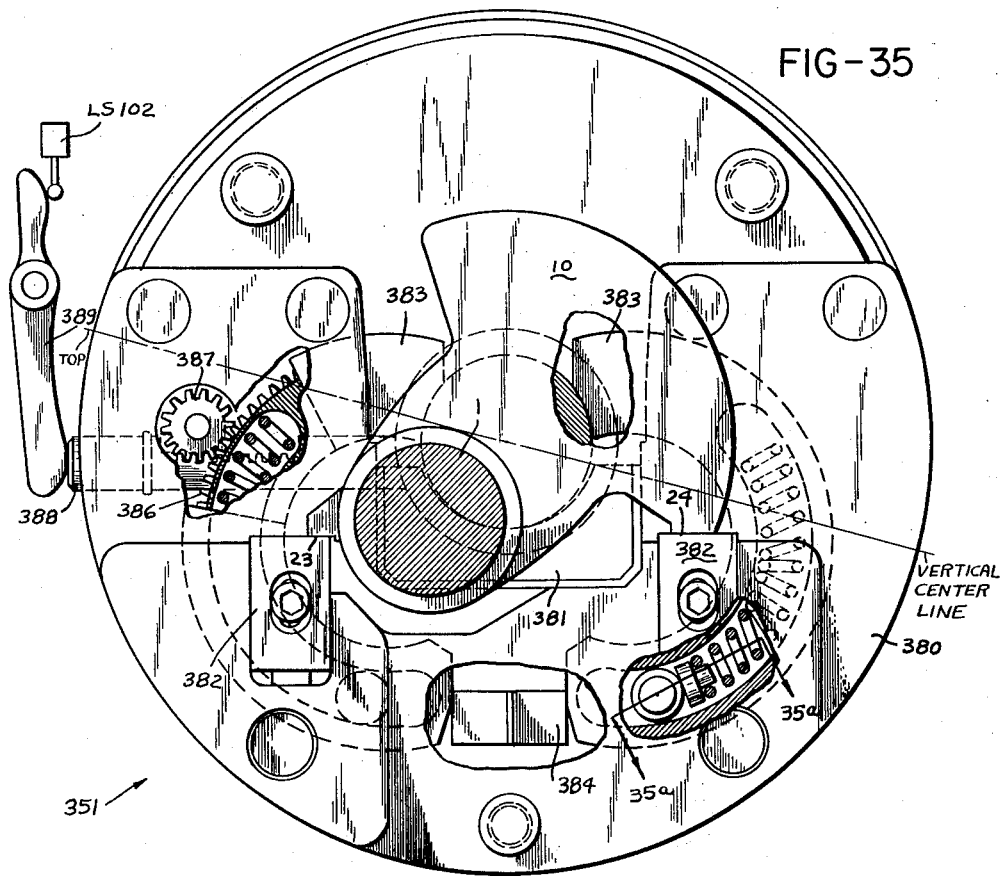
FIG-35
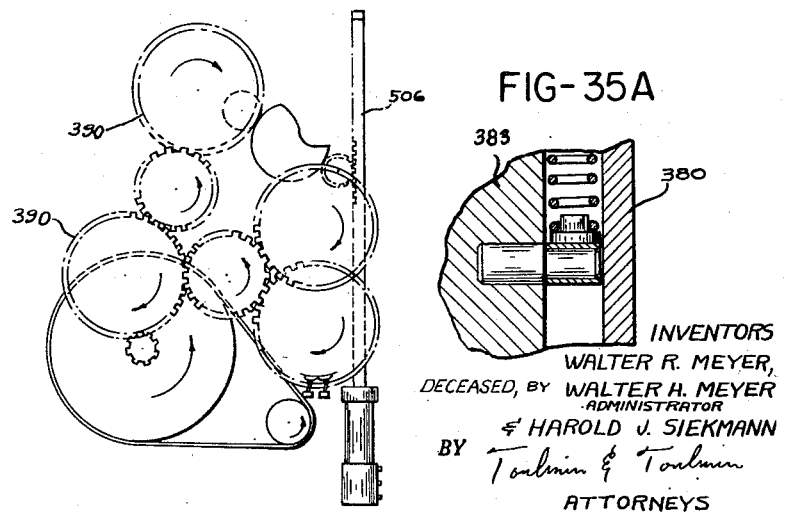
FIG-37
FIG-35A
INVENTORS
WALTER R. MEYER,
DECEASED, BY WALTER H. MEYER
ADMINISTRATOR
& HAROLD J. SIEKMANN
BY Toulmin & Toulmin
ATTORNEYS

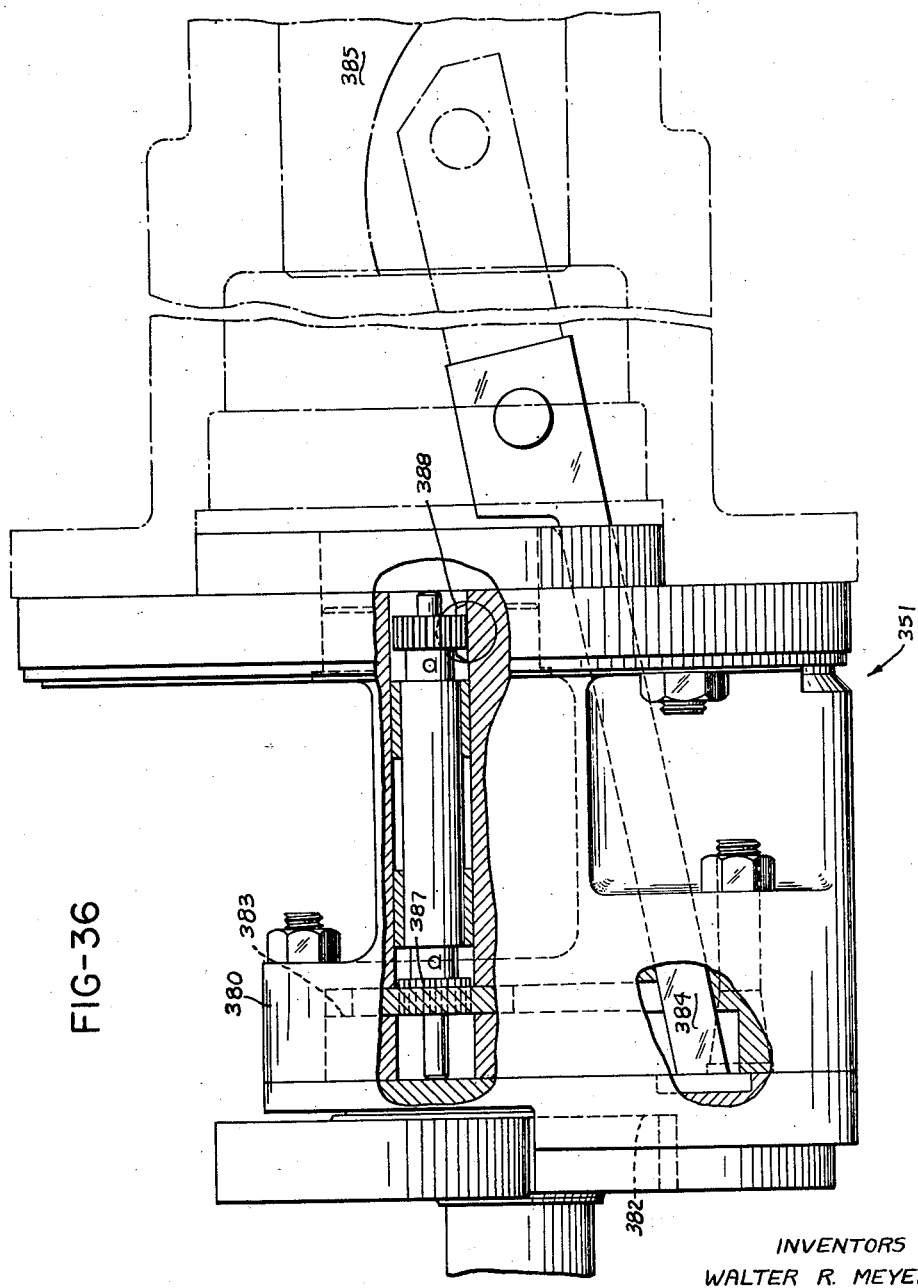

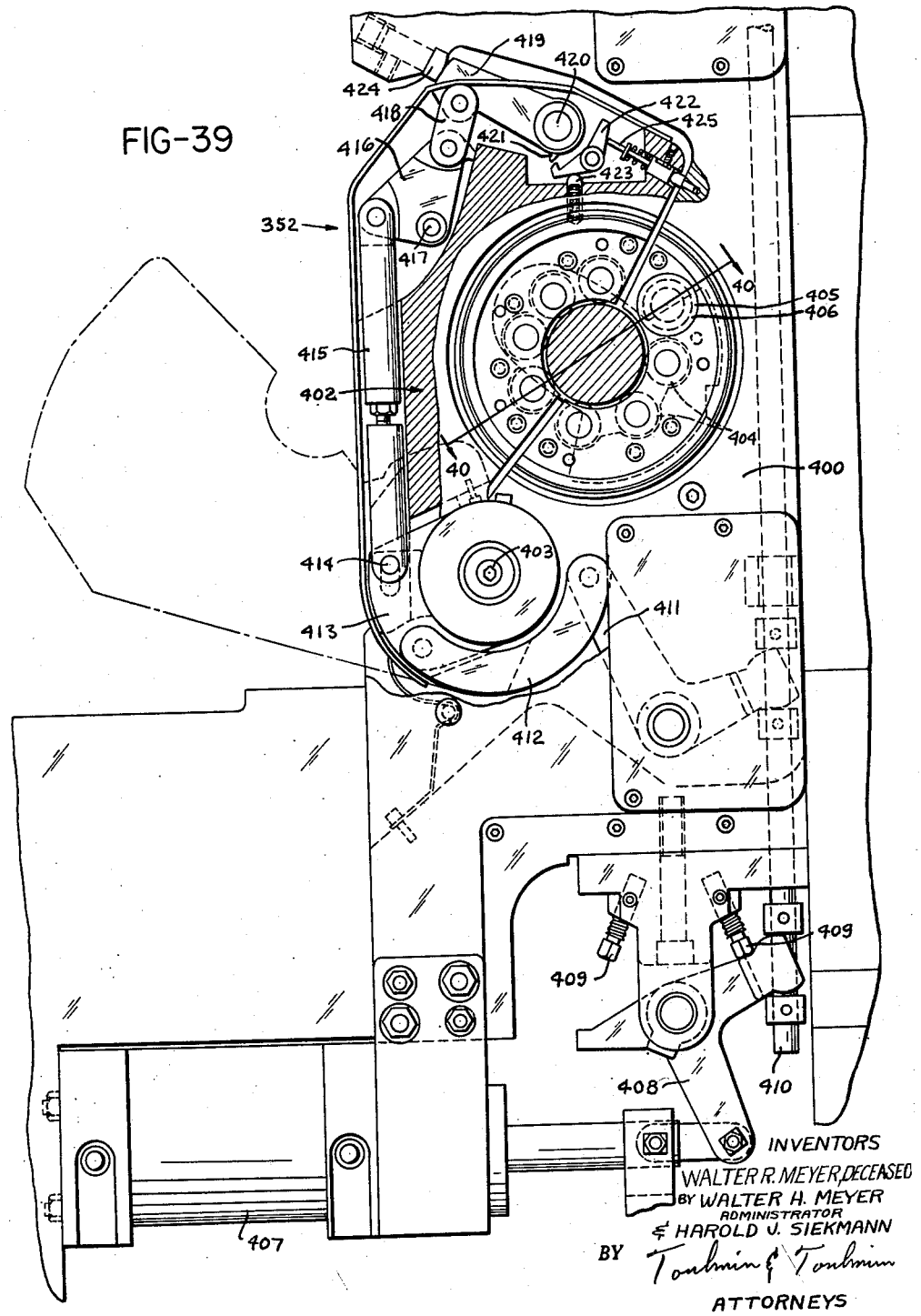

FIG-41

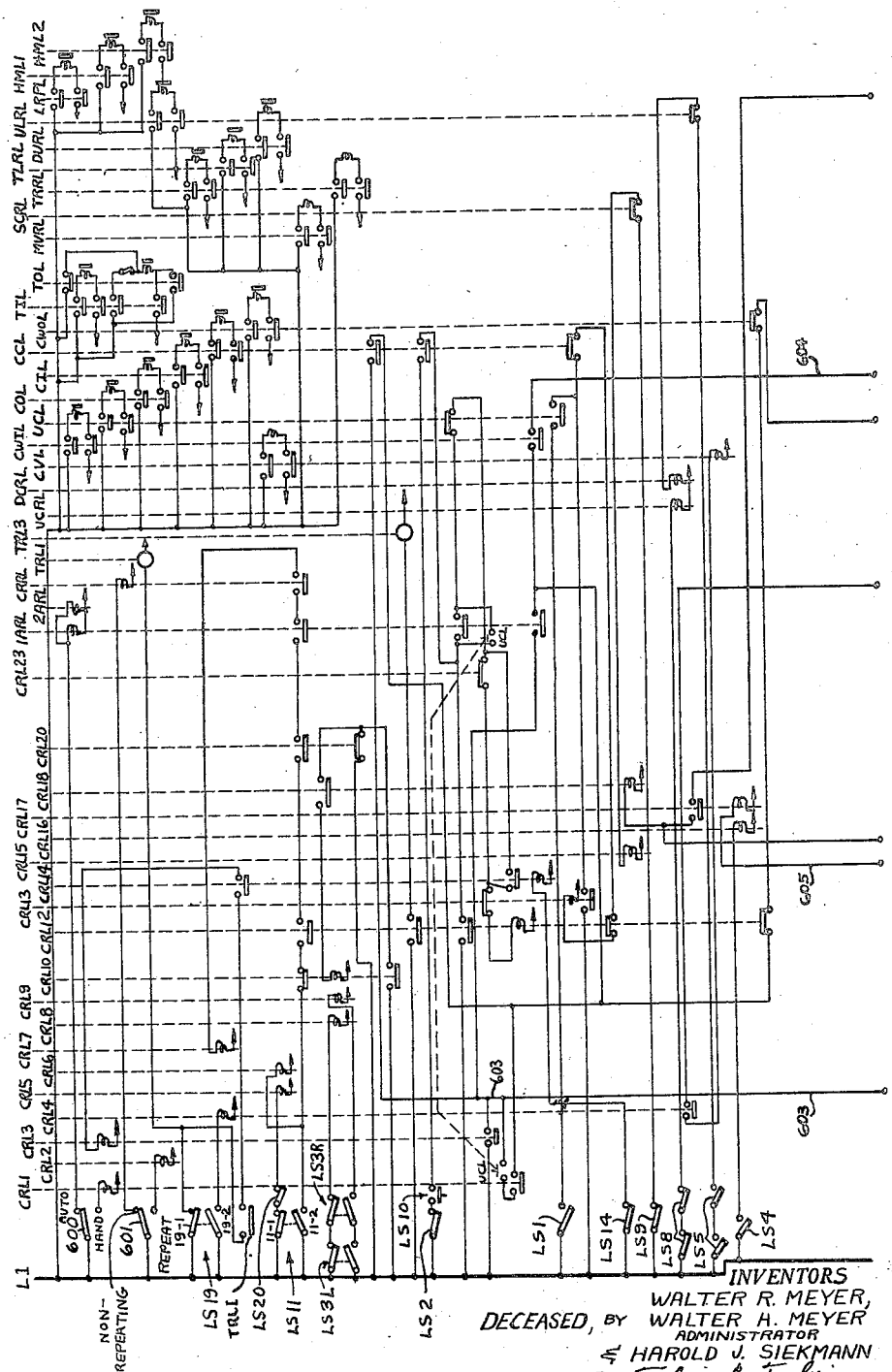

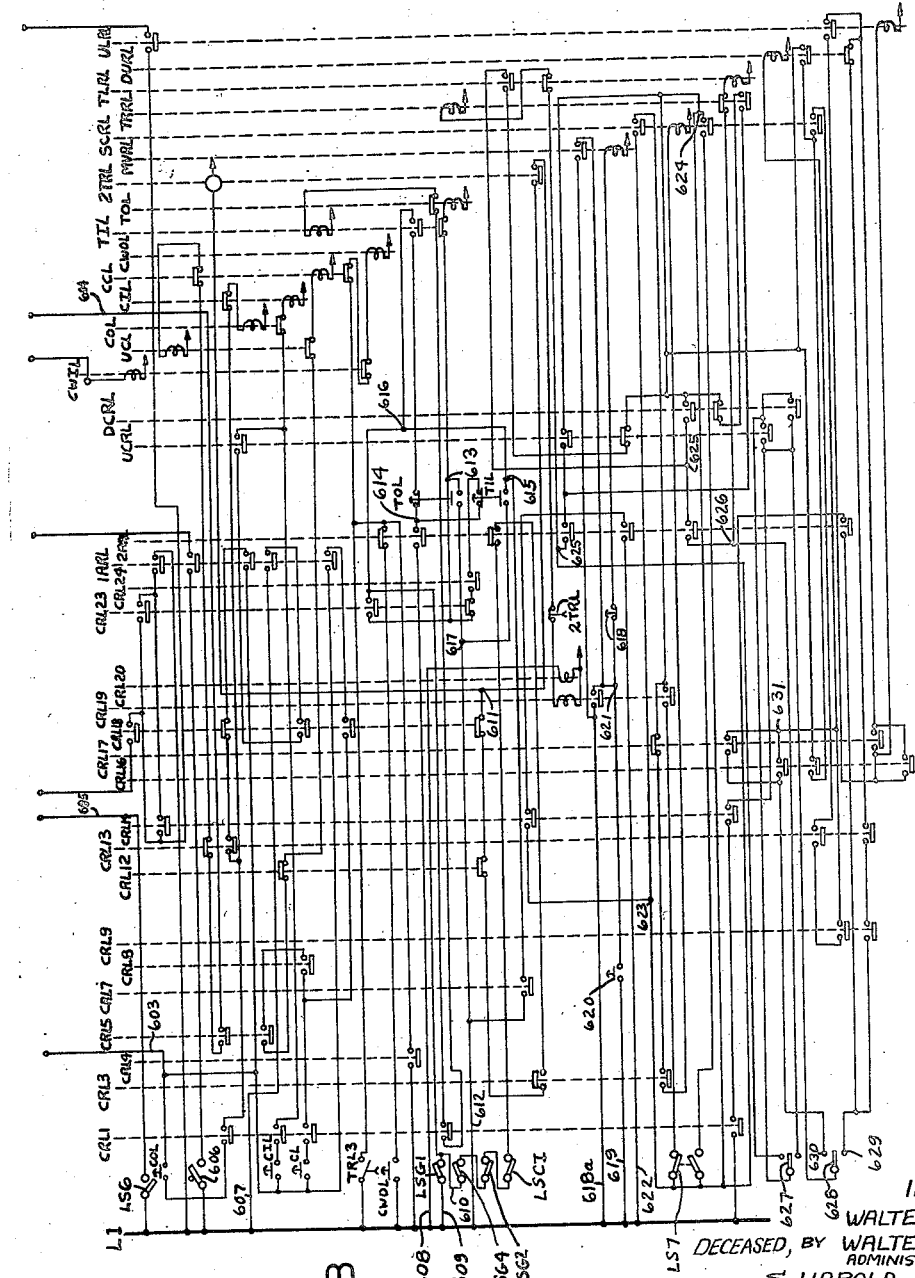

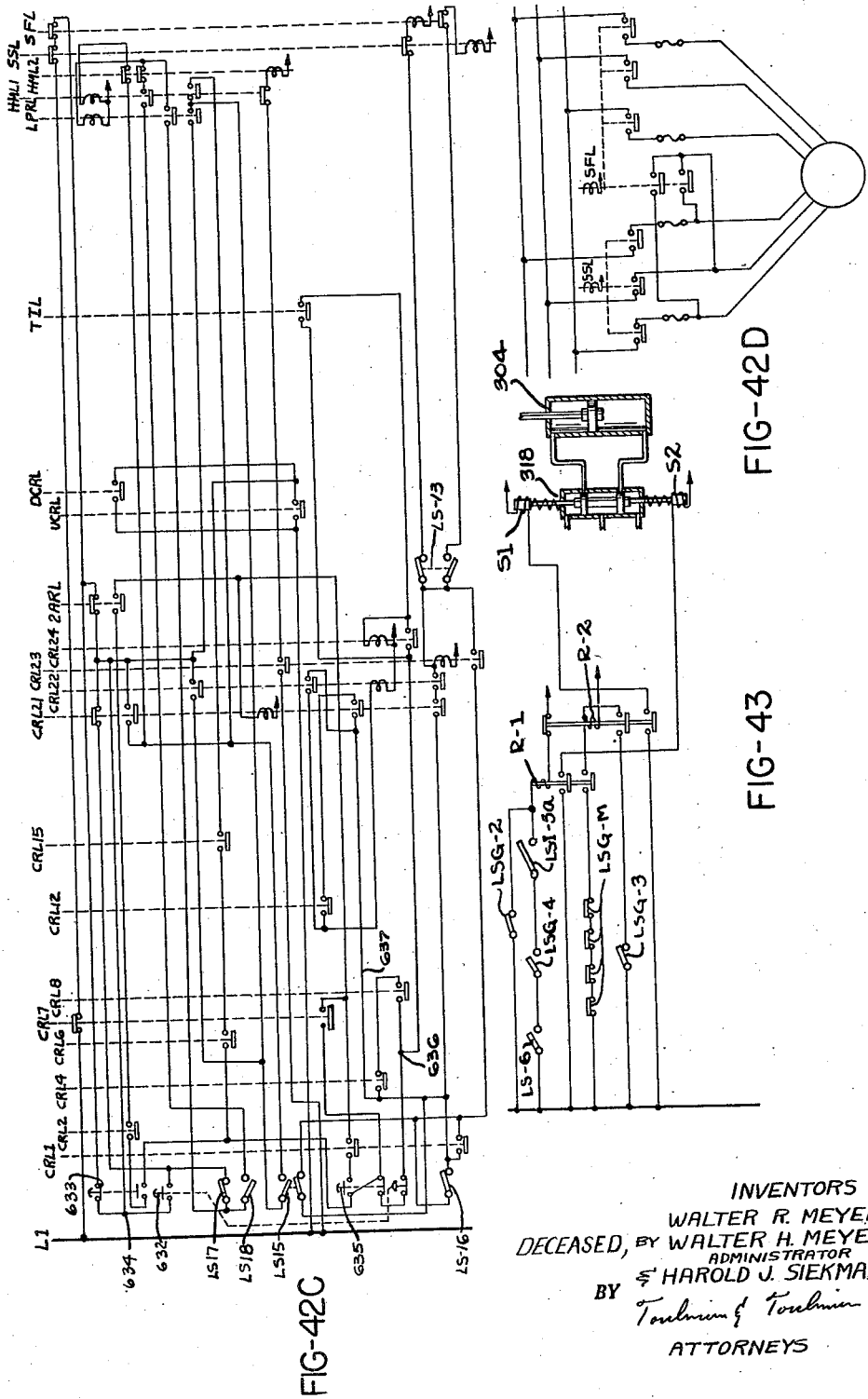

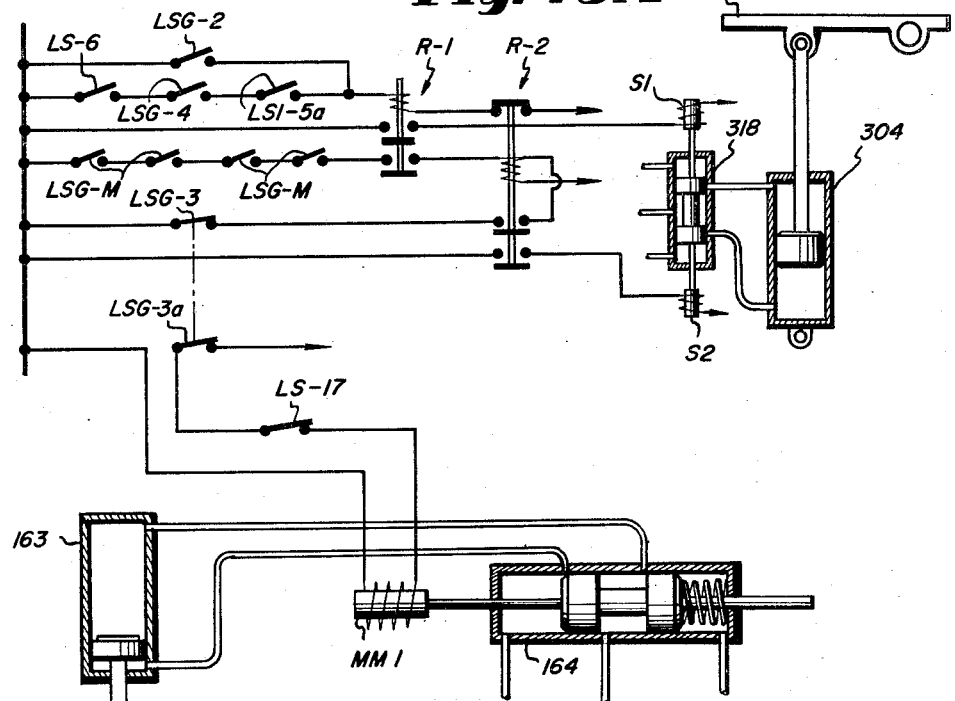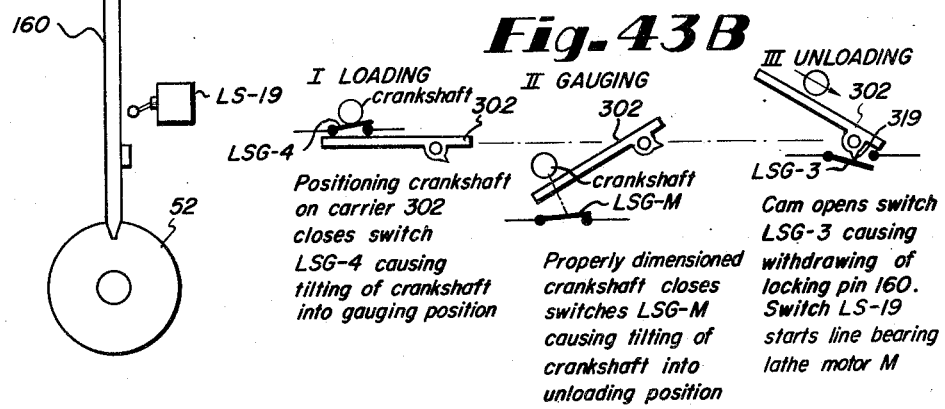

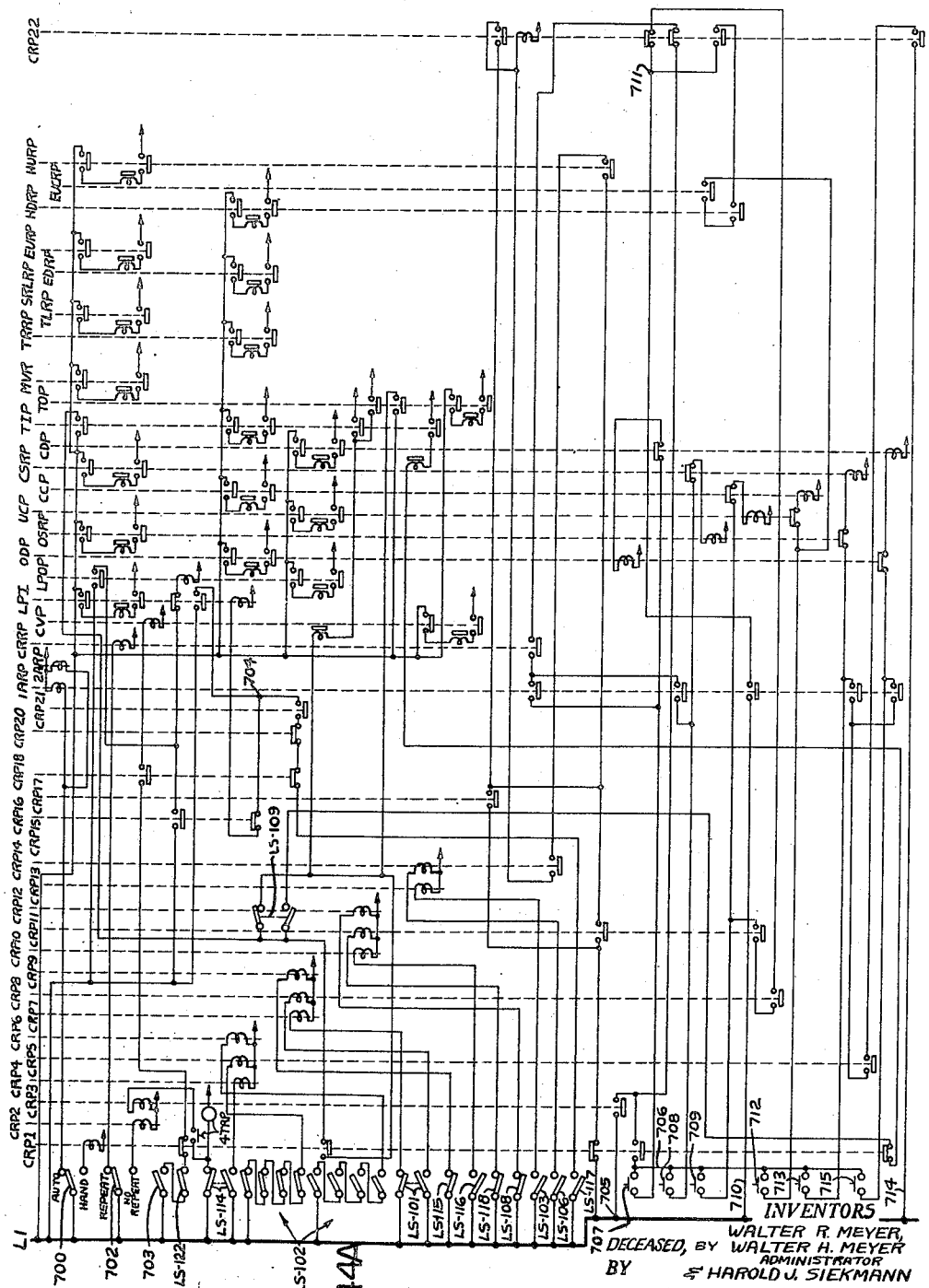

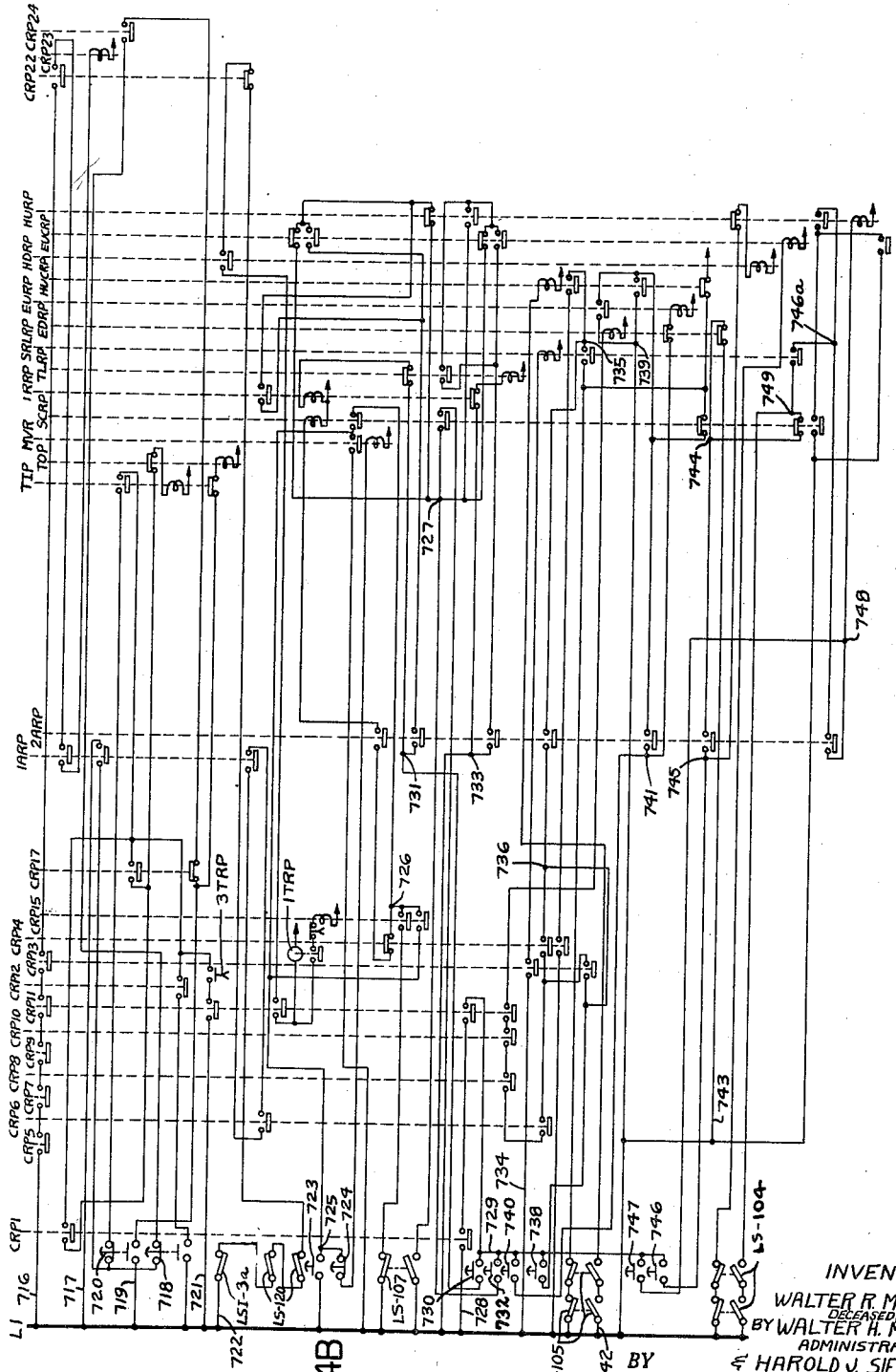

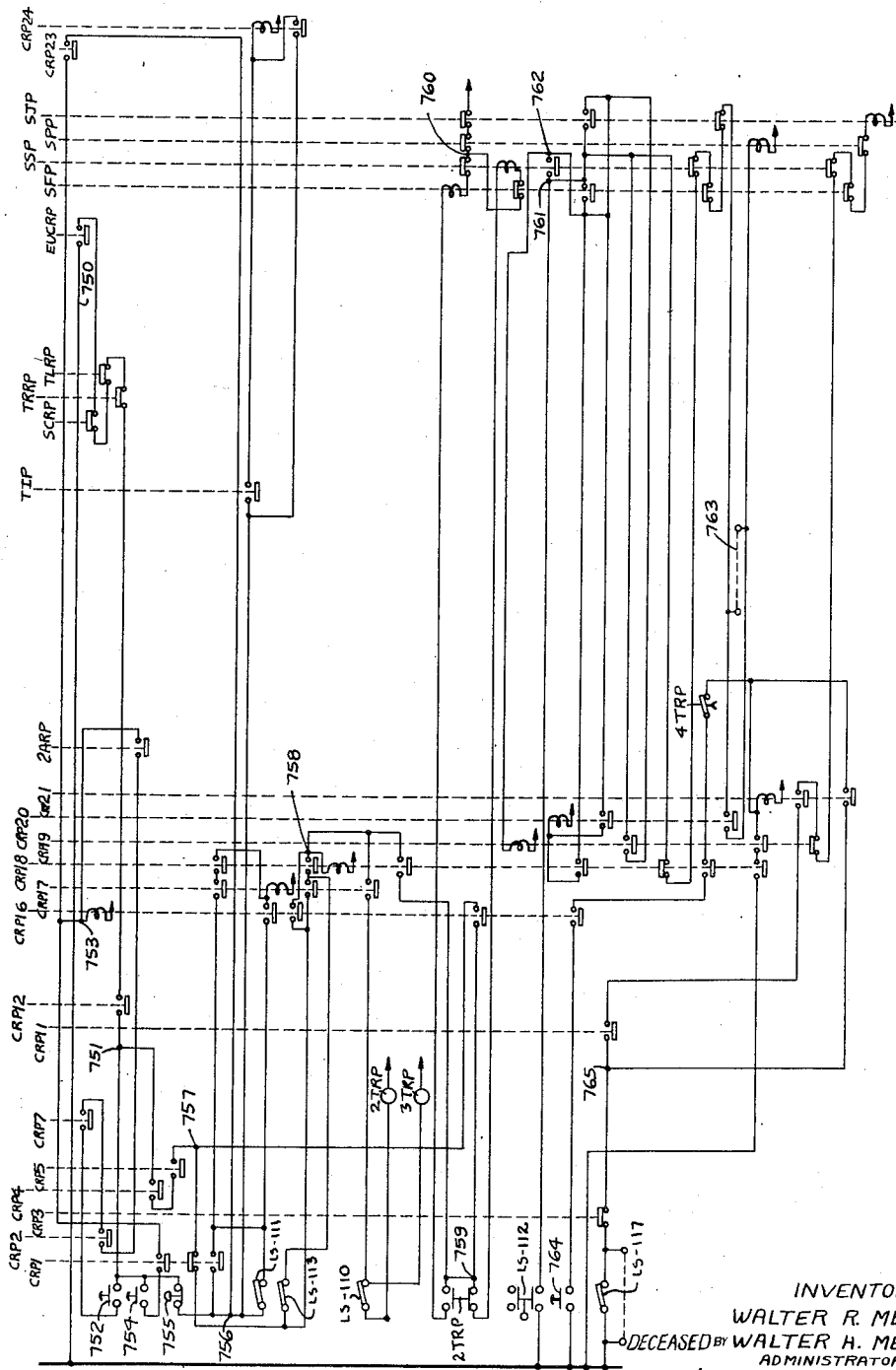

United States Patent Office 2,807,974
Patented Oct. 1, 1957

2,807,974
AUTOMATIC BEARING LATHE

Walter R. Meyer, deceased, late of Cincinnati, Ohio, by Walter H. Meyer, administrator, and Harold J. Siekmann, Cincinnati, Ohio, assignors to The R. K. Le Blond Machine Tool Company, Cincinnati, Ohio Application May 17, 1955, Serial No. 509,073

3 Claims. (Cl. 82—9)

This invention relates to combinations of machines for performing the basic turning operations on crankshafts, and to the individual machines making up the combinations and particularly, to such machines and arrangements thereof when adapted for carrying out a fully automatic cycle.

The present invention is related to the inventions disclosed and described in our co-pending applications, Serial Nos. 509,071 and 509,072.

The particular machining operations carried out on the crankshaft with which the present invention is concerned consist of the turning of the journals and other portions of the crankshaft which are located on the axis of rotation of the crankshaft during a first operation, and the turning of the pin journals of the crankshafts during a second operation, the said pin journals, of course, being off-set from the axis of the crankshaft.

In the arranging of the two basic machines to carry out the turning operations referred to so that a completely automatic work cycle will obtain with no manual handling of the crankshafts being required, the machines must be properly aligned and provided with conveyor mechanisms so that crankshafts delivered to a supply position at one side of one machine will be passed sequentially through the two machines automatically and then automatically delivered to a discharge station on the other side of the second machine.

In addition to the conveying of the crankshafts to and from the machines, the crankshafts must be properly oriented angularly to be received in the chucks of the machines to be supported and gripped thereby during the turning of the portions of the crankshaft to be machined. To provide accurate locating of the crankshafts in the chucks, the crankshafts are provided with pairs of angularly related milled spots positioned on the webs or lobes of the crankshaft and which spots are adapted for engagement by anvils located in the chucks of the machines. In order properly to bring the crankshafts into the chucks so that the milled spots will engage the anvils, it is necessary for the chucks to be stopped in a predetermined position after each operative cycle and for the crankshafts to be conveyed to and from the chucks in properly rotated positions.

The crankshafts must also be centered in the machines so that they will align properly with the tools by which they are turned and each machine thereof includes mechanism for centering the crankshafts and the crankshafts must be so delivered into the machines so as to be in operative position relative to the centering mechanisms.

During a normal full automatic cycle a continuous movement of crankshafts takes place from the incoming supply conveyor through the two machines to the discharge conveyor.

Such a full automatic continuous cycle requires movement of the crankshaft through the two machines at the same overall rates, although not necessarily at the same individual rate. In practice, the first machine is capable of producing finished work pieces at about twice the rate that they can be produced in the second machine, and in order to observe economical practices the crankshafts pass one at a time through the first machine and are then delivered to the second machine in pairs and processed therethrough two at a time.

It will be apparent that in order to maintain this sort of work cycle in continuous operation, there must be a continuous supply of crankshafts to the incoming supply station and a continuous movement of crankshafts out of the outgoing discharge station with the crankshafts moving through and between the machines in regular and continued order. Any failure of the crankshafts to follow this ordered movement will necessitate interrupting the entire work cycle. It has therefore been found that to provide proper conditions for maintaining the machine arrangement in continuous automatic operation, certain interlocks are necessary which take the form of switch means to sense the presence or absence of crankshafts at certain points along the path which they follow during the processing thereof. Thus, if a crankshaft is absent from the incoming supply conveyor, the load conveyor for the first machine will not operate, whereas if there are crankshafts present on the outgoing discharge conveyor that should be removed therefrom, the load conveyor for the second machine in the arrangement will be prevented from operating.

Similarly, the failure of a crankshaft to be delivered to the discharge station of the first machine or removed from that station, or the failure of the crankshafts to be delivered to the supply station of the second machine, or to be removed therefrom, will prevent further cycling of the load conveyors and, therefore, of the machines pertaining thereto.

The described series of interlocking limit switches which are sentive to the presence and absence of crankshafts therefore maintains the conveyor system in full automatic operation so long as the crankshafts follow their proper paths and in the proper order.

The movement of the load conveyors for the machines are further availed of for initiating operation of the machines pertaining thereto so that after a crankshaft has been delivered to a machine and the load conveyor for that machine has been retracted to a position of rest, the machine will then continue to carry out an operative work cycle on the crankshaft so delivered thereto.

Upon completion of the operative work cycle, the machine then initiates a new cycle of operation of the load conveyor pertaining thereto.

The individual work cycles of the machines are carried out by the sequential actuation of a plurality of components thereof, such as the means for positioning the chucks, the lock members therefor, the centering mechanisms by means of which the crankshafts are located axially on the work axes of the machines, the clamping devices by means of which the crankshafts are clamped in the chucks, and the tool feed means which feeds the cutting tools into the crankshafts. These components are hydraulically actuated and are controlled by electrically operated valves which are, in turn, controlled by an electric circuit that includes limit switches sensitive to the positions of the various components for controlling the energization of the valve pertaining to the component that carries out the next succeeding step in the work cycle.

The primary object of this invention is the provision of an arrangement of two or more machines for maintaining a continuous work cycle while preventing the cycle from continuing upon the failure of any operative step to be carried out or upon the failure of a work member being operated to take the proper movements.

A particular object of this invention is the arrangement of two or more machines which do not necessarily operate at the same rate of speed in a production line with suitable interlocks and automatic conveying mechanisms therefor such that full automatic operation of the two machines in unison will be had so long as the supply of work pieces to the first machine continues and the work pieces take their proper ordered movement through the machines.

A still further object is the provision, in connection with a compound machine arrangement of the nature referred to together with conveying means therefor, of interlocks and controls which provide for shutting down the entire mechanism upon the carrying out of a faulty work operation, or upon failure of work pieces to take their proper movement.

A still further object is the provision, in a full automatic arrangement in the nature referred to, of an arrangement whereby the movement of the conveyors that convey the crankshafts into the machines provides for initiation of an operative cycle of the machines and with the termination of the operative cycle of each machine initiating operation of the conveyor pertaining thereto.

A still further object is the provision of a full automatic arrangement for machining crankshafts in which the approach of rough crankshafts on the incoming supply conveyor and the discharge of finished crankshafts from the outgoing discharge conveyor controls the crankshaft conveyors for the machines with the crankshaft conveyors initiating work cycles of the machines and with the termination of the work cycle of the machines again initiating operation of the crankshaft conveyors.

These and other objects and advantages of this invention will become apparent upon reference to the following specification taken in connection with the accompanying drawings in which:

Figure 1 is a perspective view of a typical crankshaft adapted for being machined according to the present invention;

Figures 2 through 5 showing the crankshaft at various stages during the operation thereof;

Figures 6 through 9 are sectional views indicated by correspondingly numbered section lines on Figures 2 and 5;

Figure 12 is a front elevational view of the machine in which the line bearings of the crankshaft are turned;

Figure 13 is an elevational view of the line bearing machine looking in from the right end of Figure 12;

Figure 14 is a plan view of the line bearing machine;

Figure 15 is an elevational view showing the loader for the line bearing machine that carries crankshafts to and from the work axis of the machine;

Figure 19:
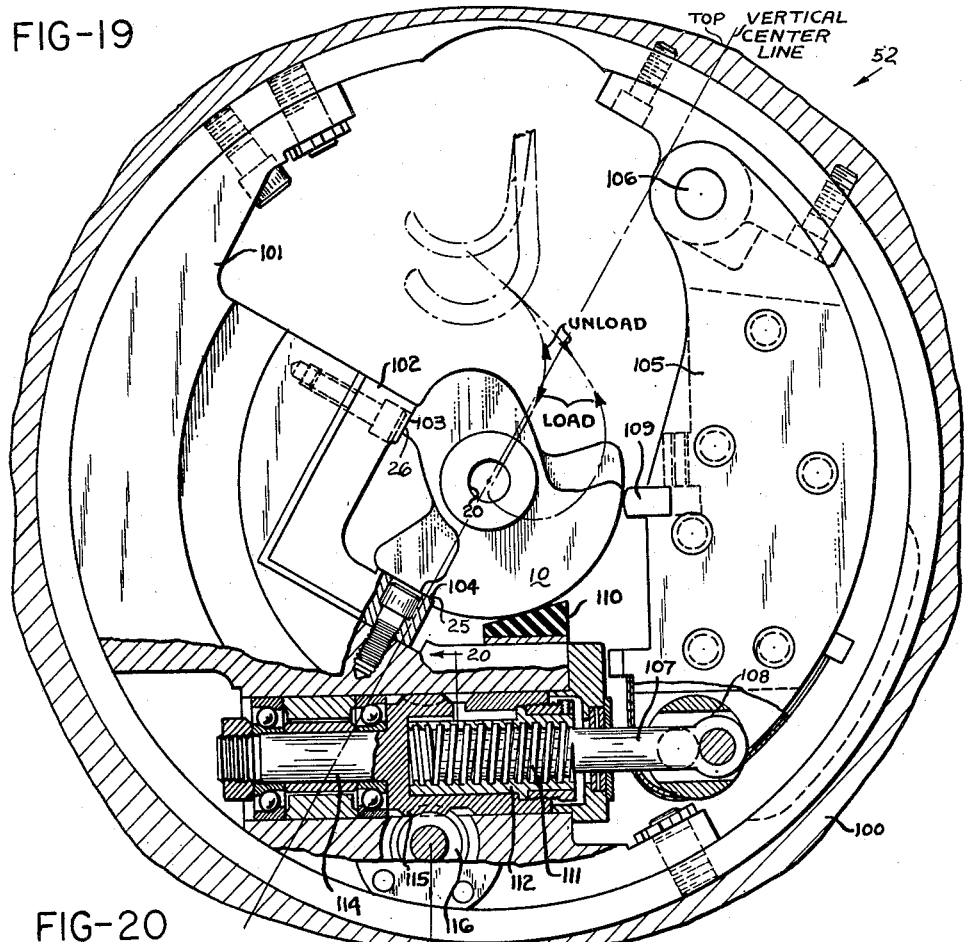
Figure 20:
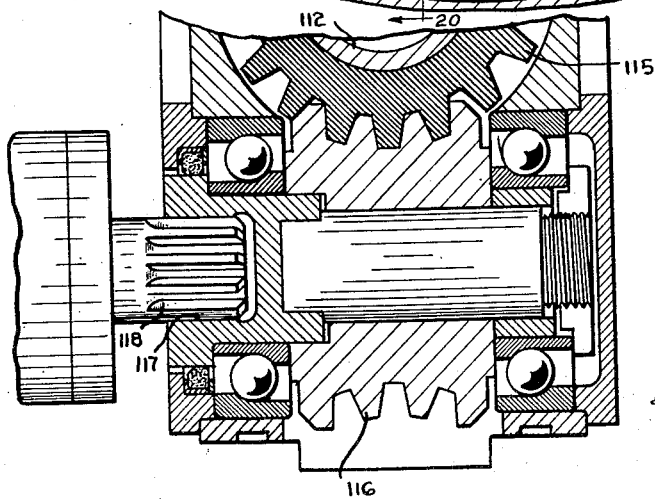
Figure 22A:
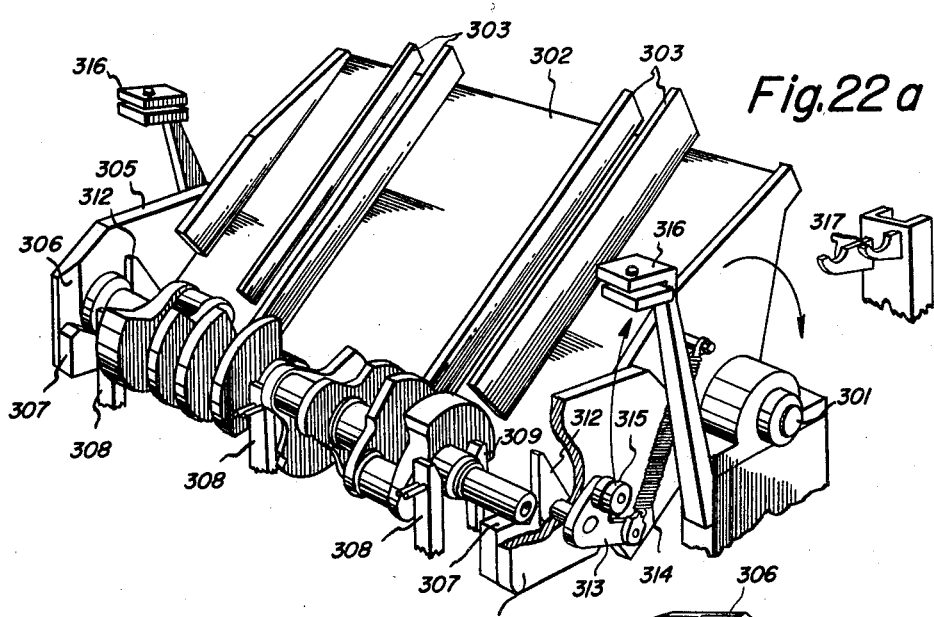
Figure 22B:
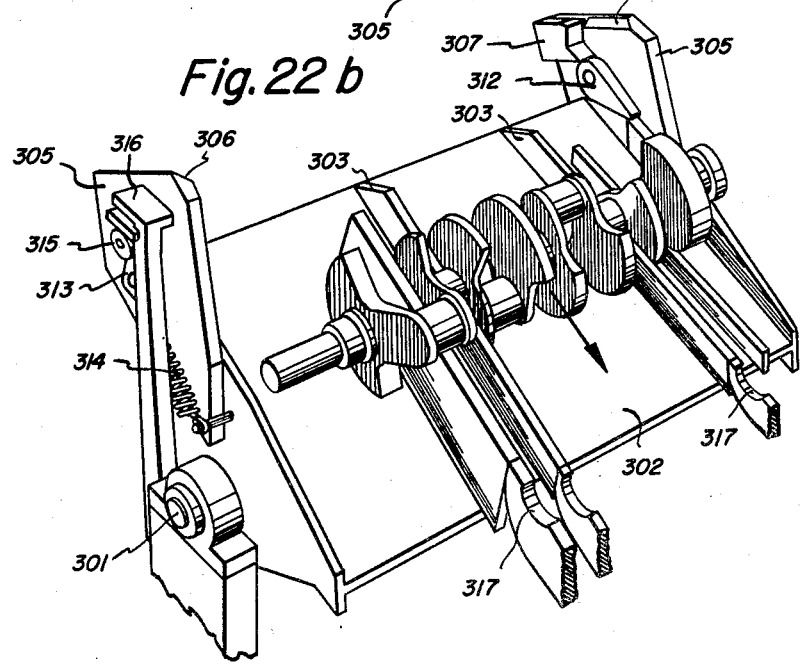

Figure 15-A is a plan view showing the left end of the loader;

Figure 16 is a side view of one of the carriages of the loader;

Figure 17 is a view showing one of the loader hooks;

Figure 18 is a perspective view showing the lower end of one of the loader hooks;

Figure 19 is a sectional view indicated by line 19—19 on Figure 12 showing the chuck of the line bearing machine;

Figure 20 is a sectional view indicated by line 20—20 on Figure 19 showing the drive for opening and closing the chuck;

Figure 21 is a diagrammatic showing of the hydraulic operating circuit of the line bearing machine, and the location of the limit switches that interlocks the several machine functions;

Figure 22 is an end elevational view of the gauge to which crankshafts are delivered from the line bearing machine;

Figure 22a is a perspective view of the tiltable carrier in gauging position and showing a crankshaft being gauged;

Figure 22b is a similar perspective view as in Figure 22a, and illustrating the tiltable carrier in unload position and the crankshaft sliding to the intermediate conveyor;

Figure 22c is a schematic view of the tiltable carrier and illustrating the positions of the carrier and crankshaft and showing the different positions of crankshaft during unloading of the same to the intermediate carrier.

Figure 38:
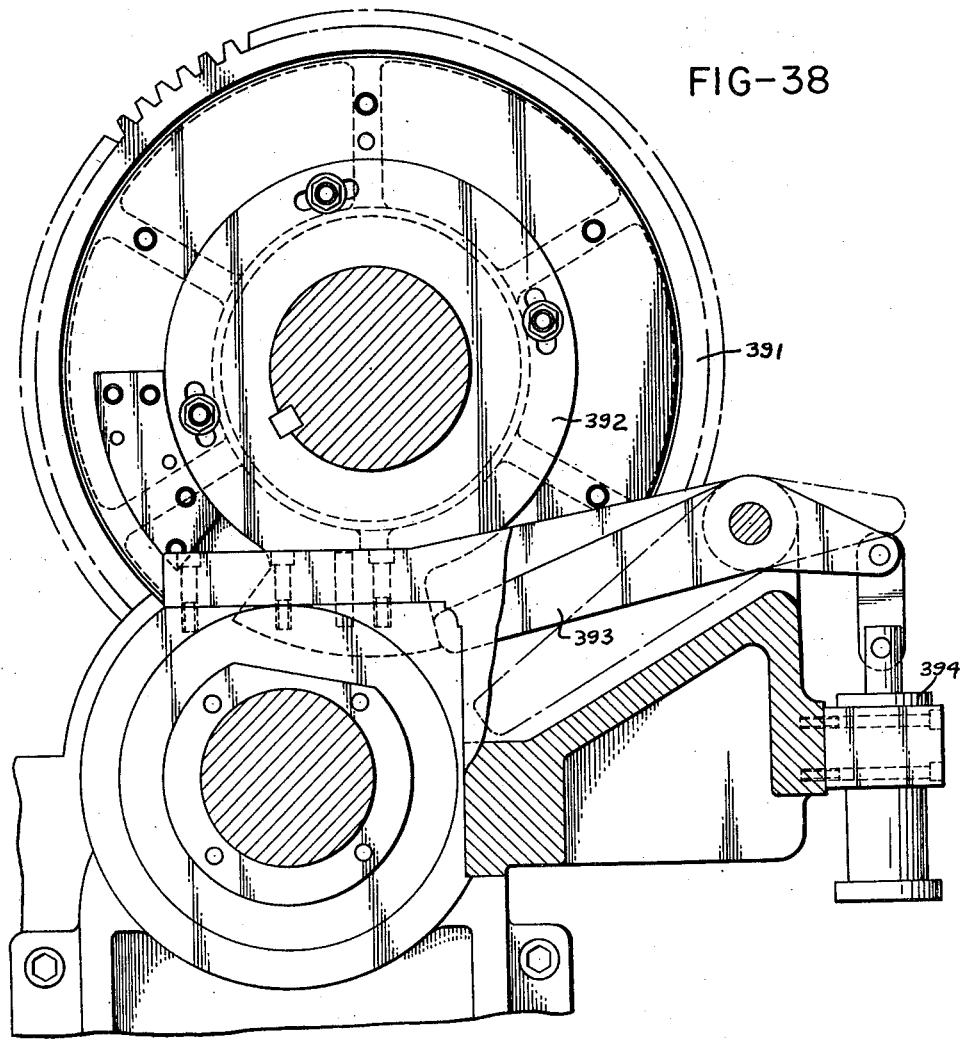
Figure 25A:
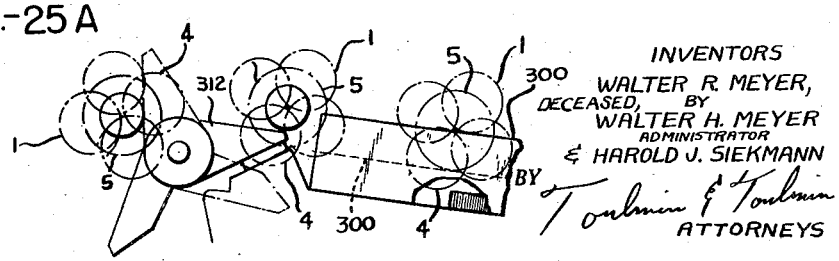

Figure 23 is a plan view of the gauge;

Figure 24 is a front elevational view of the gauge;

Figure 25 is a sectional view indicated by line 25—25 on Figure 24 showing one of the gauging stations of the gauge;

Figure 25-A is a diagrammatic view showing how a crankshaft is rotated in leaving the gauge;

Figure 26 is a perspective view showing an intermediate conveyor for crankshafts from the gauge and carrying them into position to be picked up by the loader for the pin machine;

Figure 27 is a diagrammatic layout of the control system for the intermediate conveyor;

Figures 28, 29 and 30 are plan, left-end, and front views respectively of the machine in which the pin bearings of the crankshafts are turned;

Figure 31 is a partial plan view of the pin bearing machine loader indicated by line 31—31 on Figure 29;

Figure 32 is a front view of the structure shown in Figure 31;

Figure 33 is a sectional view indicated by line 33—33 on Figure 32;

Figure 34 is a side view of one of the loader carriages of the pin bearing machine loader;

Figure 35 is a view of one of the chucks of the pin bearing machine and is indicated by line 35—35 on Figure 29;

Figure 35-A is a sectional view indicated by line 35-a—35-a on Figure 35 showing how the clamp members of the chucks are spring urged toward open position;

Figure 36 is a side view of the chuck of Figure 35 showing the mechanism for opening and closing the chuck;

Figure 37 is a diagrammatic view of the drive for the spindles of the pin bearing machine;

Figure 38 is a view showing a lock pin arrangement for halting the spindles of the pin bearing machine in a certain predetermined position.

Figure 39 is a view indicated by line 39—39 on Figure 29 showing a steady rest structure located between the chucks thereof;

Figure 40 is a sectional view indicated by line 40—40 on Figure 39 showing how bearings in the steady rest engage line bearings of the crankshafts in the pin bearing machine;

Figure 41:
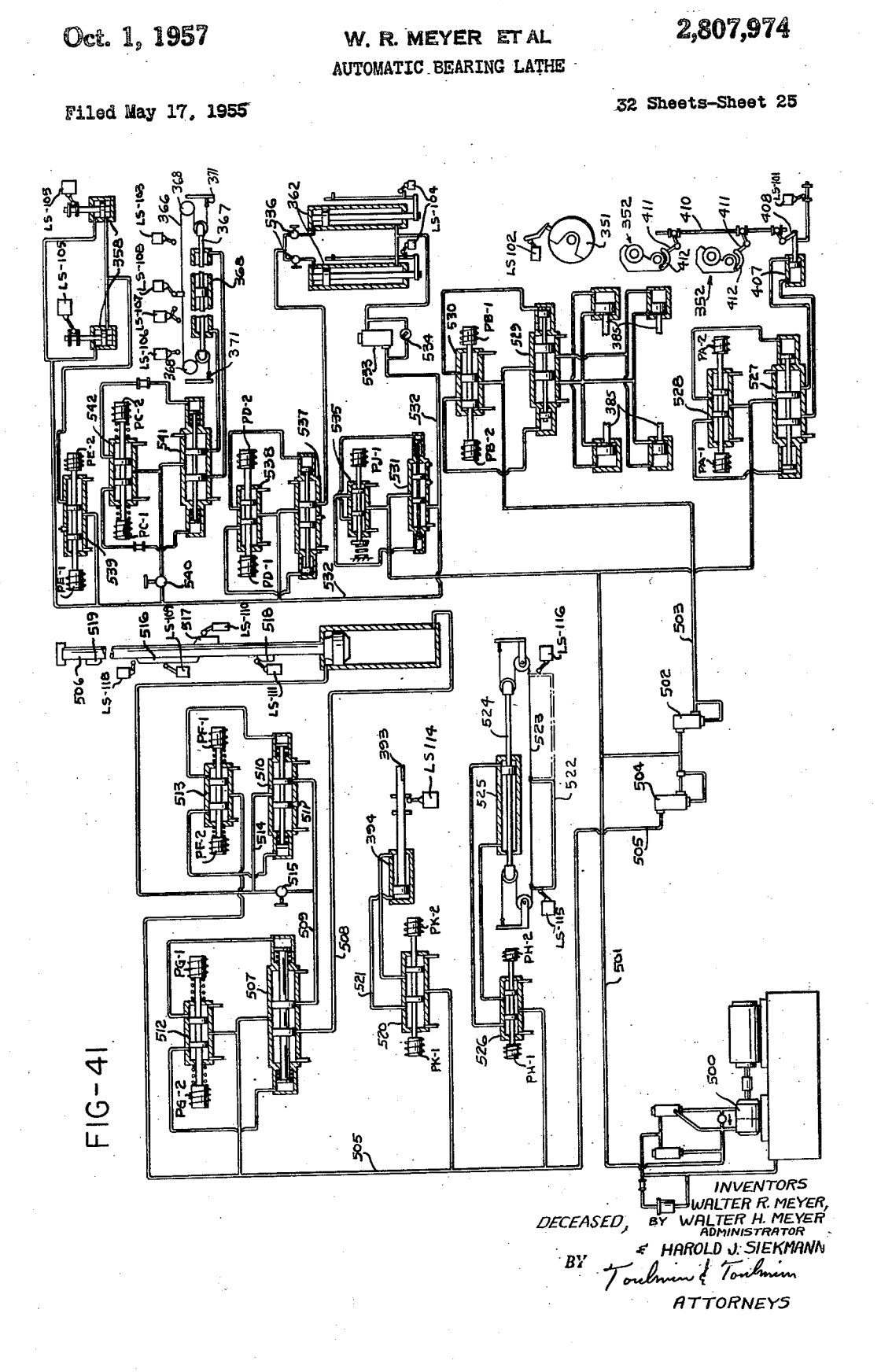

Figure 41 is a diagrammatic view of the hydraulic circuit of the pin bearing machine;

Figures 42-A, 42-B, 42-C and 42-D are diagrammatic views showing the electric control circuit of the line bearing machine;

Figure 43 is a diagrammatic view of the electric control circuit for the gauge;

Figures 43A and 43B illustrate diagrammatically the interlocking of the lathe chuck with the gauging mechanism;

Figures 44-A, 44-B, 44-C, and 44-D are diagrammatic views showing the electric control circuit of the pin bearing machine.

*The work member and general description of work process*

Referring to the drawings somewhat more in detail, Figure 1 shows a typical work member adapted for being automatically machined and conveyed according to the present invention. This work member is a crankshaft having four throws thereon indicated at 1, 2, 3, and 4, with there being intervening line bearings at 5, 6, and 7, and with other line bearings at 8 and 9, at the ends of the crankshaft.

Web or lobe portions are located between the line and pin bearings serving to interconnect the said bearings and also to counterbalance the off-center masses associated with the crankshaft. These webs or lobes are indicated at 11, 12, 13, 14, 15, 16, and 17.

According to this invention the lobes are also availed of for gripping and driving the crankshaft during the machining operations carried out thereon, as by means of spots milled on the lobes of the crankshaft, which will be described hereinafter in more detail.

For carrying out the first basic machining operation, which is a turning operation on the line bearings and aligned surfaces, the crankshaft is gripped and supported by centers engaging the ends thereof and by chuck means engaging one or more of the lobes of the crankshaft so that the crankshaft can be rotated on its axis and cutting tools brought into engagement with the line bearings and aligned surfaces.

The second basic machining operation on the crankshaft, consisting of turning the pin bearings, is carried out in what is known as an orbital lathe in which there is a cutting tool means for each pin bearing that follows an orbital path corresponding with the orbital path which the pertaining pin bearing follows when the crankshaft is rotated on its axis so that the several pin bearings can be turned down by one chucking of the crankshaft.

During both of the turning operations the crankshaft is supported, aligned and driven by engagement with the milled spots on the lobes thereof. It will also be evident that the crankshaft must at all times be perfectly oriented with the machine in which it is being operated, and that the crankshaft must be presented to the conveyer that delivers it to the machine in which it is operated in a properly oriented position properly located axially and traversely.

The angular orientation of the crankshaft is accomplished by engagement of the pin bearing portions thereof by rails forming a part of the incoming conveyer as the crankshaft approaches the loading side of the first machine. This conveyer also locates the crankshaft axially and traversely relative to the work axis of the machine.

With the crankshaft properly located relative to the work axis of the first machine, a transfer conveyer engaging at least some of the pin bearing areas of the crankshaft will convey it into the chuck of the machine and deposit it therein on the milled spots referred to, whereupon the crankshaft is exactly oriented axially and angularly relative to the chuck and tools of the machine which are so arranged that they always stop in a predetermined position.

According to this invention, this orientation of the crankshaft is maintained during a gauging operation after the first machining operation, and also while the crankshaft is automatically delivered to the second machine where a second machining operation is carried out.

The crankshaft of Figure 1 is preferably a cast member of modular iron arrived at by making the casting in a mold of resin bonded sand. This produces an extremely accurate casting having the advantages of requiring a minimum amount of balancing, a minimum amount of machining to prepare the surfaces to be machined, and also having a particular advantage in that the various webs and counterbalancing lobes of the crankshaft require no side facing or cheeking.

The crankshaft, after it comes from the mold in the form of a rough casting, is prepared for being handled in the automatic arrangement of the present invention by being milled to length, by having the ends centered, and by having predetermined locating and driving spots milled on certain ones of the lobes thereof.

Figures 2 and 3 will show that the crankshaft has a center 20 drilled in one end thereof and a center 22 drilled in the other end thereof. Center 22 is formed so as to be a predetermined distance X from the center line bearing 6, as indicated by the dimension line.

In addition to the centering of the crankshaft as described, certain of the lobes thereof are also provided with milled spots arranged at predetermined angular positions about the axis of the crankshaft, as indicated by Figures 6 through 9, which are represented as sections on Figure 2.

These milled spots consist of the spots indicated at 23 and 24 in Figure 6; at 25 and 26 in Figure 7; at 27 and 28 in Figure 8; and at 29 in Figure 9. These are the spots that are availed of for locating the crankshafts in the chucks in the machines and for gripping and rotating the crankshafts in the machines.

After the crankshafts have been centered and the milled spots formed thereon and then conveyed into the first machine, a turning operation is carried out theron which is, in part, indicated in Figure 4. This operation consists of turning the line bearings of the crankshaft and the other surfaces along the crankshaft that are concentric with the axis of rotation of the crankshaft that are to be finished.

Tools that carry out this turning operation are divided into two general groups; one group of which is indicated by reference numeral 30 above the crankshaft, and the other group represented by reference numeral 31 below the crankshaft. These tools are fed into the crankshaft in opposite directions thereby minimizing lateral thrusts on the crankshaft, speeding up the turning thereof, and distributing the load amongst the several tools. A finish cut is taken on at least some of the surfaces being turned in Figure 4 by other tool means not illustrated.

In the second machine to which the crankshaft is conveyed, after the operation diagrammatically depicted in Figure 4 is carried out, the turning operations on the several pin bearings of the crankshaft is accomplished. This turning of the pin bearings is accomplished by the tools indicated at 32 above the crankshaft in Figure 5 and at 33 below the crankshaft.

After the turning operation referred to in Figure 5, the crankshaft is discharged from the machine and is ready for further operations to be carried out thereon, such as grinding.

In order to establish an integrated automatic cycle, with reasonable assurance that the work members produced during the cycle will be within acceptable limits, the work members are preferably gauged automatically at a point during the cycle, and the delivery of the crankshafts to the machines is so arranged that the machines operate substantially continuously.

Since the pin bearing machines operate more slowly than the line bearing machines, the arrangement is such that the crankshafts are handled one at a time in the line bearing machine, but are handled two at a time in the pin bearing machine.

In order to gauge the crankshafts at a point in the processing thereof, which will prevent needless work being done on reject parts, there is provided a gauging station which receives the crankshafts from the line bearing machine, gauges them, and then discharges the crankshafts to an intermediate conveyor that carries the crankshafts to a position where they will be received by a loader for the pin bearing machine. The movement of the crankshafts from the gauging station to the intermediate conveyor is such that, while the crankshafts are discharged from the gauging station one at a time, the intermediate conveyor conveys the crankshafts two at a time to the pin bearing machine loader.

Any reject received by the gauge is sufficient to interrupt further operation of the line bearing machine, and failure of the gauging station to deliver crankshafts to the intermediate conveyor will bring about interruption of the operation of the intermediate conveyor, and pin bearing machine, whereby the entire operation is brought to a halt upon the turning out of a defective work member.

Figure 10:
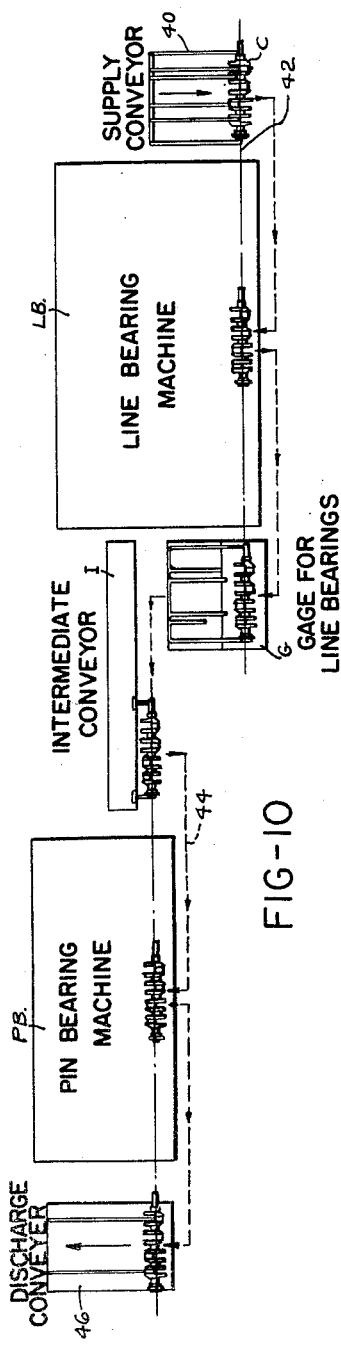
Figures 10 and 11 are plan and elevational view respectively, showing diagrammatically the movement of the crankshafts through the various stations of the machines for a complete cycle.
Figure 11:
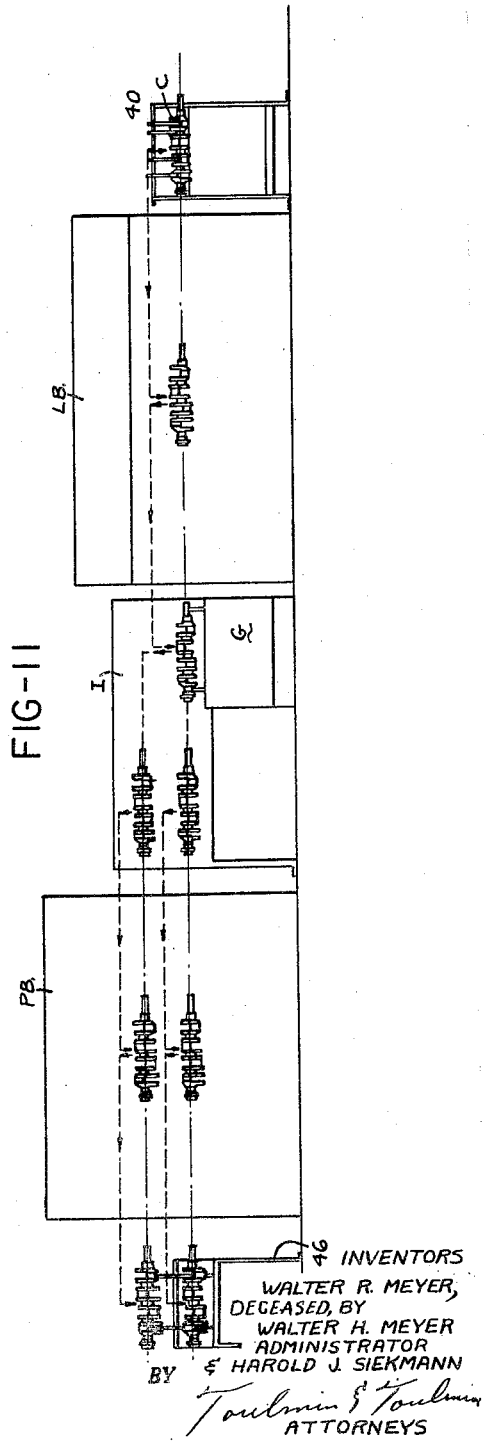

In Figures 10 and 11, the path of the crankshafts is illustrated, with Figure 10 showing a plan view of the arrangement and Figure 11 showing a front elevational view, and with both being diagrammatic.

In Figure 10, there is an incoming conveyor 40 on which the crankshafts C are delivered to an axis 42 in a properly oriented position to be picked up by the loader for the line bearing machine LB. These crankshafts, of course, have been milled to length, centered, and the locating spots milled on the various lobes thereof.

The crankshafts, after being turned in the line bearing machine, are delivered by the load conveyor associated with that machine to a gauging station G where certain ones of the surfaces that have been turned in the line bearing machine are gauged. If the crankshafts are acceptable, they are discharged rearwardly from the gauge to be received by an intermediate conveyor I which conveys them leftwardly to a predetermined position on the axis 44 of the pin bearing machine PB where they can be picked up by the loader for the pin bearing machine.

After the crankshafts have been turned in the pin bearing machine they are then conveyed by the pin bearing machine loader to an outgoing discharge conveyor 46.

As will be seen in Figure 11, the crankshafts C move one at a time along conveyor 40 and into line bearing machine LB, and thence to gauge G, but are received two at a time by the intermediate conveyor I and conveyed two at a time to pin bearing machine PB and delivered to the outgoing conveyor 46 two at a time.

At all times, the crankshafts are maintained in properly oriented and longitudinally located positions, and the entire movement of the crankshafts, from the time they are deposited on the incoming conveyor 40 to the time they are delivered to the outgoing conveyor 46, is automatic and without any manual operations being performed on the crankshaft.

Furthermore, the operation of the conveyors, the gauging, and the turning machines is entirely automatic, integrated through a suitable control system, and provided with the necessary interlocks to produce the desired sequence of operations, suitable manual control means being provided, of course, to initiate operation of the machines, to operate them manually when desired, and to restore the machines to operating condition upon the failure of any component on the production of a reject work-piece.

The line bearing machine

Referring more in detail to the line bearing machine generally designated LB, the structure thereof and the structure of the loader pertaining thereto, is illustrated in Figures 12 through 20.

The line bearing machine generally comprises a frame having therein the spaced centers 50 and 51, between which is located a center drive chuck 52. This machine is a center drive line bearing lathe, with the automatic chuck 52 engaging milled spots on webs or lobes 12 and 13 about pin bearing 2, an auxiliary rest shoe to temporarily support web or lobe 17 before centers 50 and 51 are presented, right and left hand tailstocks, right and left hand tool bar units with suitable roughing tooling, a heavy duty front cradle for finishing tool blocks, and the necessary hydraulic feeding, clamping and jogging devices for their several functions; also a double-carriage automatically-controlled path loader arranged to operate simultaneously for loading and unloading crankshafts, all electrically and hydraulically sequenced for continuous automatic operation until and unless stopped by the operator at will or until interrupted, because of faults detected by the gauging device or other lack of continuing sequence of movement of the crankshafts caused by faulty operation of the automatic devices themselves.

A console type push button operating station 53 is located at the left side of machine with indicating lights for signal of certain conditions throughout the cycle, and selective push buttons and selector switches suitably marked as to their application to the whole operation. Control manually of most of the functions is provided for the convenience of the operator in set-up, tool change, repair, or adjustment of the machine or any of its parts when necessary.

The incoming conveyor 40 may comprise any suitable sort of supporting and conveying means, but for the purpose of illustration, there is illustrated in Figures 12, 13, and 14, a frame having supported on the upper end thereof a plurality of spaced inclined rails 54 which engage the crankshafts thereon on pin and line bearing portions thereof so as to hold the crankshaft in a predetermined oriented position.

At least some of the rails 54 have turned-up end portions 55 which stop the crankshafts on the axis 42 of the line bearing machine. The rails, in engaging the bearing portions of the crankshaft, hold it not only in an angularly oriented position, but also in a position of predetermined axial location.

Line-bearing machine load conveyor

With the crankshafts supported on the incoming conveyor 40, in the manner described, they are in position to be picked up and conveyed by the line bearing machine load conveyor generally indicated at 60, which comprises a transversely extending rail 62 mounted on the upper portion of the machine, as will be seen in Figures 12 and 13. The rail supports a pair of laterally spaced carriages 63 by means of the rollers 64 fixed to the carriage and engaging the top an bottom sides of the said rail. This arrangement is illustrated somewhat more fully in Figures 15 and 15-A.

The carriages 63 are spaced apart exactly the same distance as the working station of the line bearing machine is spaced from the incoming conveyor 40. Each carriage 63 slidably supports an elevator member 65 which has pivoted thereto at the lower end a lift hook 66 that terminates at its lower end in a laterally offset portion 67 from which depend the crankshaft engaging hooks 68 and 69. These hooks are arranged for engaging pin and line bearings of the crankshaft on the incoming conveyor so that the crankshaft can be picked up by the lift hook without changing the angular orientation thereof.

The lift hooks carried by the elevator members 65 follow a circuitous path consisting of the downward and inward movement to locate the hooks behind the crankshaft and upward and outward movement to engage the hooks beneath the crankshaft and lift the crankshaft from its support. This movement is reversed in order to deposit the crankshafts on a support.

For actuating the lift hooks in the described movement the vertically movable elevator member 65 has fixed thereto a bracket portion 70 that carries a rotatable shaft 71 to which is fixed a crank 72 that engages one end of a link 73 that has its upper end fixed at 74 to a pivot point on the pertaining carriage 63.

It will be evident that rotation of shaft 71 and crank 72 will bring about vertical reciprocating movement of elevator member 65 and bracket member 70 on its carriage 63.

For effecting simultaneous swinging movement of the hook members 66, each hook member has an upstanding arm 75 fixed thereto with a roller at its upper end engaging an annular cam track 76 in a rotary cam plate 77 mounted on shaft 71. The cam track is arranged to provide for a path of movement of the lower ends of the hook members, as described above, and which is illustrated in dot-dash outline in Figure 19.

The rotation of shaft 71 is accomplished by a pinion 78 fixed to the shaft that meshes with a rack 79 fixed to ram 80 of a reciprocating fluid motor 81 carried by bracket 70 and having fluid connections leading thereto by way of the flexible conduits 82.

The two carriages 63, which may be identical except for the reversed positions of the left hooks 66 thereon, are maintained in rigid spaced relation to each other on rail 62 by the tie rods 83 extending therebetween.

Also connected with the tie rods intermediate the carriages 63 is a member 84 which serves as an anchor point for the drive cable 85, by means of which the carriages are reciprocated along rail 62. Drive cable 85 may be a steel cable or the like, although it is preferred to employ a chain as the actuating element. Cable 85 is anchored to a lever 86 pivoted in member 84 at 87 and having the spring means 88 serving to urge the lever for a vertical position, but providing resilience for permitting at least a slight over-travel of the drive cable should the carriages encounter resistance or come to a stopped position.

The drive cable 85 extends laterally along rail 62 and passes about supporting idler rollers 89 adjacent the opposite ends thereof. Rearwardly of rail 62 the drive cable passes inwardly toward the center of the machine and about the pulleys 90 mounted on the opposite ends of the ram 91 reciprocable in cylinder 92. Rearwardly of rollers 90 the drive cable again leads outwardly to the stationary adjustable anchor points 93.

The carriages normally are at rest in an intermediate position, and move rightwardly to pick up a rough crankshaft from the incoming conveyor 40, and a turned crankshaft from the chuck; and then move leftwardly to place the rough crankshaft in the chuck and the turned crankshaft on the gauge carriage; and then again move rightwardly to their intermediate rest position.

*Line bearing machine chuck*

The center drive chuck previously referred to is illustrated in Figures 19 and 20 wherein it will be seen to comprise an outer ring 100 within which there is mounted fixedly a part 101 that includes a supporting anvil 102 with accurately located machined surfaces 103 and 104 that engage similarly located milled spots on lobes 12 and 13 of the crankshaft. Also located within the chuck is a swinging arm 105 pivotally supported at 106 and adapted for being drawn toward anvil 102 by a draw bar 107 having a trunnion connection with member 105 at 108.

Member 105 comprises abutment element 109 that engages the lobes of the crankshaft opposite anvil 102 to fixedly clamp the crankshaft within the chuck in engagement with the areas 103 and 104 of the anvil. A resilient support block 110 may be provided on which the crankshaft is set down by the lift hooks prior to the clamping of the crankshaft against the anvil.

The draw bar 107 has a threaded end thereon 111 threadedly engaging a nut 112 which is rotatable but not axially movable within the body of the chuck. Nut 112 is keyed to a rotary member 114 that comprises a wormwheel portion 115 that is engaged by a worm 116 mounted on a lateral axis in the chuck body. The clamping and unclamping of a crankshaft is accomplished by reversibly driving worm 116. This is accomplished by providing the worm with a splined drive socket 117 adapted for engagement by a splined rod 118 upon reciprocation of the latter.

It will be apparent that by stopping the chuck in a predetermined rotated position, the rod 118 can be reciprocated to and from engagement with socket 117 and thereby be availed of for clamping and unclamping crankshaft in the chuck. It will also be noted that the conveyor hooks can enter the chuck axially from either end.

Various other details of construction of the line bearing machine will become apparent from the following description of the hydraulic control circuit.

*Hydraulic circuit for line bearing machine*

Figure 21 diagrammatically discloses the hydraulic control circuit for the line bearing machine and the load conveyor associated therewith, together with the location of several of the limit switches forming a part of the electric control circuit.

The hydraulic circuit comprises a source of fluid pressure in the form of a low pressure high volume pump 120 and a high pressure low volume pump 122, which have their discharge sides interconnected via check valve 123 to a pressure manifold 124 leading to the several separate components making up the hydraulic system. Each pump has associated therewith a relief valve 125 set at a predetermined discharge pressure.

*Tool feed circuit*

One portion of the hydraulic circuit comprises the feed circuit which is for the purpose of driving the tools to and from the work. The tools are mounted on the upper tool bar 126 and lower tool bar 127, which are driven toward and away from the axis 42, on which the crankshaft is mounted, by a cam arrangement generally indicated at 128 and more fully disclosed in the Meyer et al. Patent No. 2,473,108.

A shaft 129 drives the cam bar slide longitudinally and includes a pinion 130 engaging the feed rack 131. This feed rack also has teeth engaging a pinion on a shaft 132 which is arranged to drive a cam 133 in rotation for tilting a heavy tool cradle 134 toward and away from work axis 42, and on which cradle there are mounted finishing tools.

The rack 131 is driven by means of gearing 135 by a ram 136 forming a part of a feed motor having a cylinder 137. Ram 136 has associated therewith cams 138, 139, 140, and 142 which are arranged for actuating the limit switches LS-12, LS-13, LS-14 and LS-15 that control the rate of feed and various other related functions.

LS-14 is closed when the tools are out to stop tool retraction;

LS-15 is closed when the tools are in to stop tool advance;

LS-12 is closed when the tools are partway in to initiate the feed stroke; and

LS-13 is closed near the end of the feed stroke to slow down the spindle and initiate a dwell.

The supply of actuating fluid to the opposite ends of cylinder 137 is under the control of a pair of valves 143 and 144.

A pressure conduit 145 connects pressure manifold 124 with a port in the casing of the valve 143. This valve comprises a valve member 146 normally urged upwardly by a spring and adapted for being moved downwardly to a second position upon energization of a solenoid HH-1. Valve 144 likewise comprises a valve member 147 normally urged toward its upward position by a spring and adapted for being moved downwardly by a solenoid HH-2.

In the drawing both of the valves are shown in their up position wherein the feed ram 136 is halted. To bring about a rapid advance stroke of the feed ram both of the solenoids HH-1 and HH-2 are energized to move their pertaining valve members downwardly, whereupon pressure conduit 145 is connected through valve 143 to a conduit 148 leading to the left end of cylinder 137.

Conduit 149, leading from the right end of cylinder 137, is connected through valve 144 with a conduit 150 that leads back to valve 143 through which it is connected with a conduit 152 leading back to valve 144 through which valve conduit 152 is connected with exhaust conduit 153. Under these conditions the feed ram 136 will advance as rapidly as fluid is supplied to cylinder 137.

Slow advance, or feed rate of the feed ram commences when LS-12 is actuated causing solenoid HH-2 to be deenergized permitting its valve member to move upwardly, at which time conduit 149 will be connected with conduit 154 leading through a restrictor 155 back to valve 143 and through which valve conduit 154 is again connected with conduit 152 leading to drain.

Rapid return of the tools commences when LS-15 is actuated causing solenoid HH-1 to be deenergized to permit valve member 146 to move upwardly while solenoid HH-2 is energized to move valve member 147 downwardly. Under these conditions pressure conduit 145 is connected with conduit 150 which is connected through valve 144 with conduit 149 leading to the right end of cylinder 137.

Conduit 148 leading from the left end of cylinder 137 is connected through valve 143 with conduit 152 leading through valve 144 to drain.

At the end of its retraction stroke, feed ram 136 is brought to a halt by actuation of LS-14, causing de-energization of solenoids HH-1 and HH-2, which permits both valve members 136 and 147 to move upwardly, whereupon pressure conduit 145 is connected through valve 143 with conduit 150 that is blocked in valve 144.

As mentioned, following actuation of LS-12 and before actuation of LS-15; LS-13 is actuated to reduce the speed of the spindle.

Locking pin circuit

The hydraulic circuit also includes means for actuating a locking pin 160 adapted for engagement with a portion of the chuck of the machine or the drive train 162 therefor, positively to locate the chuck when it is halted. Pin 160 is connected with a ram extending into a cylinder 163 adapted for being reversibly supplied with fluid from a valve 164 normally spring urged into position to bring about retraction of pin 160 and adapted, upon energization of a solenoid MM-1, to bring about a supply of fluid to cylinder 163 to move the locking pin into locking position. A limit switch LS-19 is positioned to be actuated by movement of the locking pin, and has a blade closed when the lock pin is in, and a second blade closed when the lock pin is out.

Referring to the drive train 162 for the chuck of the machine, this drive train is driven by main driving motor "M" which has associated therewith, a zero speed limit switch LS-17 that closes when the motor speed falls below 40 R. P. M.

Associated with the chuck of the machine, are cam elements 165 adapted for opening limit switch LS-16 to de-energize the main drive motor "M" and commence the hydraulic braking of the spindle, and close limit switch LS-18 to stop, and position the spindle.

Center drive circuit

The hydraulic circuit also includes means for driving the centers 50 and 51 toward and away from the ends of the crankshaft. Drivingly connected with each of the centers for reciprocating the same, is a hydraulic motor 166-L for center 50, and 166-R for center 51. These motors are connected in parallel with a control valve 167 normally centered by centering springs and adapted for being shifted into its opposite end positions by fluid supplied to the pilots thereof, from a normally centered pilot valve 168. Energization of operating solenoid CC-1 of the pilot valve will bring about a supply of fluid to motors 166, that will retract their associated centers; whereas, energization of operating solenoid CC-2 will bring about a supply of fluid to said motors which will advance the centers inwardly. The centers have associated therewith the limit switches LS-3-L and LS-3-R which determine the limits of movement thereon. Motor 166-R has included in circuit therewith, a restrictor 169 which provides for slower movement of center 51 than the speed of movement of center 50, so that when the centers move inwardly, center 50 will engage and locate the crankshaft axially before it is engaged by center 51.

Chuck actuating circuit

The hydraulic circuit also includes means for opening and closing the chuck on the crankshaft. This means comprises the wrench 118 which engages and rotates worm 116. The wrench 118 is moved axially into engagement with worm 116 by a shift level 170 mounted on a shaft with a lever 171 that is adapted for being moved by a spring 172, associated with lever 173 rotatable on the said shaft that is arranged by being driven by the fluid motor 174.

Motor 174 is adapted for being reversibly actuated by fluid supplied thereto from normally centered reversing valve 175. Associated with valve 175, is a solenoid FF-1 which, upon energization, provides a supply of fluid to motor 174 to move the chuck wrench inwardly, while energization of solenoid FF-2 will provide a supply of fluid for motor 174, to move the chuck wrench outwardly.

A rotary fluid motor 176 is connected with the chuck wrench for driving it in rotation, and is adapted for being reversibly supplied with fluid from a normally centered control valve 177 having pilot operators connected to receive fluid from a normally centered valve 178. Solenoid AA-1 of pilot valve 178, when energized, provides for a supply of fluid through pressure reducing valve 179 to motor 176 to drive the chuck wrench in a direction to close the chuck. The energization of solenoid AA-2 will provide for a supply of fluid through pressure reducing valve 180 to motor 176 to open the chuck.

A pressure switch LS-10 is connected to be closed when a predetermined pressure is built upon the fluid actuating motor 176 when the chuck is being closed. This switch is in circuit with the timer contact TRL-3 and limit switch LS-2 which is closed when the chuck is closed. Another limit switch LS-1 is located to be actuated when the chuck is open.

Limit switches LS-11 and LS-20, are located so as to be actuated when the lever system connected to the chuck wrench is moved into position to indicate that the chuck wrench is engaged.

Loader circuit

The hydraulic circuit also includes an arrangement for actuating the loading hooks and for reciprocating the loading carriages. This arrangement comprises a control valve 190 adapted for selectively connecting and disconnecting pressure conduit 124 and conduit 192 for selectively supplying a source of pressure for the loader. Valve 190 is pilot operated and is under the control of valve 193 normally spring urged into position to supply fluid to the pilot of valve 190 which will hold it in position to disconnect conduits 124 and 192. Energization of solenoid GG-1 of pilot valve 193 will bring about shifting of valve 190 to connect conduits 124 and 192. Conduit 192 leads to lower end of fluid motor 81 and also to the inlet of a control valve 194, which is pilot operated, and also to the inlet of pilot valve 195 that controls the supply of fluid to the pilots of valve 194.

In one position valve 194 supplies pressure fluid through speed controlling needle valve 196 to the upper end of motor 81 to drive the ram thereof downwardly for an unloading operation while in its other position valve 194 exhausts the upper end of motor 81 so that pressure standing at the lower port thereof will drive the ram upwardly for a loading cycle.

Pilot valve 195 has an operating solenoid EE-1, which, when energized, brings about shifting of valve 194 to its unloading position; whereas, energization of solenoid EE-2 of valve 195 brings about shifting of valve 194 into its loading position.

The ram of fluid motor 81 is arranged for closing limit switch LS-8 at the end of its loading stroke to initiate traverse movement of the load carriage in one direction, and for closing limit switch LS-5 at the end of its unloading stroke for initiating traverse movement of the carriages in the opposite direction.

The ram 91 that drives the loading carriages in reciprocation is reversibly driven in stationary cylinder 92 by a reversible supply of fluid thereto from normally centered pilot operated reversing valve 200 that receives pressure from conduit 192. Valve 200 is controlled by pilot valve 201. Energization of operating solenoid DD-1 of the pilot valve will bring about shifting of valve 200 to supply fluid to cylinder 92 to drive ram 91 rightwardly to move the loader carriages leftwardly, whereas energization of solenoid DD-2 will bring about movement of ram 91 to the left to move the load carriages to the right.

Associated with the loading carriages that are driven in reciprocation by drive cable 85 is limit switch LS-6 actuated when the carriages are at their left hand end position, to initiate an unloading cycle, and having a blade in the circuit of the gauge to prevent operation thereof, until the loader moves away from the gauge. There is also a limit switch LS-4 which is closed when the carriages reach an extreme right hand end position to initiate a loading operation; LS-7 which is actuated as the carriages move right or left of their center position, to control the loader operation; and a limit switch LS-9 closed by the loader in center position, to initiate operation of the machine.

*Braking circuit*

The hydraulic circuit also includes means for braking and halting the main drive motor. This is in the form of a hydraulic pump or motor 205 connected with the main drive motor "M" to be driven thereby. Hydraulic pump 205 has its discharge side connected with the inlet of a pressure relief valve 206 adapted for opening when pressure drops in a conduit 207 leading therefrom through a restrictor to a port in a control valve 208. Valve 208 is normally spring urged into position to block the said conduit, thereby preventing valve 206 from opening at a low pressure while solenoid KK-1 is energizable for moving the valve to connect the said conduit with exhaust thereby providing for relatively free discharge of the pump through relief valve 206 back to the section side of the pump.

The discharge side of the pump also leads through a needle valve 209, and a check valve 210, to one part of a valve 211, that has its inlet port connected with pressure conduit 124, and which valve also has exhaust ports.

Another conduit 212 leading from valve 211, is connected through check valve 213, with the suction side of pilot 205.

A pressure reducing valve 214, has its inlet connected with conduit 124, and its discharge side connected with the suction side of the pump.

Valve 211 is normally urged by a spring into position to connect pressure conduit 124 with conduit 212 while connecting the discharge side of check valve 210 with exhaust thereby providing for free rotation of pump 205. Energization of solenoid LL-1 will connect pressure conduit 124 with the discharge side of check valve 210, thereby preventing the check valve from opening and requiring the discharge of pump 205 to pass through relief valve 206, whereby the pump 205 can be availed of for braking the main motor "M" to a halt.

*Gauge station*

At the left hand of the line bearing machine in position to receive a turned crankshaft from the left hand loading carriage of the line bearing machine conveyor, is gauge "G" which, as will be seen in Figures 22 through 25, comprises a frame 300 having pivotally mounted thereon, as at 301, a tiltable carrier 302 that comprises rails 303 adapted for engaging certain of the journal portions of a crankshaft thereon to permit the crankshaft to slide on the carrier without rotation.

The carrier is tiltable by means of a fluid motor 304 connected between the carrier and frame 300 of the gauge. At the left end of carrier 302, as it is viewed in Figure 22, the carrier is provided with upstanding end plates 305 having tapered surfaces 306 adapted for locating a crankshaft axially between the plates. On the inner sides of the plates, there are connected V blocks 307 for supporting a crankshaft introduced between the plates 305 by the left hand loader hooks of the line bearing machine conveyor.

The gauge is so located that when carrier 302 is tilted to the position outlined in dot-dash lines in Figure 22 and marked "load position," the V blocks 307 are so located that they will receive a crankshaft from the line bearing conveyor on the axes of the line bearing machine. After the loader has left the position where it so deposits a crankshaft on the carrier, thus permitting a blade of LS-6 that is in circuit with the gauge controls to close, the carrier tilts downwardly to carry the crankshaft into gauging position where certain surfaces thereof, that have been machined in the line bearing machine, are brought into operative relation with a plurality of gauge heads. These gauging heads are indicated at 308 in Figures 23, 24, and 25. Each gauging head comprises gauging means, such as an anvil 309 that engages one side of the portion of the crankshaft to be gauged, and a dimensionally sensitive element 310 that engages the opposite side of the crankshaft. In a manner well known in the trade, the gauging arrangement is effective for closing an electric switch when, and only when, the work member being gauged falls within the correct dimensional limits.

The individual gauging stations of the gauge, as will be seen in Figure 24, have tapered upper-end portions 311 that serve precisely to locate the crankshaft axially as it is lowered into gauging position.

After a crankshaft has been gauged and found acceptable, fluid motor 304 tilts carrier 302 upwardly to the dot-dash position in Figure 22 that is marked "unload." It will be understood that any or all of the critical dimensions could be gauged during this operation.

Associated with V blocks 307 toward the rear thereof, are the upstanding members 312 that assist in locating the crankshaft on the V blocks and which also assist in transferring the crankshaft to rails 303 when the carrier is in its unloading position. This is accomplished by mounting members 312 on a shaft that has a lever 313 spring urged by spring 314 to hold members 312 upright. When the carrier tilts upwardly however, a roller 315 on lever 313 engages the underside of a stop plate 316 and this turns the said lever and also members 312 clockwise, as viewed in Figs. 22 and 22A, so that a crankshaft on the V blocks will be permitted to slide down the rails of the carrier, and be ejected from the rear end thereof, into one of the receiving hooks 317 of the intermediate conveyor.

For actuating motor 304, there is a normally centered, closed center reversing valve 318 connected therewith, operable upon energization of solenoid S-1 to cause carrier 302 to tilt upwardly, and upon energization of solenoid S-2, to cause the carrier to tilt downwardly.

The gauge is provided with a suitable push button station to manually operate it if so desired, and it is provided with other auxiliaries well known in the trade, including air pressure supply means, pressure sensitive switches, and such other appurtenances as are necessary to form an operative unit.

Since the gauge is a portion of the automatic mechanism and is electrically interlocked with the entire electrical control circuit, it is provided with certain limit switches as at LSG-1, LSG-2, and LSG-3, that are under the control of the cams 319 that rotate with the carrier for indicating the carrier position, and for interlocking the operation of the carrier with the remainder of the mechanism. LSG-1 is opened when the carrier is in gauging position; LSG-2 has a blade opened when the carrier is in load position, and one which is closed by the carrier in load position; LSG-3 is opened when the carrier reaches unloading position; and LSG-4 has one blade which is closed by a crankshaft on the carrier and one which is opened by a crankshaft on the carrier.

Figure 25-A shows the manner in which the crankshaft is rotated as it leaves the gauge position of the gauge. In Figure 25-A, when the gauge carrier is tilted to discharge the crankshaft, it rolls down the members 312 toward the rails of the carrier until the highest of the rails engages beneath pin bearing No. 1, while the intermediate rails engage beneath a pair of spaced line bearings, and the lowermost rail engages beneath pin bearing No. 4 toward the flange end of the crankshaft. This rotates the crankshaft to the proper position for being received in the pin machine chucks.

The intermediate conveyor

Located at the back of the gauge "G" is the intermediate conveyor "L."

This conveyor is illustrated in Figures 26 and 27, wherein it will be seen to comprise vertically movable carriage 325 which has the previously mentioned hooks 317 thereon, for engaging the crankshafts ejected from the gauge and for supporting them in precise oriented position. Carriage 325 is vertically movable on a transporting carriage 326 by a fluid motor 327, so that in the lower position of carriage 325, the upper set of hooks 317 will receive a crankshaft from the gauge, whereas in its upper position, the lower set of hooks 317 will receive the crankshaft. Longitudinal rails 328 permit longitudinal movement of the transport carriage 326 by a cable on 329 driven by a motor 330.

When carriage 325 is in its upper position, the axes of the crankshafts on the hooks 317 are in exact alignment with axes of the spindles of the pin bearing machine which is illustrated in Figures 28 through 30, and when transport carriage 326 is in its left hand position, the crankshafts are axially located so that to be in position to be picked up by the load conveyor for the pin bearing machine, as will be described hereinafter.

The carriage 325 has limit switches LSI-1 and LSI-2, which indicate the presence of crankshafts on the hooks 317.

The intermediate conveyor has a limit switch LSI-3 actuated when the carriage 326 is at its extreme left hand position in engagement with stop 331, and at which time the crankshafts on the hooks 317 are positioned to be picked up by the conveyor for the pin bearing machine. At its extreme right hand position, the carriage 326 engages and actuates a limit switch LSI-5, and at which time the carriage is in a stopped position, ready to receive crankshafts from the carrier of gauge "G." In its lowermost position, the vertically slidable carriage 325 is adapted for engaging and actuating a limit switch LSI-4.

Figure 27 shows the operating circuit for the intermediate conveyor. In this view, it will be seen that there is reversing valve 332 connected with fluid motor 327 normally biased toward a position to cause the fluid motor to hold slide 325 in its lower position. Upon a crankshaft being delivered to the upper set of hooks 317, limit switch LSI-1 is closed by the crankshaft, thus energizing valve solenoid 333 which shifts valve 332 into position to cause fluid motor 327 to drive carriage 325 upwardly, and thereafter, when another crankshaft is delivered to the lower set of hooks, the limit switch LSI-2 is closed, and this causes energization of motor 330 to drive carriage 326 longitudinally against stop 331, and at which time limit switch LSI-3 will be opened to de-energize motor 330.

The crankshafts are now positioned to be picked up by the pin bearing machine conveyor and the carriages 325 and 326 will dwell until the crankshafts are removed therefrom. When the crankshafts are lifted from the hooks 317, permitting LSI-1 and LSI-2 to open, valve solenoid 333 will be deenergized, thus permitting fluid motor 327 to retract carriage 325 downwardly to its lowermost position whereupon limit switch LSI-4 will be closed, which will cause energization of motor 330 to drive carriage 326 back to its starting position. In its starting position, carriage 326 engages and opens limit switch LSI-5, which again de-energizes motor 330.

Associated with limit switch LSI-5, is a second blade LSI-5-a, that is located in the control circuit for the carrier of the gauge, so that the carrier will not discharge a crankshaft until carriage 326 is in the proper position to receive the crankshaft.

Similarly, limit switch LSI-3 has a second blade LSI-3-a, that is connected in the control circuit for pin bearing machine loader, so that the loader will not operate until carriage 326 is in the proper position for the crankshafts thereon to be picked up by the loader.

The pin bearing machine

Turning now to the pin bearing machine "PB," this machine is illustrated as to the structure thereof in Figures 28 through 41. This machine is a two spindle machine of a known general type which chucks the crankshafts placed therein adjacent the ends thereof while steadying the crankshafts in about the center thereof, and having turning tools that engage the several pin journals of each crankshaft simultaneously and turn the journals upon rotation of the crankshafts on their axes. The tools accomplish the turning of the crankshaft pin journals by following orbital paths that correspond with the orbital paths taken by the pin journals. This is accomplished, as is known, by mounting the pin turning tools on massive blocks that are supported on master crankshafts which are connected to rotate simultaneously with the crankshaft supporting chucks so that tools mounted on the blocks will follow the same paths as the pin journals of the crankshafts.

In the drawings, the pin bearing machine has a frame 350 in which two vertically spaced spindles axes are defined by the chucks 351. These chucks engage the end portions of the crankshafts placed therein, and intermediate the chucks is a steady rest arrangement 352 for supporting the crankshafts, so that they do not deflect under the loads placed thereon by the turning tools.

A door 522, cable operated by a fluid motor comprising a ram 524 in a cylinder 525 is movable to open and close the working space of the pin bearing machine.

Pin bearing machine load conveyor

On an upper part of frame 350, as will be seen in Figure 30, is a rail 353 which movably supports a pair of spaced loader carriages 354. Each loader carriage comprises a pantograph lever arrangement 355, which at its outer end supports a vertical loader frame 356. Each loader frame has vertically slidable thereon, a slide 357 as by means of a fluid motor 358. Each slide has on the machine side thereof, the hook elements 359 adapted for engaging journal portions of crankshafts to be conveyed to and from chucks 351. The right hand loader carriage, indicated at 356-R in Figure 29, is adapted for picking up crankshafts from the hooks 317 of the intermediate conveyor, and for conveying them to and depositing them in chucks 351, whereas the left hand loader carriage indicated at 356-L in Figure 29 is adapted for picking crankshafts from the chucks 351, and for conveying them to and depositing them on the inclined rails 360 of an unloading or discharge conveyor 361 whence the crankshafts pass to further gauging and machining operations.

Each of the lever systems 355 of the loaders, are adapted for being swung in a vertical plane about their pivotal connections with their respective carriages by a fluid motor means 362 that has one end connected with the portion of the carriage that slides on the rail 353 and its other end connected as at 363, with the upper lever of the lever system 355.

The loader carriages are reciprocated along rail 353 by an actuating system similar to the one already described in connection with the load conveyor for the line bearing machine. This arrangement is illustrated in Figures 31 and 32 wherein it will be seen that the carriages 354, that are mounted on rail 353, are interconnected with each other and with a center anchor member 364 by rods 365. Actuating cable or cable chain 366 is connected with anchor member 364 as by the lever 367, which corresponds in arrangement and form with lever 86 described in connection with the line bearing machine conveyor. The cable chain 366 extends across the front of rail 353 and adjacent the ends thereof, passes over the supporting idlers 368 and then inwardly about the idlers 369 mounted on opposite ends of a ram 367 which has a piston located within cylinder 370. The ends of the cable chain then pass outwardly to adjustable anchor points 371. It will be evident that leftward movement of ram 367 will be accomplished by rightward movement of the loader carriages of the machine but by an amount equal to twice the movement of the ram.

Pin bearing machine chucks

The chucks previously referred to and indicated at 351 in Figure 29 are shown in somewhat greater detail in Figures 35 and 36 wherein it will be seen that each chuck comprises a frame portion 380 defining a U-shaped space having a resilient block 381 in the bottom thereof for resiliently supporting the ends of a crankshaft placed thereon. Each frame 380 carries a pair of accurately located anvil blocks 382 for engagement with a pair of the milled surfaces on the end lobes of the crankshafts. In Figure 35, for example, the anvil blocks 382 engage the milled surfaces indicated at 23 and 24 in Figure 6.

The crankshafts are adapted for being clamped fixedly against the anvil blocks by the clamp members 383, each of which is spring urged away from clamping position and being adapted for being moved toward clamping position by axial reciprocation of a wedge shaped actuated member 384 which, as will be seen in Figure 36, extends into the supporting spindle for the chuck where it is connected with the reciprocable ram 385 of a fluid motor.

The clamping members 383 engage line journal portions of the crankshafts, thus leaving exposed, all of the pin bearing portions for being machined.

Means are provided for indicating when the clamping members are in clamping position in the form of teeth 386 formed on one of the clamping members of each chuck that engage pinions 387 on shafts having second pinions that mesh with rack bars 388 adapted for engaging and moving levers 389 having associated therewith limit switches LS–102 which control the initiation of the closing of the steady rest and door, after the chuck has been closed.

The driving of the chucks 351 of the pin bearing machine is accomplished by the drive train, more or less diagrammatically illustrated in Figure 37. This drive train includes means as at 390 for driving the master crankshafts of the machine in rotation as previously described, to cause the tool blocks to carry the turning tools in orbital paths.

Pin bearing machine locking pin

Means are also provided for stopping the drive train in a predetermined position to bring the chucks 351 into the proper rotated location to receive crankshafts from the load conveyor. This means may take the form illustrated in Figure 38 wherein a member 391 of the drive train, having a one to one drive ratio with the spindles, is provided with a stop plate 392 having an abutment adapted for engagement by a stop pin 393, which is connected with fluid motor 394 by means of which the stop pin is selectively moved into and out of abutting position. Lock pin controls a limit switch LS–114 that initiates the opening of the steady rest and door.

Steady rest

The steady rest 352 previously referred to is illustrated in some detail in Figures 39 and 40. In Figure 39, it will be seen that each steady rest of which there are two, arranged vertically above one another, comprises a stationary portion 400 and a movable cap 402. Each cap is pivoted to the stationary portion on an axis 403, and each cap, and the stationary portion pertaining thereto, is provided with means for embracing the center line bearing of a crankshaft associated therewith.

The line bearing, so embraced is supportingly engaged by anti-friction bearings 404, carried in the stationary portion and in the cap, thereby to support the crankshaft against lateral deflection, while an additional anti-friction bearing 405 is carried by the stationary portion, so arranged as to engage the machined radial surfaces at the ends of the center line bearing portion, by means of the side walls 406 of the outer race of the said bearing thereby axially to locate the pertaining crankshaft.

The caps 402 are adapted for being moved between their closed position, indicated in full lines in Figure 39 and their open position, indicated in dot dash lines in Figure 39, by a fluid motor means 407, having ram connected with a lever 408, the limits of movement of which are determined by the abutment screws 409. Lever 408 is arranged for vertically reciprocating a rod 410 which, in turn, brings about oscillation of the angular levers 411 for the two caps. Each lever 411 is connected by an arcuate link 412 with a plate 413, having a lost-motion connection 414 with a vertically extending rod 415 which, at its upper end is connected with a plate 416. Each plate 416 is pivoted in its cap at 417, and also has pivoted thereto, a link 418 that has its other end pivoted to a lock bar 419 that is rotatable on a pin 420.

Each lock bar 419 has a projection 421 thereon, adapted for engagement by the nose of a latch lever 422 pivoted in the cap and urged by a spring 423 toward projection 421. The latch lever is adapted for engaging projection 421 when lock bar 419 is retracted from its locking position of abutment with abutment element 424 carried in the stationary portion 400. A plunger 425 is provided in the cap that engages a fixed member in stationary portion 400, when the cap is closed so as to move latch lever 422 out of engagement with projection 421. The lock bar is thus held in its unlocking position except when the cap is fully closed and the cap can be swung open and closed without any movement of the lock bar on the cap except to lock the cap closed and to unlock it.

In operation, assuming the caps of the steady rest to be closed, downward movement of rod 410 by fluid motor 407, would cause rotation of levers 411 in a direction to move rods 415 downwardly, thereby to move plate 416 and link 418 out of their overcenter position, and to pull lock bar 419 downwardly, away from abutment 424. When the lock lever clears the abutment, the caps would then tilt outwardly with each latch lever 422 engaging the pertaining projection 421. Thereafter, when the caps are to be closed, upward movement of rod 410 by fluid motor 407 would reverse the procedure with the caps first moving to closed position until latch levers 422 become disengaged from projections 421, and at which time, the lock bars would become released and would be pushed against projections 424, with the link 418 and plate 416 snapping over center to lock the bar in place.

Hydraulic circuit for pin bearing machine

The hydraulic circuit for the pin bearing machine is diagrammatically illustrated in Figure 41. The source of hydraulic pressure fluid at 500 comprises a high pressure—low volume pump, and a low pressure—high volume pump interconnected through relief valves to supply pressure fluid to a conduit 501, which supplies fluid at reduced pressure through pressure reducing valve 502 to a conduit 503, while fluid is also supplied through a sequencing valve 504 to a conduit 505.

Feed circuit

Conduit 505 supplies fluid to a feed ram 506 for advancing the tools into the work through a plurality of valves, one thereof being indicated at 507, which is a normally centered closed center reversing valve having one conduit 508 connected with the lower end of the cylinder in which feed ram 506 reciprocates. Another conduit 509 leads from valve 507 to a port in valve 510 which is also a normally centered closed center reversing valve, with one service port 511 blocked. Valve 507 is pilot operated by fluid conducted to the pilot cylinders thereof from a pilot valve 512 which has a solenoid PG–1 energizable for supplying pressure to the left hand pilot of valve 507 to shift the valve member thereof rightwardly to connect conduit 505 with conduit 509.

Energization of solenoid PG–2 of valve 512, will cause shifting of valve 507 to interconnect conduits 505 and 508. The de-energization of both solenoids PG–1 and PG–2 will permit centering of valve 512, at which time both of the pilots of valve 507 are exhausted so that that valve also will center.

Valve 510 is also pilot operated end is controlled by pilot valve 513 having solenoid PF–1 energizable to bring about shifting of the valve member in valve 510 into position to connect conduit 509 with a conduit 514 leading to the upper end of the cylinder for feed ram 506, conduit 514 also being connected via a restrictor 515 with conduit 509.

Energization of solenoid PF–2 of valve 513 will bring about shifting of valve member of valve 510 to block conduit 514, while connecting conduit 509 with exhaust, and de-energization of both PF–1 and PF–2, will be accompanied by centering of both valves 510 and 513.

To obtain rapid traverse upwardly of ram 506 to feed the tools inward rapidly, valve 507 is shifted leftwardly and valve 510 rightwardly. When a cam 516 on ram 506 engages limit switch LS–109, valve 510 will be shifted leftwardly whereupon the discharge from the feed cylinder will pass through restrictor 515 and cause slower movement of the feed ram.

Upon further advancing movement of ram 506 at reduced rate, cam 517 will engage limit switch LS–110 to initiate a dwell period during which the spindle drive motor slows down and the tools commence a dwell period, at the end of which time cam 518 will engage switch LS–111 which will bring about retraction of ram 506 by shifting both valves 507 and 510 rightwardly. At the end of the retraction stroke of ram 506, cam 519 will engage limit switch LS–118, permitting all of valves 507, 510, 512, and 513, to center.

*Locking pin circuit*

Conduit 505 also leads to a valve 520 having a solenoid PK–1 energizable for connecting conduit 505 with conduit 521 leading to fluid motor 394 to bring about retraction of locking pin 393. Lock pin 393, at its inner or locking position, actuates a limit switch LS–114 which initiates opening of the steady rest and door. Similarly, energization of solenoid PK–2 of valve 520 will reverse the supply of fluid to motor 394 and advance the locking pin.

*Door operating circuit*

The working space of the pin bearing machine is provided with a door 522 slidable between opened and closed positions by an actuating cable 523, arranged similarly to the actuating cables for the loader conveyors, and with which is associated a ram 524 in a cylinder 525.

A valve 526 is connected with cylinder 525, and upon energization of a solenoid PH–1 associated therewith, directs fluid to the right end of cylinder 525 to move ram 524 leftwardly, thereby to move door 522 rightwardly into its open position, at which time it engages a limit switch LS–116 which, in conjunction with limit switch LS–103 operated by the loader, initiates downward movement of the loader elevator.

Energization of the solenoid PH–2 of valve 526 will reverse the supply of fluid to the cylinder and cause leftward movement of the door to its closed position, at which time it actuates limit switch LS–115 which, together with LS–101 operated by the steady rest initiates rotation of the spindles.

*Steady rest circuit*

Main pressure supply conduit 501 also leads to the inlet of a reversing valve 527 connected with fluid motor 407 for opening and closing the steady rests. Valve 527 is pilot operated and is under the control of a pilot valve 528 having a solenoid PA–1 energizable for shifting valve 527 to bring about closing of the steady rests, and a solenoid PA–2 energizable for bringing about shifting of valve 527 to open the steady rests. Associated with the steady rest actuating mechanism, is a limit switch LS–101 which is operated at the opposite limits of travel of the said mechanism. Closing of the steady rest conditions LS–101 for cooperation with LS–115 operated by the door to commence rotation of the spindles while opening of the steady rest conditions LS–101 to open the chucks.

*Chuck actuating circuit*

Secondary pressure conduit 503 leads to the inlet of a pilot operated, reversing valve 529 connected for reversibly supplying fluid to the cylinders in which the several chuck actuating rams 385 are located. Associated with valve 529, is a pilot valve 530 having a solenoid PB–1 energizable for bringing about shifting of valve 529 into position to close the chucks, and a solenoid PB–2 energizable for shifting valve 529 into position to cause opening of the chucks. Opening and closing of the chucks controls the actuation of the limit switch LS–102 associated therewith.

*Load conveyor circuit*

Primary pressure conduit 501 also leads to the inlet of a pilot operated valve 531 having a service port connected with a conduit 532 that leads to a discharge side of a resistance valve 533, bypassed by a check valve 534, with the discharge side of the check valve and the inlet side of the resistance valve being connected with the lower ends of the fluid motors 362 which raise and lower the load carriages 356 of the conveyer.

Valve 531 has associated therewith, a pilot valve 535 normally spring urged into position to cause valve 531 to be rightwardly shifted, and having a solenoid PJ–1 energizable to bring about shifting of valve 531 leftwardly to connect conduit 501 with conduit 532.

The upper ends of fluid motors 362 are connected through the flow control valves 536 with one port of a pilot operated valve 537 having an inlet port connected by conduit 532. Valve 537 is under the control of pilot valve 538 having a solenoid PD–1 energizable to bring about leftward movement of the valve member of valve 537 which will connect the upper ends of motors 362 with exhaust, and permit upward movement of the rams therein when valve 531 is shifted leftwardly which will be brought about by energization of solenoid PJ–1 of valve 535.

Valve 538 also has a solenoid PD–2 energizable to cause rightward movement of the valve member 537 which will bring about a supply of fluid to the upper ends of fluid motors 362, and will cause downward movement of the rams therein. Pressure conduit 532, which is under the control of valve 531 also leads to the inlet of a valve 539 which is connected with the fluid motors 358 which raise and lower the slides 357 carrying the hooks 359 on the loader carriages. Valve 539 has a solenoid PE–1 energizable to cause upward movement of the hooks and a solenoid PE–2 energizable to cause downward movement of the hooks.

The raising and lowering movement of the hooks control the limit switches LS–105 whereas the raising and lowering movements of the carriages control the limit switches LS–104.

Conduit 532 leads through a restrictor valve 540 to the inlet of the normally centered, closed center reversing valve 541 connected with cylinder 368 for reciprocating ram 367 therein to cause traversal of the load carriages.

Valve 541 is under the control of the normally centered pilot valve 542 which has a solenoid PC-1 energizable for causing shifting of the valve member of valve 541 into a position to cause leftward movement of ram 367 which will bring about rightward movement of the carriages connected thereto. Valve 542 also has a solenoid PC-2 energizable for reversing the flow to ram 367 to cause rightward movement thereof which will be accomplished by leftward movement of the load carriages.

When the carriages are centered, a limit switch LS-108 is actuated thereby, and when the carriages are in their extreme right hand position, a limit switch LS-103 is actuated thereby, and when the carriages are at their extreme felt hand position, a limit switch LS-106 is actuated thereby.

When switch LS-103 is closed at the right hand position of the loader, it causes downward movement of the carriages 356 which, in their lowest position, actuate switches LS-104 that cause the slides 357 to raise, picking up crankshafts from the intermediate conveyor and from the chucks. When the slides reach their upper limit and actuate switches LS-105, the leftward movement of the loader is initiated.

Leftward movement of the loader continues to its left hand position at which time the foregoing steps are again carried out but in reverse order to deposit crankshafts on the discharge conveyor and in the chuck.

*Discharge conveyor*

At the left end of the pin bearing machine is the discharge conveyor 361 which includes switches LS-120 which are actuated by crankshafts deposited on the conveyor. These switches, when actuated, prevent continued operation of the pin bearing machine so that the crankshaft receiving station of the discharge conveyor must be cleared before other crankshafts will be deposited therein.

*Electric control circuit for line bearing machine*

The electric control circuit for the line bearing machine is illustrated in Figures 42-A, 42-B, and 42-C.

In these figures, the horizontally extending wires connect at the left with power line L-1, whereas the wires leading to the opposite power line, L-2, are indicated by the arrows on the ends of the wires.

Referring first to Figure 42-A, there is a selector switch 600, having a position marked "hand", wherein a relay CRL-1 is energized which is effective for preventing automatic operation of the machine while permitting manual operation thereof.

Switch 600 has a second position marked "auto," wherein the relays 1-ARL and 2-ARL are energized, and which make effective the several circuits which provide for automatic operation of the machine.

A second selector switch at 601 has one position marked "non-repeating," where a relay CRL-2 is energized that prevents the automatic cycle of the machine from repeating, and a second position marked "repeat," where a relay CRRL is energized that provides for the automatic cycle of the machine to repeat so long as the machine operation proceeds properly.

The limit switch LS-19 controlled by the lock pin, has a first blade marked 19-L, that is closed by the lock pin when the pin is in locking position and which closes the circuit to a timer TRL-1. Closing of this circuit also closes a circuit through a normally opened blade TRL-1 of the timer adapted for closing two seconds after the timer is energized, which circuit also includes a normally opened blade of relay CRL-14, to relay coil CRL-3, the energization of which causes opening of the chucks.

The limit switch has a second blade 19-2, which is closed when the lock pin is in unlocking position to energize the coil of a relay CRL-4 which assists in starting the spindle motor.

The limit switches LS-11 and LS-20, that are closed by the chuck wrench when it is moved into driving position are in series with the coil of a relay CRL-5, to energize the relay when closed, which relay controls energization of the chuck wrench drive motor.

Limit switch LS-11 has a second blade marked 11-2 that is closed when the chuck wrench is retracted to energize the coil of a relay CRL-6 which cooperates in controlling energization of the main drive motor. The closing of blade 11-2 also establishes a circuit through normally opened blades on relays CRL-10, CRL-12, CRL-20, 1-ARL, and CRRL, to the coil of a relay CRL-7 which is effective at the end of a cycle to cause recycling.

The limit switches LS-3-L and LS-3-R comprise blades closed when the centers of the machine are in that complete a circuit to energize a coil of a relay CRL-8 that controls the closing of the chucks; and other blades that are closed when the centers are out to energize the relay of a coil CRL-9 that cooperate in controlling the loader.

A relay CRL-10 has a coil in series with a normally opened blade of a relay CRL-18, and the normally closed blade of relay CRL-20, the latter blade being bypassed by a normally opened blade on CRL-19.

A normally opened blade on CRL-12 is effective when closed to energize a second timer TRL-3 having a blade that closes one second after energization of the timer to cause withdrawal of the chuck wrenches. Limit switch LS-2, actuated when the chuck is closed, and limit switch LS-10 which is closed when the fluid pressure exerted on the chuck motor reaches a predetermined amount, are in series with a normally opened blade of a contactor CCL, a normally opened blade on 1-ARL, a normally closed blade on a contractor UCL, and a normally closed blade on a relay CRL-23, and a normally closed blade on a relay CRL-13, with the energizing coil of relay CRL-12. The normally closed blade on CRL-23 is bypassed by a normally opened blade on CRL-14, the normally opened blade on 1-ARL is bypassed by a normally closed blade of a push button UCL, while a normally opened blade on CRL-12 bypasses limit switches LS-2, LS-10, and the blade referred to on contactor CCL. CRL-12 closes when the chucks are open to energize timer TRL-3 to withdraw the chuck wrenches.

Another wire connected with line L-1 leads through a normally opened blade on relay CRL-3 to a distributor wire 603. Wire 603 connects through a normally opened blade on contactor CCL with a wire leading through a normally opened blade on a contactor CWIL to a wire extending into Figure 42-B and numbered 604, that leads through a normally opened blade on CRL-5, a normally closed blade on CRL-13, and a normally closed blade on contactor CCL to the coil of contactor UCL which causes opening of the chucks when energized.

Connected from wire 603 to a point between the last mentioned normally opened blades on contactor CCL, and the normally closed blade on contactor CWIL, is a branch including a normally opened blade of the push button UCL, and a normally opened blade on CRL-1 to provide for manual unchucking. Also leading from the wire 603 to the same point is a branch containing a normally opened blade of 1-ARL. Wire 603 is also connected through a normally closed blade of CRL-12, and a normally closed blade of contactor CWOL with the energizing coil of contactor CWIL, which when energized causes the chuck wrenches to move in.

Limit switch LS-1, arranged to be closed by the chuck when the latter is open, is connected through a normally opened blade on contactor UCL, and a normally closed blade on contactor CCL, and a normally closed blade on CRL-12 with the coil of relay CRL-13 which provides an interlock with the loader circuit and the circuit for the centers. Limit switch LS-1 and the normally opened blade referred to on contactor UCL are bypassed by a normally opened blade on CRL-13.

A limit switch LS-14 which is closed when the tools of the machine are retracted is arranged to energize a coil of relay CRL–14 which prepares circuits for operation of the loader and opening of the chucks.

Limit switch LS–9 is arranged to be closed by the loader in its center position, and is connected through a normally closed blade on SCRL, with the coil of relay CRL–15 which has a blade in the energizing circuit of the main motor.

The limit switches LS–8 that are closed by the loader hooks in their upper position are connected in series with the coil of contactor UCRL which controls traversing of the loader rightwardly.

Limit switches LS–5 that are closed by the hooks in their lower position are connected through a normally closed blade on relay ULRL with the coil of relay DCRL which control traversing of the loader leftwardly.

Limit switch LS–4 is arranged to be closed by the loader whenever the loader is at its right hand end position, and when closed, will energize the coil of relay CRL–16 which has blades in the elevator up and elevator down circuits.

Turning now to Figure 42–B, limit switch LS–6 is positioned to be closed by the loader in its extreme left hand position, and is connected by a wire 605 leading back to Figure 42–A, with the coil of CRL–17 which also has blades in the elevator up and down circuits.

A branch wire 603 at the upper end of Figure 42–B is connected through a normally push button COL, a normally opened blade on CRL–1, and a normally closed blade on CIL, with the energizing current of contactor COL which causes the centers to move out. The said push button and the blade on CRL–1 are bypassed by a branch containing a normally opened blade of 1–ARL, a normally closed blade of CRL–18, and a normally opened blade of CRL–13.

A wire connected with L–1 leads through a normally opened blade of 1–ARL, a normally opened blade of CRL–23, and a normally opened blade of CRL–18 to the coil of interlocking relay CRL–18.

A branch leading from the side of the said blade of 1–ARL opposite line L–1 passes through a normally opened blade of CRL–14, a normally opened blade of contactor ULRL, and a normally opened blade of CRL–17, also leads to the coil of CRL–18. Additionally, a line connects between the side of the blade of CRL–14 opposite the blade of 1–ARL, with the side of the blade on CRL–23 that is opposite the blade on 1–ARL.

Also connected with line L–1 is a selector switch 606 that leads through a normally opened blade of 1–ARL, and a normally opened blade of CRL–4, to the energizing side of contactor CVL that controls the supply of coolant to the tools.

A wire 607 leads from power line L–1 through a normally opened blade on relay 1–ARL, a normally opened blade on relay CRL–18, a normally opened blade on contactor UCRL, and a normally closed blade on contactor CIL, to the energizing coil of contactor COL. A wire connected with wire 603 previously referred to, is connected through a normally opened push button CIL, a normally opened blade on CRL–1, with the side of the said blade COL opposite its connection with the coil for contactor CIL.

Also leading from wire 603 is a branch extended through a normally opened push button CL, a normally opened blade on CRL–1, a normally opened blade on CRL–8, a normally opened blade on CRL–5, a normally closed blade of CRL–12, and a normally closed blade of contactor UCL, to the energizing coil of contactor CCL that causes closing of the chucks.

There is also a connection from wire 603 through a normally opened blade on 1–ARL, and a normally opened blade on CRL–18 back to the last mentioned branch between the blade on CRL–1 and the said blade on CRL–8.

Another branch leading from line L–1 passes through the normally opened timer blade TRL–3, and normally closed blades on COL and CWIL, to the energizing coil of contactor CWOL that causes retraction of the chuck wrenches. The blade TRL–3 is bypassed by a normally opened push button CWOL which is in series with a normally closed blade of 2–ARL. Blade TRL–3 is also bypassed by a branch containing a normally opened blade on CRL–4.

Another wire 608 leading from power line L–1 passes through a normally opened blade of 2–ARL, a normally closed blade of push button TOL, a normally opened blade of TIL, a normally opened blade of CRL–23, and a normally closed blade of TOL, to the coil of contactor TIL which controls the traverse and feed of the tools. The said blade on CRL–23 is bypassed by a normally opened blade on CRL–1.

A wire 609 leads from power line L–1 through a normally closed blade of limit switch LSG–1 that is opened by the gauge carrier to gauge position to the coil of CRL–20. A branch leading from point 610 on wire 609 passes through a normally closed blade of limit switch LSG–4 which is opened by a crankshaft deposited on the gauge carrier, a normally open blade of a limit switch LSG–2 which is closed by the carrier of the gauge in its loading position, a limit switch LSCI which is closed by a crankshaft on the incoming conveyor of the line bearing machine, a normally opened blade on 2–ARL, a normally opened blade on CRL–3, a normally closed blade on CRL–12, a normally closed blade on CRL–18 to timer 2–TRL.

From point 611, a wire leads through a normally open blade on 2–TRL and a normally closed blade of timer 2–TRL to the coil of relay of CRL–19.

A wire 612 leads from power line L–1 through a normally open blade on push button TOL and a normally closed blade on contactor TIL to the coil of contactor TOL that causes the tools to retract. From point 613, a branch leads through a normally closed blade on CRL–23, a normally opened blade on CRL–24, and a normally closed blade of push button TIL, to point 614 adjacent the normally closed blade on push button TOL.

Branching off from wire 612 is a branch that passes a normally open blade on CRL–7 to a point 615 and thence a point 616 and also through a normally open blade on push button TIL to a point 617 on wire 612.

A wire 618A is connected to power line L—L and leads through a normally open blade on CRL–19, and a normally closed push button 618 to the coil of contactor MVRL that controls the valve for supplying pressure to the loader hydraulic circuit. The said normally open blade on CRL–19 is bypassed by a normally open blade on MVRL.

Another wire 619 is connected from power line L–1 through a normally open push button 620 to a point of 621 on the last mentioned circuit.

A wire 622 leads from power line L–1 through a normally open blade on 2–ARL, a normally open blade on CRL–14 to a point 623, whence one branch passes through a normally open blade of relay SCRL, and a normally closed blade on CRL–17, and a normally open blade on CRL–3 to the coil of SCRL. The aforementioned normally open blade on SCRL is bypassed by branch leading from point 623 through a normally closed blade of limit switch SL–7 which is closed when the loader for the line bearing machine is rightwardly of its center position, and a normally open blade of CRL–19.

There is also a branch leading from point 623 to a blade of limit switch LS–7 which is closed when the loader is leftwardly of center to a point 624, and then through a normally open blade of contactor UCRL, a normally open blade of TLRL to a point 625 and then through a normally closed blade of TLRL to the coil of relay of contactor TRRL that controls traversing of the loader. The normally open blade UCRL is bypassed by a normally closed blade of DCRL and the said blade of limit switch LS–7 is bypassed by a normally open blade of SCRL. Leading from point 624, is a branch that passes through a normally open blade of DCRL to a point 625 and then through a normally open blade of 2-ARL to a point 626, and then through a normally closed blade of TRRL to the coil of contactor TLRL that causes traversing of the loader leftwardly.

The said normally open blade of DCRL is bypassed by a branch which has a normally closed blade of UCRL, and a normally open blade of TLRL, and leading from points 625 and 626 are wires extending to a manual selector switch 627 which has its movable blade connected through a normally open blade on UCRL, a normally open blade on CRL-14, and a normally open blade on CRL-1 with power line L-1. The said blade on UCRL is bypassed by a normally open blade of relay DCRL.

Leading from a point between the said blade of UCRL and the blade of CRL-14 referred to, is a branch leading to another manual switch 628 to control loading and unloading of the conveyor which has one terminal 629 connected through a normally open blade on CRL-9, a normally open blade on CRL-13, a normally closed blade on DURL, and a normally open blade on CRL-17, with the coil of relay ULRL which causes movement of the loader hooks in loading direction. The said blade CRL-17 is bypassed by the parallel connected normally open blades of ULRL and CRL-16. The terminal 629 is also connected through a normally open blade of 2-ARL with the previously referred to point 623.

The other terminal 630 of manual switch 628 is connected through the parallel connected normally open blades of CRL-16 and CRL-17, and normally open blade on CRL-9 and a normally open blade on CRL-13 with the coil of contactor DURL which causes movement of the loader hooks in unloading direction. A wire connects from point 631 adjacently last mentioned blades on CRL-17 back through a normally open blade on SCRL, a normally open blade on CRL-16 to previously mentioned point 624. The said normally open blade on CRL-16 is bypassed by a normally open blade on DURL.

The contactor LRPL energizable for moving the lock pin in is connected by a normally closed blade of contactor HML-2, a normally open blade of contactor HML-1, a normally open limit switch LS-18 operated by a cam on the spindle, a normally open switch LS-17 connected with the cam drive motor so as to close below a speed of 40 R. P. M., a normally open push button 632, a normally closed push button 633, a normally closed blade of contactor SFL, a normally closed blade of contactor SSL, and a normally closed blade of relay CRL-7 with power line L-1. Limit switch LS-18 and the blades of HML-1 and HML-2 are bypassed by a branch containing a normally open blade of contactor LPRL.

The push button 632 is bypassed by a normally closed blade of CRL-21 and push button 623 is bypassed by a normally closed blade of relay 2-ARL. A branch leading from point 634 between switches 632 and 633 leads through a normally open blade of CRL-21, a normally closed blade of contactor HML-2 to the coil of contactor HML-1, which is energizable for initiating the automatic stopping of the spindle.

The said blade of CRL-21 is bypassed by a first branch containing a normally open blade of CRL-22 and a normally open blade of limit switch LS-15 that is closed when the tools of the machine are fed completely in, and by a second branch containing a normally open blade of contactor LPRL and a normally open blade of contactor HML-1. A connection is made from between the limit switch LS-15 and the said blade on CRL-22 to a point between the said blade on LPRL and the said blade on HML-1.

The contactor HML-2 which is energized to permit free rotation of the hydraulic braking motor connected with the main motor is located in a branch of a normally open blade of CRL-23 and a normally closed blade of contactor HML-1.

The coil of relay CRL-21 is connected in a branch containing a normally open blade of relay UCRL which is bypassed by a normally open blade of DCRL, a normally open blade of CRL-15, a normally open blade of CRL-6, a normally open blade of push button 633, a normally open blade of CRL-2, and a normally open blade of 2-ARL. From a point ahead of the said normally open blade of switch 633, there is a first branch extending through a normally open blade of an inch push button 635 and a normally open blade of CRL-1 to the coil of CRL-21, and also a branch containing a normally open blade of CRL-7. From a point ahead of CRL-7, there is a branch extending through a normally closed blade of switch 635 and a normally closed blade of switch 632, to a point 636, and from point 636 one branch extends through a normally open blade of contactor TIL to the coil of relay CRL-24 which the said blade of TIL being bypassed by a normally open blade of CRL-24.

Also from point 636 is a branch extending through a normally open blade of CRL-8 and a normally open blade of CRL-4 through a wire 637. From wire 637, there is a branch leading to the coil of relay CRL-22 through the serially connected normally open blades of CRL-21 and CRL-12, which are bypassed by a normally open blade of CRL-22.

Also leading from wire 637, is a branch extending through a normally open blade of CRL-21, and a normally open blade of CRL-22 to the coil of relay CRL-23. Bypassing the said blades of CRL-21 and CRL-22, is a branch containing a normally closed limit switch LS-16 opened by a cam on the spindle to commence the hydraulic braking of the spindle to a halt, and a normally open blade of CRL-23. Limit switch LS-16 is bypassed by a normally closed blade of the limit switch LS-15 previously referred to, and also by a normally open blade of CRL-1. Connected in parallel with the coil of relay CRL-23 is a first branch containing a normally closed blade of limit switch LS-13 which is under the control of a cam on the feed ram, the normally closed blade of contactor SSL, and the contactor coil SFL which causes slow speed operation of the drive motor. Also connected in parallel with the coil of relay CRL-23, is a branch containing a normally open blade of limit switch LS-13, a normally closed blade of contactor SFL, and the coil of contactor SSL which causes high speed operation of the drive motor.

The several contactors by means of which the various hydraulic valves are controlled, are identified at the upper part of Figure 42-A. These contactors include LPRL energizable for causing the lock pin to move in; CWIL, energizable to cause the chuck wrench to move into driving position; UCL, energizable for rotating the chuck wrench to open the chuck; COL, energizable to move the centers 50 and 51 outwardly; CIL, energizable to move the centers inwardly; CCL, energizable to cause the chuck wrench to rotate to close the chuck; CWIL, energizable to cause the chuck wrench to retract; TIL, energizable by itself to bring about inward fed movement of the tools; and contactor TOL, energizable by itself, to bring about rapid retraction of the tools, and energizable, together with contactor TIL, to bring about rapid advancing movement of the tools.

The group of contactors also include contactor HML-1, energizable for initiating the automatic braking, slowing down, and stopping of the main drive motor; contactor HML-2, energizable for permitting free discharge from the braking hydraulic motor connected with the main drive motor; contactor CVL, energizable to supply coolant to the tools; contactor MVRL, energizable to provide a supply of pressure fluid for operating the loader; contactor TRRL, energizable for causing the loader to traverse rightwardly across the machine; contactor TLRL, energizable to cause the loader to traverse leftwardly across the machine; contactor DURL, energizable for causing the loader hooks to follow their unloading path, and contactor ULRL, energizable for causing the loader hooks to follow their loading path.

Figure 42-D will reveal that the main drive motor for the line bearing machine is a two speed double wound three phase motor and that when the contactor SSL is energized, the motor is energized to rotate at high speeds, whereas, when contactor SFL is energized, the high speed windings are interconnected for dynamically braking the motor to a lower speed while the lower speed windings are energized to drive the motor at lower speed.

Figure 43 shows the gauge operating circuit. When the blade of switch LSG-4 is closed by a crankshaft deposited on the carrier, and the blade of limit switch LS-6 in series therewith is closed showing the conveyor to be out of the way of the gauge carrier, and LSI-5-A is closed showing the intermediate conveyor to be ready to receive crankshafts, relay R-1 is energized which will energize solenoid S-1 of valve 318 to cause the gauge carrier to tilt downwardly to gauge position. As soon as the carrier tilts from load position the blade of switch LSG-2 in circuit with R-1 closes and holds the relay in circuit.

If the crankshaft being gauged is acceptable, the switches LSG—M will close, energizing relay R-2 which will cause de-energization of relay R-1 and energization of solenoid S-2 which will shift valve 318 into position to cause the carrier to tilt upwardly to unloading position and discharge the crankshaft therefrom to the intermediate conveyor.

When the gauge carrier reaches unloading position it will open switch LSG-3 to de-energize relay R-2 which will permit relay R-1 again to close and return the carrier to load position.

Figures 43A and 43B illustrate diagrammatically how the lathe chuck and crankshaft gauging mechanism are operatively interlocked as described. Figure 43A is a diagrammatic view of the electrical and hydraulic circuit connecting the gauge mechanism to the crankshaft lathe locking means, and Figure 43B is a diagrammatic illustration of the gauge carrier and electrical switch operating mechanism for controlling the tilting of the carrier on which a machined crankshaft is to be gauged.

The gauging circuit, as illustrated in Figure 43A, is shown in position for receiving a crankshaft which has been machined as to the line bearings, and is supported on the lift hooks 66. The crankshaft thus machined is deposited on the carrier 302, and the lathe chuck 52 is locked by the locking pin 160 from further operation. Inasmuch as the lathe motor M is not rotating, the switch LS-17 is closed in the circuit to energize the solenoid MM-1. The other blade of switch LSG-3, as at LSG-3a, is also closed, since the gauge carrier 302 is in loading position.

A crankshaft which has been machined and positioned on the carrier or platform 302 by the lift hook 66 closes switch LSG-4 as explained above, in connection with Figure 43, this causes the carrier 302 and crankshaft supported thereon to be tilted into gauging position, as shown in Figure 43B by step II. If the crankshaft thus supported on the carrier has been properly machined, then upon tilting the crankshaft into gauging position, as illustrated in Figure 43B, the switches LSG—M will be closed and the carrier 302 tilted into unloading position. Cam 319, as best seen in Figure 43B, opens the switch LSG-3 and simultaneously switch LSG-3a which opens the circuit to the solenoid MM-1. The spring in the hydraulic piston valve 164 then actuates the piston moving it to the left, so as to hydraulically operate the piston in cylinder 163 so as to bring about the withdrawal of locking pin 160 from the chuck 52 of the lathe. At the same time this pin is withdrawn, as illustrated in Figure 43A at the left, switch LS-19 is energized and the starting circuit of the drive motor M which starts the operation of a crankshaft lathe so that the next crankshaft can be machined. Upon operation of the lathe, switch LS-17 is opened so that the solenoid MM-1 will not be energized when switch LSG-3a is closed by the carrier 302 returning to a loading position.

Provided the crankshaft gauging mechanism fails to close the gauging switches LSG—M as aforementioned, either one or more of the switches remaining open, the carrier 302 likewise remains stalled in gauging position. In this position switch LSG-3 remains closed holding the solenoid MM-1 energized and the locking pin 160 in locking position in the chuck 52, preventing the machining of additional crankshafts until the lathe has been corrected so as to machine the crankshafts properly.

It will be understood that a suitable interlocking could be employed for preventing return of the carrier from unloading position until the crankshaft was discharged therefrom if found necessary.

Electric control circuit for pin bearing machine

The electric control circuit for the pin bearing machine is diagrammatically illustrated in Figures 44-A, 44-B, and 44-C.

Commencing at the top of Figure 44-A, the one power line L-1 is shown at the left and the connection of the various wires with the other power line L-2 is indicated by the arrow at the right ends of the said lines. At the top of Figure 44-A there is a selector switch 700 having an upper position marked "auto," in which position the switch causes energization of the coils of relays 1-ARP and 2-ARP which have blades thereon, that close to make effective the electric control circuit that cause automotive operation.

Switch 700 has a second position marked "hand" in which position the coil of relay CRP-1 is energized and this relay has blades operated thereby effective for making circuits effective for hand operation of the machine while making ineffective certain of the interlocking circuits by means of which automatic cycling of the machine is obtained. A second selector switch 702 is provided having one position marked "repeat" in which the coil of relay CRRP is energized for making effective a circuit which will cause automatic recycling of the machine as soon as one cycle thereof has been completed provided the cycle has been properly carried out. Switch 702 also has a second position marked "Non-repeat," in which position the coil of relay CRP-2 is energized which has a blade thereon that closes when the relay is energized to prevent the machine cycle from repeating automatically.

A third manual switch 703 is connected in circuit with a limit switch LS-122, a normally closed blade of CRP-1, and a normally open blade of CRP-18 with the coil of contactor CVP that controls the supply of coolant to the tools of the machine.

Also leading from power line L-1 is a wire connected with a normally closed blade of limit switch LS-114 to a timer 4-TRP and connected in parallel with the timer is a branch containing a blade of the timer adapted for closing two seconds after the timer is energized and the coil of CRP-3. Limit switch LS-114 has a first normally open blade thereof, closed when the lock pin of the machine is in, and also has a second blade that is closed when the lock pin of the machine is out and which is connected in circuit with the coil of relay CRP-4.

Another branch leading from power line L-1 passes through the blades of the serially connected limit switches LS-102, that are closed when the chucks of the machine are closed, to the coil of relay CRP-5.

The said limit switches LS-102 also have blades that are closed when the chucks are open and which blades are connected in series with each other and with the coil of relay CRP-6.

The limit switch LS-101 has one blade that is closed when the steady rests of the machine are closed connected in series with the coil of relay CRP-7, and another blade that is closed when the steady rests are open that is connected in series with the coil of relay CRP-8.

Limit switch LS–115 which is closed when the door of the machine is closed is connected in series with the coil of relay CRP–9 while limit switch LS–116 which is closed by the door when it is open is in series with the coil of relay CRP–10.

There is a limit switch LS–118 which is closed when the tools of the machine are in their outermost position that is in series with the coil of relay CRP–11. Limit switch LS–108 which is closed by the load conveyor of the machine when it is in its center position, is connected in series with a normally closed blade of contactor SCRP and the coil of relay CRP–12.

Another limit switch LS–103 is arranged to be closed by the load conveyor at its extreme right hand end position where it picks up crankshafts from the intermediate conveyor and is in series with the coil of relay CRP–13.

Limit switch LS–106 which is closed by the loader at its extreme left hand end position, at which time crankshafts are being deposited on the discharge conveyor, is in series with the coil of relay CRP–14.

Limit switch LS–117 has a normally open blade thereon closed by one of the cams associated with the spindle drive mechanism and is in series with a normally closed blade of relay CRP–18, a normally closed blade of CRP–20, a normally open blade of relay CRP–21, to a point 704 and thence through a normally closed blade of CRP–16, to a coil of contactor LPI, and thence to power line L–2. Contactor LPI, when energized, causes the lock pin of the machine to move in. Connected between point 704 and power line L–1 is a holding circuit containing a normally open blade of contactor LP–1.

A contactor LPOP is provided which, when energized, will cause the lock pin of the machine to move out. The coil of this contactor is connected in series between the power lines L–1 and L–2 with a normally closed blade of contactor LP–1, and a normally open blade of relay CRP–16, with the last mentioned blade being bypassed by a normally open blade of LPOP, to provide a holding circuit.

A branch leading from power line L–1 immediately below the branch containing LS–117, has in series therein, a normally closed blade of CRP–1, a normally open blade of CRP–11 which is bypassed by a normally open blade of CRP–17, a normally open blade of a relay HURP, and a normally open blade of CRP–14, the last two mentioned blades being bypassed by a normally open blade of CRP–22, and the coil of CRP–22.

Another wire leading from power line L–1 at 705 leads through a normally open blade of CRP–3, and a normally open blade of CRP–1, to a wire 706. Wire 706 is connected through a normally open push button 707 and a normally closed blade of a contactor CDP with the coil of contactor CDP which, when energized, causes opening of the door of the pin bearing machine.

The last mentioned normally open blade of CRP–1 and the said push button 707 are bypassed by a branch containing a normally closed blade of CRP–22, a normally open blade of CRRP, and a normally open blade of 1–ARP. The branch containing the push button provides for manual operation of the door and the bypassing branch referred to, provides for automatic operation of the door.

Also leading from wire 706 is a branch containing a push button 708, a normally closed blade, a contactor CSRP, and the coil of contactor OSRP which, when energized, causes opening of the steady rests of the machine.

The last mentioned bypassing branch that provided for automatic operation of the door in opening, is also connected through another normally open blade of 1–ARP to provide for automatic energization of the coil of contactor OSRP. Also leading from wire 706 is a branch containing a push button 709, a normally closed blade of a contactor CCP and the coil of contactor UCP, which when energized, causes opening of the chucks. This circuit provides for manual opening of the chucks and a branch is provided to cause automatic opening of the chucks in the form of a wire 710 leading from power line L–1 through a normally open blade of 1–ARP to a point 711, and then through a normally closed blade of CRP–22, a normally open blade of CRP–8, and a normally open blade of CRP–11, to a point ahead of the last mentioned normally closed blade of contactor CCP.

Also leading from wire 706 is a branch containing a push button 712 and a normally closed blade of contactor UCP, and the coil of contactor CCP which, when energized, causes closing of the chucks of the machine. A branch for causing automatic closing of the chucks is provided by a wire leading from point 711 through a normally open blade of CRP–22, a normally open blade of a relay HURP, and a normally open blade of a relay EUCRP to a point ahead of the last mentioned blade with contactor UCP.

Still another branch leading from wire 706 contains a push button 713, a normally closed blade of a contactor OSRP, and the coil of a contactor CSRP, which when energized, causes closing of the steady rests.

A branch provided for automatic closing in the steady rests, takes the form of a wire 714 leading from power L–1 through a normally open blade of CRP–22, a normally open blade of CRP–5, and a normally open blade of 1–ARP, to a point ahead of the said normally closed blade of OSRP.

Still another wire leads from wire 706 through a push button 715 and a normally closed blade of contactor ODP to the coil of contactor CDP which, when energized, causes closing of the door of the machine. A normally open blade of relay 1–ARP is connected from ahead of the said blade of ODP with the point immediately ahead of the last mentioned blade of 1–ARP to provide for automatic closing of the door of the machine.

Turning now to Figure 44–B, there is a wire 716 leading through normally open blades of CRP–5, CRP–7, CRP–9, CRP–11, CRP–13, CRP–22, and 1–ARP, to the coil of relay CRP–23.

Another wire 717 leads through a normally open blade of relay 1–ARP and a normally closed blade of a push button 718, a normally open blade of CRP–24, a normally closed blade of CRP–17 and a normally closed blade of contactor TIP to the coil of contactor TOP, which when energized, causes the tools of the machine to move outwardly. A manual circuit for controlling the coil of TOP is provided by a wire 719 which leads through a normally open blade of a push button 720 to a point ahead of the said normally closed blades of contactor TIP.

A circuit for causing the tools to move in automatically is provided by a wire 721 leading through a normally open blade of relay CRP–11, a normally open blade of timer 3–TRP, a normally open blade of CRP–17, and a normally closed blade of contactor TOP, to the coil of contactor TIP. The said blade of CRP–17 is bypassed by a normally open blade of CRP–1, and from a point immediately ahead of the said blade of CRP–17, there is a first branch leading back through a normally open blade of CRP–12 and a normally open blade of push button 718 to power line L–1, and a second branch leading through a normally open blade of contactor TIP, and a normally closed blade of push button 720 through the previously mentioned blade of 1–ARP to power line L–1.

The operation of the load conveyor of the machine is generally under the control of a timer ITRP which is connected in a wire 722 leading from power line L–1 through the limit switch LSI–3–A, which is closed by the intermediate conveyor in its left hand end position indicating that there are crankshafts supported on the hooks 317 of the intermediate conveyor, the limit switches LS–120 which are adapted for being closed when crankshafts on the unloading rack are removed from the unloading position thereof, a normally open blade of relay 1–ARP, a normally open blade of relay CRP–6, a normally closed blade of CRP–22, a normally open blade of relay HDRP, and a normally open blade of CRP-11. The timer ITRP is bypassed by a branch containing a first normally open blade of the said timer, a second normally closed blade of the said timer and the coil of relay CRP-15.

The coil of contactor MVR which is energizable for causing a supply of pressure fluid to the hydraulic circuit of the loader, is located in a wire containing a normally open push button 723 and a normally closed push button 724. The normally open push button will set the loader in operation, and the normally closed push button will stop the loader. Push button 723 is bypassed by a branch containing a normally open blade of contactor MVR to provide a whole circuit.

A branch leading from point 725 between switches 723 and 724 extends through a normally open blade of relay SCRP, a normally closed blade of CRP-14, and a normally open blade of 2-ARP, to the coil of relay SCRP.

The said normally open blade of SCRP is bypassed by a normally open blade of CRP-15 and still another branch leading from a point 726 behind the said blade of SCRP leads to power line L-1 and contains a normally open blade of CRP-15 and a blade of limit switch LS-107 that is closed whenever the loader is rightwardly of its center position.

Also leading from power line L-1 is a branch containing a blade of limit switch LS-107 which is closed whenever the loader is leftwardly of its center position and which blade is bypassed by a normally open blade of SCRP. This branch continues to a point 727 from which a first branch passes through a normally closed blade of a contactor EUCRP, a normally open blade of contactor EUCRP, a normally open blade of relay 2-ARP, and a normally closed blade of contactor TLRP to the coil of contactor TRRP. The aforementioned normally closed blade of EUCRP is bypassed by a branch containing a normally closed blade of contactor HURP while the normally open blade of relay EUCRP is bypassed by a normally open blade of contactor TRRP.

There is also a branch extending to point 727 through a normally open blade of relay EUCRP, a normally closed blade of EUCRP, a normally open blade of 2-ARP, and a normally closed blade of contactor TRRP, to the coil of contactor TLRP.

The said normally closed blade of EUCRP is bypassed by a normally open blade of contactor HURP, and the said normally open blade of EUCRP is bypassed by a normally open blade of contactor TLRP.

Means for manually controlling the coils of TRRP and TLRP is provided in the form of a wire 728 leading from power line L-1 through a normally open blade of CRP-1, and a normally open blade of CRP-11 to a wire 729 whence a first branch line leads through a push button 730 to a point 731 of the circuit for contactor TRRP. Also leading from wire 729 is a branch through a push button 732 to a point 733 of the circuit to the coil of contactor TLRP.

A wire 734 leads through a normally open blade of relay CRP-13 with the coil of a relay SRLRP.

Another branch leading from power line L-1 passes through a normally open blade of CRP-13 and a normally open blade of relay HUCRP to a point 735, and then through a normally open blade of 2-ARP to a point 736, then through the normally open blades of CRP-14, CRP-6, CRP-8, CRP-10, and CRP-11, to the coil of relay LDRP, which, when energized, caused downward movement of the loader carriages of the load conveyor.

The said normally open blade of CRP-14 is bypassed by a normally open blade of CRP-13, and a push button 738 providing for manual operation of the said carriages is connected between wire 729 and point 736.

Another branch leading from the power line L-1 passes through the serially connected blades on limit switches LS-105 that are closed when the hooks of the carriages are down, and a normally open blade of relay SRLP, to the said point 735.

From a point ahead of the said blade of SRLRP, is a branch containing a normally closed blade of relay SCRP, which is connected at 739 to a wire leading from power line L-1 and containing a normally open blade of relay HUCRP, a normally open blade of 2-ARP, and a normally closed blade of contactor LDRP, and the coil of contactor LURP. A push button 740 providing for manually controlling the upward movement of the carriages is connected between wire 729 and a point 741 of the line leading to the coil of contactor EURP.

The said circuit comprises a holding blade in the form of a normally open blade of EURP which bypasses the said normally open blade of HUCRP.

A wire 742 leads from power line L-1 through the serially connected blades of limit switches LS-105 which are closed when the hooks of the carriages are up to the coil of relay HUCRP.

Another wire 743 leads from power line L-1 through a normally closed blade of contactor EDRP to a point 744 and then through a normally open blade of relay 2-ARP to a point 745 and then through a normally closed blade of contactor HURP to the coil of a contactor HDRP which, when energized, causes the loader hooks to move downwardly on the loader carriages.

Means for manually causing the hooks to move downwardly is provided in the form of a push button 746 connected by the wire 729 and the said point 745.

Also connected with power line L-1 through the blades of the limit switches LS-104 that are closed when the loader carriages are elevated, is the coil of a relay EUCRP.

The said limit switches LS-104 also have blades that are closed when the carriages of the loader are in their lowered position and which blades are connected in series with a normally open blade of relay SRLRP between power line L-1 and a point 746A on a wire leading from power line L-1 through a normally open blade of relay SCRP, a normally open blade of contactor HURP, and a normally open blade of relay 2-ARP to the coil of contactor HURP which, when energized, causes the hooks to move upwardly on the loader carriages. A push button 747 connected between wire 729 and point 748 provides for manual control of the coil of relay HURP.

The said normally open blade of SCRP is bypassed by a normally open blade of relay EUCRP, and there is a branch leading from point 744 through a normally closed blade of a relay SCRP to a point 749 ahead of the previously mentioned normally open blade of relay SRLRP.

The circuit for controlling the spindle drive motor comprises a wire 750 leading through a normally open blade of relay EUCRP, a normally closed blade of relay SCRP, a normally closed blade of contactor TLRP, a normally closed blade of contactor TRRP and a normally open blade of relay CRP-12 to a point 751. From point 751, a first branch leads through a normally open push button 752, a normally open blade of relay CRP-7, a normally open blade of CRP-2, and a normally open blade of 2-ARP to a point 753 and then to the coil of relay CRP-16.

A branch leads from point 751 through a push button 754, and a normally open blade of CRP-1 to the said point 753.

Still another branch leads from point 751 through a normally closed stop push button 755 to a point 756 and then through a normally open blade of CRP-23 to point 753. From point 756 a first branch leads through a limit switch LS-111 which is normally closed and which is adapted for being open when the tools reach the end of the said travel, a normally open blade of CRP-16 to the coil of relay CRP-17. The said limit switch LS-111 is bypassed by a normally open blade of relay CRP-1 and the said blade of CRP-16 is bypassed by a branch containing a normally open blade of CRP-17 and a normally open blade of CRP-18.

Also leading from point 756 is a branch containing a normally open blade of contactor TIP and parallel with a normally open blade CRP-24 and leading to the coil of relay CRP-24.

The circuit for controlling the main drive motor leads from point 751 through normally open blades of CRP-4 and CRP-5 to a point 757. From point 757, a branch leads through a normally closed blade of CRPI and a normally open blade of CRP-16 to a point 758 and then to the coil of relay CRP-18.

The said blade of CRP-16 is bypassed by a branch containing normally open blades of CRP-17, CRP-18. A normally closed limit switch LS-113 adapted for being opened by a cam on the spindle bypasses the said blade of CRP-17.

From point 758 a branch leads through a normally open blade of CRP-17 to timer 3-TRP and the said timer is bypassed by a branch containing a normally closed limit switch LS-110 opened by a cam on the feed bar to initiate slow speed of the drive motor, and timer 2-TRP.

From point 758 a branch also leads through a normally open blade of CRP-18 to a point 759. From point 759 a first branch leads through a normally open blade of 2-TRP, the coil of contactor SFP and a normally closed blade of contactor SSP to a point 760. Point 760 is connected through normally closed blades of contactor SPP and SJP with line L-2.

Also leading from point 759 is a branch containing a normally closed blade of 2-TRP, the coil of contactor SSP and a normally closed blade of contactor SFP to point 760.

A branch leading between points 757 and 759 contains a normally open blade of CRP-16.

A wire leads from line L-1 through a zero speed limit switch LS-112 to a point 761 and then through the parallel connected normally open blades of SSP, SFP, SJP, and CRP-19 to a point 762.

From point 761 a first branch leads to the coil of relay CRP-19, and a second branch leads through a normally open blade of CRP 18 to the coil of relay CRP-20. The said blade of CRP-18 is bypassed by a normally open blade of CRP-20.

Also leading from point 761 is a branch containing in series normally closed blades of CRP-18, SSP, SFP, and SJP, a normally open blade of CRP-20 and the coil of contactor SPP. The said blade of CRP-20 is bypassed by a jumper 763 to obtain plugging of the motor.

Another wire leading from L-1 contains a normally open push button 764, normally open blades of CRP-16 and CRP-18, a normally closed blade of timer 4-TRP and the coil of relay CRP-21.

Also leading from line L-1 to the coil of relay CRP-21 is a branch containing normally open blades of CRP-18 and CRP-19.

Leading from line L-1 to a point 765 is another branch having a normally closed blade of limit switch LS-117 and a normally closed blade of CRP-3. From point 765 a branch leads to the coil of contactor SSP via normally open blades of CRP-11 and CRP-21 and normally closed blades of CRP-19, SSP, SFP, and SSP. From ahead of the coil of CRP-21 to point 765 is a branch containing a normally open blade of CRP-21.

When the lock pin is used, as has been described, the last mentioned blade of limit switch LS-117 is bypassed by a jumper.

Figure 44-D shows the electrical circuit for the drive motor and it will be observed that contactor SSP provides for low speed operation, contactor SFP provides for high speed operation, contactor SPP provides plugging while interconnecting the motor on its low speed windings, contactor SJP provides reduced voltage for reduced torque and speed in a forward direction for jogging while interconnecting the motor on its low speed windings through resistor and transformer combination 770.

*Operation*

The operation of the arrangement of this invention may be summarized as follows:

The line bearing machine at rest is in the following condition: The gauge "C," has been cleared of a crankshaft and presence of another rough crankshaft for machining is indicated by the closing of limit switch LSCI on the supply conveyor 40. The line bearing machine has a rough crankshaft between centers 50 and 51, properly located and properly chucked and the chuck wrench withdrawn. This represents the machine as it had been stopped in automatic cycle of "Non-repeat" selection and is at partial completion of function No. 2, "Withdraw wrench and lock pin." However, the lock pin 160 has not been withdrawn.

*Function No. 3—main motor starts; function No. 3-A— tools traverse forward.*—The operator presses main motor run push button 635, which withdraws the lock pin and starts the main motor "M." He also presses tools in push button FIL, and then changes selector switch 600 to "Repeat" from "Non-repeat." The foregoing three selections all made only on the initial repeat from rest. In automatic cycle, the sequence will be repeated automatically.

*Function No. 3—main motor starts.*—Main motor starts at high speed.

*Function No. 3-A—tools traverse forward*—Tools traverse forward until limit switch LS-12 is contacted by dog 139 on feed rack 136 which cuts out forward traverse and starts forward feed or function No. 4.

*Function No. 4—tools feed cut.*—The tools continue to feed at predetermined rate until feed rack dog 140 contacts limit switch LS-13 to initiate function No. 5.

*Function No. 5—dwell cut at slow speed.*—Main motor is cut to slow speed for dwell cut to clean up continuing until limit switch LS-15 on feed rack is engaged by feed rack dog 142 and LS-16 by one of cams 165 to start functions No. 6 and 6-A.

*Function No. 6—tools traverse out.*—Tools traverse out to outer limit contacting limit switch LS-14.

*Function No. 6-A—brake to jog speed.*—Braking has been going on while function No. 6 is in progress and continues until the spindle speed satisfies zero speed switch LS-17 for safe entry of lock pin 160 for perfect stop of chuck through contacting LS-18 by the other of cams 165 to initiate function No. 7.

*Function No. 7—jog to stop.*—Entrance of lock pin into lock slot actuates limit switch LS-19 to initiate function No. 8 provided LS-14 has been actuated by tools out limit travel. LS-19 also initiated function No. 9, "Loader leaves rest position," which starts simultaneously with function No. 8 but function No. 9 awaits completion of function No. 9-A before function No. 10 is started.

*Function No. 8—unchuck crank.*—This function consists of two related operations, first inserting the chuck wrench 118 by means of hydraulic cylinder and shifting mechanism, which when nearly all the way into chuck wrench socket contacts limit switches LS-11 and LS-20 to start hydraulic wrench motor 176. The rearward motion of the chuck jaw is stopped safely by limit switch LS-1 on jaw limitation device on left hand tailstock and this initiates function No. 9-A.

*Function No. 9-A—withdraw centers.*—After the crankshaft has been unchucked, the centers 50 and 51 are withdrawn by revolving nut devices driven hydraulic motors 166-L and 166-R actuating limit switches LS-3-L and LS-3-R on the tailstocks to initiate function No. 10.

*Function No. 9—loader leaves rest position.*—As was stated under function No. 7, this function was initiated by LS-19 and started at the same time as function No. 8, at its completion (function No. 9) has actuated limit switch LS-4 but awaits completion of function No. 9-A and the actuating of switches LS-3-L and LS-3-R before sending sequence into function No. 10.

*Function No. 10—hooks obtain crankshafts.*—The one hook 66 obtains a rough crankshaft from the supply conveyor 40 while the other lifts a turned crankshaft from the chuck 52 and at completion of this operation actuates limit switches LS–5–L and LS–5–R on loader carriages to initiate function No. 11.

*Function No. 11—loader goes to other end.*—The loader travels leftwardly to the other end where the turned crankshaft is placed in the V blocks 307 of the gauge and the rough crankshaft is set on the chuck anvil 102 and a rest bar under lobe No. 8. On completion of function No. 11, the switch LS–6 is contacted by the loader to initiate function No. 12, but while traveling this length, loader has run over transfer switch LS–7 to set up reversible conditions in electric circuit for subsequent loader functions.

*Function No. 12—hooks deposit crankshafts.*—The two crankshafts are deposited as stated above and switches LS–8–L and LS–8–R on the loader carriages are actuated to initiate functions No. 13 and 13–A.

Before describing functions No. 13 and 13–A, understand that the turned crankshaft that was deposited in gauge has been gauge processed and, if acceptable, the gauge will signal all clear just a second or so after completion of function No. 13, but before function No. 13–A has been completed and its limit switch LS–9 is actuated by the loader in center position.

*Function No. 13—insert centers.*—The centers are inserted by same hydraulic means described in function No. 9–A, but in reverse direction, but the left hand center 50 which positions the crankshaft endwise in the machine, is brought in first to a definite stop. This is accomplished by restricting the speed of the right hand hydraulic motor 166–R by restrictor 169. On completion of function No. 13, limit switches LS–3–L and LS–3–R on the tailstock are actuated to initiate function No. 1.

*Function No. 13–A—loader returns to rest position.*—This function was initiated by switches LS–8–L and LS–8–R as noted under function No. 12 and will be completed just previous to the completion of function No. 2 (described later) and when this function No. 13–A is completed, it actuates limit switch LS–9 for completion signal.

*Function No. 1—chuck crankshaft.*—This function was started by completion of function No. 13 (insert centers) and will continue to chuck crankshaft until preset chucking pressure is obtained to actuate pressure switch LS–10 and inward movement of chuck jaw 105 is indicated satisfactorily by position limit switch LS–2 on left hand tailstock. The actuating of these two switches LS–10 and LS–2 initiate function No. 2 for withdrawal of chuck wrench 118.

*Function No. 2—withdraw chuck wrench and lock pin.*—The wrench 118 is withdrawn from chuck socket 117 actuating limit switch LS–11 and LS–20 to initiate withdrawal of lock pin 160 to initiate function No. 3 and 3–A for the start of the next automatic cycle.

After the crankshaft has been deposited in the gauge, and has been accepted thereby, and the gauge carrier has tilted upwardly, the crankshaft rolls back on to the rails of the gauge carrier and then slides rearwardly therealong in a predetermined oriented position until it is received by the hooks 317 of the intermediate conveyor wherein it is supported in the said oriented position properly referenced with regard to the chucks of the pin bearing machine.

The first crankshaft delivered to the intermediate conveyor closes limit switch LSI–1 causing upward movement of the carriage of the intermediate conveyor, and the second crankshaft delivered thereto closes limit switch LSI–2 to cause leftward traverse of the carriage of the intermediate conveyor.

At the left hand end the intermediate conveyor closes limit switch LSI–3 which will condition the control circuit for the loader of the pin bearing machine to go into operation whenever the pin bearing machine is ready to receive crankshafts.

The pin bearing machine at rest is in the following condition: The intermediate conveyor I is loaded with two properly rotatively oriented crankshafts and by their presence here is indicated, through limit contact switches LSI–1 and LSI–2, that they are ready to be processed. Also the intermediate conveyor in its left hand position closes limit switch LSI–3. Likewise the unloading conveyor indicates its readiness by closing of two contact limit switches LS–120 by the absence of crankshafts from the previous cycle at the unloading position. The last two machined crankshafts are still chucked in the chucks, the steady rest caps still closed, as is the front door.

Operator elects to start automatic operation by turning selector to "Repeat."

*Function No. 1—open steady rest caps and open door.*—The steady rest caps 402 are unlocked and opened by hydraulic motor 407 and through this opening motion contact is made with limit switch LS–101 to initiate function No. 2.

The front door 522 has started opening at same time that steady rest opening and on completion of the opening movement, contacts limit switch LS–116 which works in conjunction with function No. 4, but does not effect functions Nos. 2 or 3.

*Function No. 2—unchuck cranks.*—The chucks 351 are each operated by their individual hydraulically operated plunger mechanism 38–L and the opening of the chucks is indicated by actuation of four limit switches LS–102 mounted at each chuck rim, which initiates the start of function No. 3.

*Function No. 3—loader leaves rest position to get crankshafts.*—The automatic loader travels to the right and left through means of a hydraulic ram and cylinder 367, 370 and a suitable cable chain arrangement 366 to the end of its travel in each direction. At its right end loader carriage actuates limit switch LS–103 initiating function No. 4.

*Function No. 4—elevators go down to stop.*—Both loader elevating arms 355 descend by operation of motor 362 to the lower arcuate stopped positions where contact is made with two limit switches LS–104 which initiates function No. 5.

*Function No. 5—crankshaft hooks raise to get crankshafts.*—The crank hook slides 357 of the left hand carriage raise enough to lift both crankshafts in the machine out of the chuck off the anvils 382 and out of the steady rest cartridges, while those of the right hand carriage lift the rough crankshafts off the hooks 317 of the intermediate conveyor, and this raising motion deposits the crankshafts on to hooks 359 themselves. This is accomplished by a small hydraulic cylinder 358 on each hook slide carrier which also actuates two limit switches LS–105 to initiate function No. 6.

*Function No. 6—elevators go up to stop.*—The elevators now go up to their top arcuate stopped position preparatory to horizontal conveyance to next function. In its upper position contact is made with two limit switches LS–104 which now initiates function No. 7.

*Function No. 7—loader goes to other end of travel opposite that of function No. 3.*—At the end of this horizontal travel, contact is made with limit switch LS–106 which initiates function No. 8. Also, in its path, the loader carriage actuates transfer limit switch LS–107 for purpose of setting up subsequent controls necessary in the automatic operation.

*Function No. 8—elevators go down to stop.*—The elevators now go down to the lower position again and then contact limit switches LS–104 to initiate function No. 9.

*Function No. 9—crank hooks lower to deposit crankshafts.*—The crankshaft hooks of both carriages now go down to release crankshafts, the two unturned crankshafts into the machine chucks and steady rest cartridges and the two turned crankshafts on to the discharge conveyor 361 for further operations. On the lowering of these crankshaft hook slides, contact is again made with two limit switches LS-105 to initiate function No. 10.

*Function No. 10—elevators go up to stop.*—The elevators now return to their top arcuate position where they contact two limit switches LS-104 to initiate function No. 11.

*Function No. 11—loader goes to center rest position.*—Loader now travels horizontally to center rest position where it again resets transfer switch LS-107 and contacts limit switch LS-108 to initiate function No. 12.

*Function No. 12—chuck crankshafts.*—The four chucks 351 are now closed through their hydraulic motor 385 and indicate so by actuating four limit switches LS-102 to initiate function No. 13.

*Function No. 13—close steady rest and close door.*—The steady rest caps 402 are not closed and locked in position thereby actuating limit switch LS-101 while door 522 is closed by its motor and related mechanism to actuate limit switch LS-115 which together with LS-101 initiates function No. 14.

*Function No. 14—main motor starts at slow speed, then to high speed.*—The main motor now starts at slow speed and, after a two second delay brought about by timer 2-TRP, goes into high speed, at the same time a three second timer, 3-TRP is started to initiate function No. 15.

*Function No. 15—tools forward traverse to feed forward position.*—The tools are traversed forward contacting limit switch LS-109 on rack bar slide 506 to cut forward traverse and start feed cut at a predetermined rate designated as function No. 16.

*Function No. 16—tools forward feed.*—The tools now advance through cut to the proper point for dwell cut at slow motor speed initiated by actuation of limit switch LS-110 for function No. 17.

*Function No. 17—dwell cut at slow speed.*—The tools now dwell at slow speed for clean up and set up function No. 18 through limit switch LS-111 on feed rack slide 506 and LS-113 on lower right hand spindle gear.

*Function No. 18—cut main motor to safe jog speed to stop.*—Main motor is plugged to speed of jogging satisfying zero speed switch LS-112, thence automatic jogging at reduced voltage to perfect stop point on contacting limit switch LS-117 to initiate function No. 19.

*Function No. 19—reduced speed for perfect stop to insert pin.*—Lock pin 393 is inserted by hydraulic motor 394 which actuates limit switch LS-114 to initiate function No. 1, "Open steady rest and open door."

*Function No. 1—repeat the foregoing.*—The last reference to the intermediate conveyor had it in position for the crankshafts to be removed from the hooks thereof by the pin bearing machine load conveyor. Upon the crankshaft being lifted from the hooks, switches LSI-1 and LSI-2 are open, and this will permit de-energization of solenoid 333 which will permit slide 325 to move downwardly. When this slide reaches its lower position it will engage and close switch LSI-4 which will energize motor 330 to return the carriage rightwardly into position to receive crankshafts from the gauge carrier. In its extreme right hand end position the carriage actuates switch LSI-5 to de-energize motor 330 and also to prepare the gauge circuit for gauging a crankshaft.

It will be understood that this invention is susceptible to modification in order to adapt it to different usages and conditions, and, accordingly, it is desired to comprehend such modifications within this invention as may fall within the scope of the appended claims.

We claim:
1. In a lathe for machining and gauging crankshafts, a chuck for rotatably holding a crankshaft during machining of the same, means for driving said chuck, locking means operable in one position for locking the chuck in a predetermined arrested position to receive a crankshaft for machining and in another position for unlocking said chuck so it may be driven by its drive means, electrical actuating means for controlling said locking means, gauge means for receiving and gauging the machined surfaces of a crankshaft including switch means, and a circuit operatively connecting said electrical actuating means and said switch means so constructed and arranged that said switch means will actuate said locking means to unlock said chuck if a properly machined crankshaft is gauged and will fail to unlock said locking means if an improperly machined crankshaft is gauged.

2. In a lathe for machining and gauging crankshafts, a chuck for rotatively holding a crankshaft during machining of the same, means for driving said chuck, locking means operable in one position for locking the chuck in predetermined arrested position to receive a crankshaft for machining and in another position for unlocking said chuck so it may be driven by its drive means, electrical actuating means for controlling said locking means, gauge means comprising a tiltable support and coacting switch means for receiving and gauging the machined surfaces of a crankshaft, and a circuit operatively connecting said electrical actuating means and said switch means so constructed and arranged that said switch means will actuate said locking means to unlock said chuck if a properly machined crankshaft is gauged and will fail to unlock said locking means if an improperly machined crankshaft is gauged.

3. In a lathe for machining and gauging crankshafts, a chuck for rotatively holding a crankshaft during machining of the same, means for driving said chuck, locking means comprising a reciprocable pin engageable with said chuck, said locking means being operable in one position for locking the chuck in a predetermined arrested position to receive a crankshaft for machining and in another position for unlocking said chuck so it may be driven by its drive means, electrical actuating means for controlling said locking means, gauge means for receiving and gauging the machined surfaces of a crankshaft including switch means, and a circuit operatively connecting said electrical actuating means and said switch means so constructed and arranged that said switch means will actuate said locking means to cause said locking pin to be moved to unlock said chuck if a properly machined crankshaft is gauged and will fail to cause said locking pin to move to unlock said chuck if an improperly machined crankshaft is gauged.

References Cited in the file of this patent
UNITED STATES PATENTS

| | | |
|---|---|---|
| 1,961,091 | Smith et al. | May 29, 1934 |
| 2,002,705 | Moller | May 28, 1935 |
| 2,192,437 | Groene | Mar. 5, 1940 |
| 2,305,868 | Groene | Dec. 22, 1942 |
| 2,421,147 | Groene | May 27, 1947 |
| 2,473,108 | Meyer et al. | June 14, 1949 |
| 2,623,429 | Meyer et al. | Dec. 30, 1952 |
| 2,643,570 | Siekmann et al. | June 30, 1953 |
| 2,653,502 | Meyer | Sept. 29, 1953 |
| 2,655,828 | Hazen | Oct. 20, 1953 |
| 2,670,646 | Kendal | Mar. 2, 1954 |
| 2,714,324 | Dinsmore | Aug. 2, 1955 |
| 2,728,253 | Gettig | Dec. 27, 1955 |
| 2,746,613 | Meyer | May 22, 1956 |